(12) United States Patent
Zhang et al.

(10) Patent No.: US 11,259,031 B2
(45) Date of Patent: Feb. 22, 2022

(54) IMAGE PROCESSING METHOD, DEVICE, AND SYSTEM

(71) Applicant: Huawei Technologies Co., Ltd., Shenzhen (CN)

(72) Inventors: Hong Zhang, Shenzhen (CN); Haitao Yang, Shenzhen (CN); Shan Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/752,259

(22) Filed: Jan. 24, 2020

(65) Prior Publication Data

US 2020/0162749 A1 May 21, 2020

Related U.S. Application Data

(63) Continuation of application No. PCT/CN2018/081661, filed on Apr. 3, 2018.

(30) Foreign Application Priority Data

Jul. 25, 2017 (CN) .......................... 201710614141.6

(51) Int. Cl.
*H04N 19/176* (2014.01)
*H04N 19/126* (2014.01)
(Continued)

(52) U.S. Cl.
CPC ......... *H04N 19/176* (2014.11); *H04N 19/126* (2014.11); *H04N 19/132* (2014.11); *H04N 19/159* (2014.11); *H04N 19/198* (2014.11)

(58) Field of Classification Search
CPC .. H04N 19/176; H04N 19/126; H04N 19/132; H04N 19/159; H04N 19/198
See application file for complete search history.

(56) References Cited

U.S. PATENT DOCUMENTS 6,343,098 B1   1/2002 Boyce
2009/0296808 A1* 12/2009 Regunathan ......... H04N 19/124
                                              375/240.03
(Continued)

FOREIGN PATENT DOCUMENTS

CN   101222627 A   7/2008
CN   101252687 A   8/2008
(Continued)

OTHER PUBLICATIONS

"Convolutional Neural Network-Based Block Up-sampling for Intra Frame Coding," IEEE Transactions on Circuits and Systems for Video Technology; Jul. 14, 2017. Li et al.*
(Continued)

*Primary Examiner* — Mohammed S Rahaman
(74) *Attorney, Agent, or Firm* — Conley Rose, P.C.

(57) ABSTRACT

An image processing method and device include parsing a code stream to obtain a first quantization parameter of a current image area in an original resolution coding scheme, a second quantization parameter of the current image area in a downsampling coding scheme, a coding scheme of a current image block in the current image area, a quantization coefficient of the current image block, and a prediction signal of the current image block, determining a quantization parameter of the current image block according to the coding scheme, and reconstructing the current image block based on the quantization parameter, the quantization coefficient, and the prediction signal to obtain a current reconstructed image block.

20 Claims, 16 Drawing Sheets

(51) Int. Cl.
*H04N 19/132* (2014.01)
*H04N 19/159* (2014.01)
*H04N 19/196* (2014.01)

(56) References Cited

U.S. PATENT DOCUMENTS

| | | | |
|---|---|---|---|
| 2011/0002391 A1 | 1/2011 | Uslubas et al. | |
| 2011/0038416 A1 | 2/2011 | Zhou et al. | |
| 2013/0330012 A1* | 12/2013 | Sato | H04N 19/124 382/233 |
| 2014/0056349 A1* | 2/2014 | Aoki | H04N 19/50 375/240.12 |
| 2017/0013261 A1 | 1/2017 | Lin et al. | |
| 2018/0192076 A1 | 7/2018 | Ikai et al. | |

FOREIGN PATENT DOCUMENTS

| | | |
|---|---|---|
| CN | 102625104 A | 8/2012 |
| CN | 103416060 A | 11/2013 |
| CN | 104754361 A | 7/2015 |
| EP | 2685723 A1 | 1/2014 |
| WO | 2016203981 A1 | 12/2016 |

OTHER PUBLICATIONS

Li, Y., et al., "Convolutional Neural Network-Based Block Up-Sampling for Intra Frame Coding," XP055610817, IEEE Transactions on Circuits and Systems for Video Technology, vol. 28, No. 9, Sep. 2018, pp. 2316-2330.

Sze, V., et al., "High Efficiency Video Coding (HEVC)," In: "High Efficiency Video Coding (HEVC)", XP055614236, Aug. 23, 2014, Springer International Publishing, 384 pages.

Choi, W., et al. "Macroblock-level adaptive dynamic resolution conversion technique," Proc. of SPIE, vol. 6391, 2006, 3 pages.

"Series H: Audiovisual and Multimedia Systems, Infrastructure of audiovisual services—Coding of moving video, High efficiency video coding," ITU-T H.265, Dec. 2016, 664 pages.

"Series H: Audiovisual and Multimedia Systems, Infrastructure of audiovisual services—Coding of moving video, Advanced video coding for generic audiovisual services," ITU-T H.264, Apr. 2017, 812 pages.

* cited by examiner

| $R_{0,0}$ | $R_{1,0}$ | $R_{2,0}$ | ... | $R_{N,0}$ | $R_{N+1,0}$ | $R_{N+2,0}$ | ... | $R_{2N+1,0}$ |
|---|---|---|---|---|---|---|---|---|
| $R_{0,1}$ | $P_{1,1}$ | $P_{2,1}$ | ... | $P_{N,1}$ | | | | |
| $R_{0,2}$ | $P_{1,2}$ | ⋱ | | ⋮ | | | | |
| ⋮ | ⋮ | | | | | | | |
| $R_{0,N}$ | $P_{1,N}$ | ... | | $P_{N,N}$ | | | | |
| $R_{0,N+1}$ | | | | | | | | |
| $R_{0,N+2}$ | | | | | | | | |
| ⋮ | | | | | | | | |
| $R_{0,2N}$ | | | | | | | | |

Obtain a first quantization parameter of a current image area in an original resolution coding scheme, a second quantization parameter of the current image area in a downsampling coding scheme, a coding scheme of a current to-be-coded image block in the current image area, a coded signal of the current to-be-coded image block, and a prediction signal of the current to-be-coded image block  S1501

Determine a quantization parameter of the current to-be-coded image block according to the coding scheme of the current to-be-coded image block, where the quantization parameter of the current to-be-reconstructed image block is a first quantization parameter or a second quantization parameter, or the quantization parameter of the current to-be-reconstructed image block is a quantization parameter obtained by correcting the first quantization parameter or a quantization parameter obtained by correcting the second quantization parameter 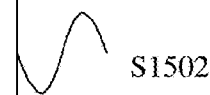 S1502

Generate a residual signal of the current to-be-coded image block based on the prediction signal and the coded signal 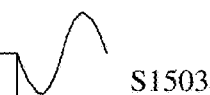 S1503

Code the residual signal based on the quantization parameter of the current to-be-reconstructed image block 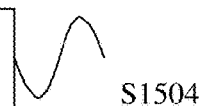 S1504

FIG. 15

IMAGE PROCESSING METHOD, DEVICE, AND SYSTEM

This application is a continuation of International Patent Application No. PCT/CN2018/081661 filed on Apr. 3, 2018, which claims priority to Chinese Patent Application No. 201710614141.6 filed on Jul. 25, 2017. The disclosures of the aforementioned applications are hereby incorporated by reference in their entireties.

TECHNICAL FIELD

This disclosure relates to image processing technologies, and in particular, to an image processing method, device, and system.

BACKGROUND

A digital video is a video recorded in a digital form. FIG. 1 is a schematic diagram of a digital video according to this disclosure. As shown in FIG. 1, the digital video includes a plurality of frames of digital images. FIG. 2 is a schematic diagram of a digital image according to this disclosure. As shown in FIG. 2, the image includes 12×16 pixels. Each pixel is referred to as one pixel, and 12×16 represents an image resolution. For example, an image resolution of a 2K video is 1920×1080, and an image resolution of a 4K video is 3840×2160. An original video usually includes a relatively large amount of data, which is not suitable for storage and transmission. Therefore, a high-efficiency video compression coding technology needs to be used to compress original data.

Further, FIG. 3 is a schematic diagram of coding performed by an encoder side according to this disclosure. As shown in FIG. 3, the coding procedure performed by the encoder side includes after receiving a video, the encoder side divides each frame of image that constitutes the video into a plurality of to-be-coded image blocks. For a current to-be-coded image block, the current to-be-coded image block is first predicted using a reference reconstructed image block (the reference reconstructed image block is configured to provide a reference pixel required by the current to-be-coded image block, and the reference pixel is used to predict the current to-be-coded image block) to obtain a prediction signal of the current to-be-coded image block. The prediction signal is subtracted from an original signal of the current to-be-coded image block to obtain a residual signal. After the prediction, an amplitude of the residual signal is far less than that of the original signal. A transform operation (the transform operation is an optional operation) and a quantization operation are performed on the residual signal. A quantization coefficient is obtained after the transform and quantization, and then the quantization coefficient and another indication information that is used during coding are coded using an entropy coding technology to obtain a code stream. Further, the encoder side needs to reconstruct the current to-be-coded image block to provide a reference pixel for coding a subsequent to-be-coded image block. Further, after obtaining the quantization coefficient of the current to-be-coded image block, the encoder side needs to perform dequantization and inverse transform on the quantization coefficient of the current to-be-coded image block to obtain a reconstructed residual signal, add the reconstructed residual signal and the prediction signal corresponding to the current to-be-coded image block to obtain a reconstruction signal of the current to-be-coded image block, and obtain a reconstructed image block based on the reconstruction signal. The reconstructed image block may be used to predict the subsequently to-be-coded image block. Optionally, a transform coefficient is obtained after the residual signal is transformed, an information loss occurs after the transform coefficient is quantized, and the information loss is irreversible. That is, a distortion occurs after the transform coefficient is dequantized, and consequently the reconstruction signal is inconsistent with the original signal. Such a compression manner is lossy compression. Therefore, for the lossy compression, after the reconstructed image block is obtained, filtering needs to be performed on the reconstructed image block to eliminate some distortions caused by the lossy compression, for example, blocking artifacts and a ringing effect. The blocking artifacts may be eliminated using a Deblocking (DBK) filter in the H.264 or H.265 standard, and the ringing effect may be eliminated using a sample adaptive offset (SAO) filter in H.265, an Alfa Laval Filter (ALF) filter in a next generation standard, or the like. A lossless compression method also exists. To be specific, a lossless transform operation is performed on a residual signal to obtain a transform coefficient, and entropy coding is performed on the transform coefficient without performing a quantization operation. For the lossless compression, a filtering operation is usually not performed. Further, a reconstructed image is obtained after all image blocks of a current image are reconstructed, and the reconstructed image may be used to subsequently predict another frame of image.

FIG. 4 is a schematic diagram of decoding performed by a decoder side according to this disclosure. As shown in FIG. 4, after obtaining the code stream, the decoder side first performs entropy decoding on the code stream to obtain a quantization coefficient of a current to-be-reconstructed image block, and then performs dequantization and inverse transform on the quantization coefficient to obtain a reconstructed residual signal of the current to-be-reconstructed image block. The current to-be-reconstructed image block is predicted using a reference reconstructed image block of the current to-be-reconstructed image block to obtain a prediction signal of the current to-be-reconstructed image block. The prediction signal and the reconstructed residual signal are added to obtain a reconstruction signal of the current to-be-reconstructed image block. A current reconstructed image block corresponding to the current to-be-reconstructed image block is obtained based on the reconstruction signal. The current reconstructed image block may be used to subsequently predict another to-be-reconstructed image block. This is similar to the foregoing case of the encoder side. Optionally, the decoder side needs to perform filtering on the current reconstructed image block. Further, a reconstructed image is obtained after all image blocks of a current image are reconstructed, and the reconstructed image may be used to subsequently predict another frame of image.

To make coding and decoding easier, the encoder side first performs downsampling processing on each frame of image. FIG. 5 is a schematic diagram of coding performed by an encoder side according to this disclosure. As shown in FIG. 5, the encoder side performs downsampling processing on an entire image, and then codes each to-be-coded image block in an image obtained after the downsampling processing to obtain a code stream. A resolution of a reconstructed image block corresponding to each to-be-coded image block is a downsampling resolution. Correspondingly, the decoder side parses the code stream. A resolution of each to-be-reconstructed image block is a downsampling resolution, and a corresponding resolution of an obtained reconstructed image block is also a downsampling resolution. The decoder side needs to perform upsampling processing on the reconstructed image block to obtain a reconstructed image block of an original resolution.

In the other approaches, the encoder side performs downsampling processing on the entire image. However, all image blocks included in the entire image may have different features. For example, some image blocks may be relatively flat. In this case, the encoder side can perform downsampling processing on the image blocks. Some image blocks may have many details. In this case, these details are lost if downsampling processing is performed. Consequently, an effect of coding performed by the encoder side is poor, and correspondingly some reconstructed image blocks obtained by the decoder side are relatively blur. That is, an effect of a reconstructed image block obtained by the decoder side is poor.

SUMMARY

This disclosure provides an image processing method, device, and system such that a reconstructed image block obtained by a decoder side has a better effect, and an encoder side implements a better coding effect.

According to a first aspect, this disclosure provides an image processing method, including parsing a code stream to obtain a first quantization parameter of a current image area in an original resolution coding scheme, a second quantization parameter of the current image area in a downsampling coding scheme, a coding scheme of a current to-be-reconstructed image block in the current image area, a quantization coefficient of the current to-be-reconstructed image block, and a prediction signal of the current to-be-reconstructed image block, where the coding scheme of the current to-be-reconstructed image block is the original resolution coding scheme or the downsampling coding scheme, and the current to-be-reconstructed image block is a part of the current image area, determining a quantization parameter of the current to-be-reconstructed image block according to the coding scheme of the current to-be-reconstructed image block, where the quantization parameter of the current to-be-reconstructed image block is the first quantization parameter or the second quantization parameter, and reconstructing the current to-be-reconstructed image block based on the quantization parameter, the quantization coefficient, and the prediction signal of the current to-be-reconstructed image block to obtain a current reconstructed image block.

A beneficial effect of this disclosure is as follows. Considering that image blocks have respective features, an encoder side differently codes the image blocks. Based on this, a decoder side may determine the quantization parameter of the current to-be-reconstructed image block according to the coding scheme of the current to-be-reconstructed image block. That is, the quantization parameter is pertinent for reconstructing the current to-be-reconstructed image block. Therefore, a reconstructed image block obtained by the decoder side has a better effect.

Optionally, the code stream includes the first quantization parameter and the second quantization parameter.

Alternatively, the code stream includes the first quantization parameter and a quantization parameter prediction difference of the current image area. Correspondingly, obtaining a second quantization parameter of the current image area in a downsampling coding scheme includes calculating the second quantization parameter based on the first quantization parameter and the quantization parameter prediction difference.

A beneficial effect of this disclosure is that the quantization parameter prediction difference is less than the second quantization parameter. Therefore, this manner can reduce bit overheads of the encoder side.

Optionally, determining a quantization parameter of the current to-be-reconstructed image block according to the coding scheme of the current to-be-reconstructed image block includes, if the coding scheme of the current to-be-reconstructed image block is the original resolution coding scheme, using the first quantization parameter as the quantization parameter of the current to-be-reconstructed image block, or if the coding scheme of the current to-be-reconstructed image block is the downsampling coding scheme, using the second quantization parameter as the quantization parameter of the current to-be-reconstructed image block.

According to a second aspect, this disclosure provides an image processing method, including parsing a code stream to obtain a quantization parameter prediction difference of a current to-be-reconstructed image block, a quantization coefficient of the current to-be-reconstructed image block, a coding scheme of the current to-be-reconstructed image block, and a prediction signal of the current to-be-reconstructed image block, where the coding scheme is an original resolution coding scheme or a downsampling coding scheme, determining a quantization parameter predictor of the current to-be-reconstructed image block according to the coding scheme of the current to-be-reconstructed image block, determining a quantization parameter of the current to-be-reconstructed image block based on the quantization parameter predictor and the quantization parameter prediction difference of the current to-be-reconstructed image block, and reconstructing the current to-be-reconstructed image block based on the quantization parameter, the quantization coefficient, and the prediction signal of the current to-be-reconstructed image block a current reconstructed image block.

A beneficial effect of this disclosure is as follows. Considering that image blocks have respective features, an encoder side differently codes the image blocks. Based on this, a decoder side may determine the quantization parameter predictor of the current to-be-reconstructed image block according to the coding scheme of the current to-be-reconstructed image block, and determine the quantization parameter of the current to-be-reconstructed image block based on the quantization parameter predictor and the quantization parameter prediction difference of the current to-be-reconstructed image block. That is, the quantization parameter is pertinent for reconstructing the current to-be-reconstructed image block. Therefore, a reconstructed image block obtained by the decoder side has a better effect.

Optionally, determining a quantization parameter predictor of the current to-be-reconstructed image block according to the coding scheme of the current to-be-reconstructed image block includes selecting M reconstructed image blocks according to a preset rule, and obtaining quantization parameters of the M reconstructed image blocks and coding schemes of the M reconstructed image blocks, where the M reconstructed image blocks belong to a same current image area as the current to-be-reconstructed image block, and M is a positive integer, and determining the quantization parameter predictor of the current to-be-reconstructed image block according to the coding scheme of the current to-be-reconstructed image block and the coding schemes of the M reconstructed image blocks based on the quantization parameters of the M reconstructed image blocks.

The preset rule may be selecting a previous reconstructed image block of the current to-be-reconstructed image block in a decoding sequence, or selecting an upper reconstructed image block and a left reconstructed image block of the current to-be-reconstructed image block, or selecting, in a decoding sequence from reconstructed image blocks falling within a preset range, a reconstructed image block that has a same coding scheme as the current to-be-reconstructed image block and that is closest to the current to-be-reconstructed image block. It should be noted that the preset rule is not limited in this disclosure.

A beneficial effect of this disclosure is as follows. This method can be used to effectively and accurately determine the quantization parameter predictor of the current to-be-reconstructed image block.

Optionally, the M reconstructed image blocks are one reconstructed image block, and determining the quantization parameter predictor of the current to-be-reconstructed image block according to the coding scheme of the current to-be-reconstructed image block and the coding schemes of the M reconstructed image blocks based on the quantization parameters of the M reconstructed image blocks includes, if a coding scheme of the one reconstructed image block is the same as the coding scheme of the current to-be-reconstructed image block, determining a quantization parameter of the one reconstructed image block as the quantization parameter predictor of the current to-be-reconstructed image block, or if the coding scheme of the one reconstructed image block is different from the coding scheme of the current to-be-reconstructed image block, determining the quantization parameter predictor of the current to-be-reconstructed image block according to the coding scheme of the one reconstructed image block and the coding scheme of the current to-be-reconstructed image block based on a first quantization parameter and a second quantization parameter. The first quantization parameter is a quantization parameter that is of the current image area in the original resolution coding scheme and that is obtained by parsing the code stream. The second quantization parameter is a quantization parameter that is of the current image area in the downsampling coding scheme and that is obtained by parsing the code stream. The current to-be-reconstructed image block is a part of the current image area.

Optionally, determining the quantization parameter predictor of the current to-be-reconstructed image block according to the coding scheme of the one reconstructed image block and the coding scheme of the current to-be-reconstructed image block based on a first quantization parameter and a second quantization parameter includes, if the coding scheme of the one reconstructed image block is the downsampling coding scheme, and the coding scheme of the current to-be-reconstructed image block is the original resolution coding scheme, subtracting the second quantization parameter from the first quantization parameter to obtain a quantization difference, and calculating a sum of the quantization parameter of the one reconstructed image block and the quantization difference to obtain the quantization parameter predictor, or if the coding scheme of the one reconstructed image block is the original resolution coding scheme, and the coding scheme of the current to-be-reconstructed image block is the downsampling coding scheme, subtracting the second quantization parameter from the first quantization parameter to obtain the quantization difference, and calculating a difference between the quantization parameter of the one reconstructed image block and the quantization difference to obtain the quantization parameter predictor.

Optionally, the one reconstructed image block is a previous reconstructed image block of the current to-be-reconstructed image block in a decoding sequence.

Optionally, M is greater than 1, and determining the quantization parameter predictor of the current to-be-reconstructed image block according to the coding scheme of the current to-be-reconstructed image block and the coding schemes of the M reconstructed image blocks based on the quantization parameters of the M reconstructed image blocks includes, if the coding schemes of the M reconstructed image blocks each are the same as the coding scheme of the current to-be-reconstructed image block, determining an average of the quantization parameters of the M reconstructed image blocks as the quantization parameter predictor of the current to-be-reconstructed image block, or if a coding scheme of one reconstructed image block is different from the coding scheme of the current to-be-reconstructed image block, determining the quantization parameter predictor of the current to-be-reconstructed image block according to the coding schemes of the M reconstructed image blocks and the coding scheme of the current to-be-reconstructed image block based on a first quantization parameter and a second quantization parameter. The first quantization parameter is a quantization parameter that is of the current image area in the original resolution coding scheme and that is obtained by parsing the code stream. The second quantization parameter is a quantization parameter that is of the current image area in the downsampling coding scheme and that is obtained by parsing the code stream. The current to-be-reconstructed image block is a part of the current image area.

Optionally, determining the quantization parameter predictor of the current to-be-reconstructed image block according to the coding schemes of the M reconstructed image blocks and the coding scheme of the current to-be-reconstructed image block based on a first quantization parameter and a second quantization parameter includes, if the M reconstructed image blocks include a reconstructed image block coded using the downsampling coding scheme, and the coding scheme of the current to-be-reconstructed image block is the original resolution coding scheme, calculating, based on the first quantization parameter, the second quantization parameter, and a quantization parameter of the reconstructed image block coded using the downsampling coding scheme, a corrected quantization parameter of the reconstructed image block coded using the downsampling coding scheme, and determining the average of the quantization parameters of the M reconstructed image blocks based on the corrected quantization parameter of the reconstructed image block coded using the downsampling coding scheme, where the average is the quantization parameter predictor of the current to-be-reconstructed image block, or if the M reconstructed image blocks include a reconstructed image block coded using the original resolution coding scheme, and the coding scheme of the current to-be-reconstructed image block is the downsampling coding scheme, calculating, based on the first quantization parameter, the second quantization parameter, and a quantization parameter of the reconstructed image block coded using the original resolution coding scheme, a corrected quantization parameter of the reconstructed image block coded using the original resolution coding scheme, and determining the average of the quantization parameters of the M reconstructed image blocks based on the corrected quantization parameter of the reconstructed image block coded using the original resolution coding scheme, where the average is the quantization parameter predictor of the current to-be-reconstructed image block.

Optionally, calculating, based on the first quantization parameter, the second quantization parameter, and a quantization parameter of the reconstructed image block coded using the downsampling coding scheme, a corrected quantization parameter of the reconstructed image block coded using the downsampling coding scheme includes subtracting the second quantization parameter from the first quantization parameter to obtain a quantization difference, and calculating a sum of the quantization difference and the quantization parameter of the reconstructed image block coded using the downsampling coding scheme to obtain the corrected quantization parameter of the reconstructed image block coded using the downsampling coding scheme.

A beneficial effect of this disclosure is as follows. This method can be used to effectively and accurately calculate the corrected quantization parameter of the reconstructed image block coded using the downsampling coding scheme.

Optionally, calculating, based on the first quantization parameter, the second quantization parameter, and a quantization parameter of the reconstructed image block coded using the original resolution coding scheme, a corrected quantization parameter of the reconstructed image block coded using the original resolution coding scheme includes subtracting the second quantization parameter from the first quantization parameter to obtain the quantization difference, and calculating a difference between the quantization difference and the quantization parameter of the reconstructed image block coded using the original resolution coding scheme to obtain the corrected quantization parameter of the reconstructed image block coded using the original resolution coding scheme.

A beneficial effect of this disclosure is as follows. This method can be used to effectively and accurately calculate the corrected quantization parameter of the reconstructed image block coded using the original resolution coding scheme.

Optionally, the M reconstructed image blocks include an upper reconstructed image block and a left reconstructed image block of the current to-be-reconstructed image block.

Optionally, the M reconstructed image blocks are one reconstructed image block, and obtaining quantization parameters of the M reconstructed image blocks and coding schemes of the M reconstructed image blocks includes searching reconstructed image blocks falling within a preset range for a reconstructed image block having a same coding scheme as the current to-be-reconstructed image block, and obtaining a quantization parameter of the one reconstructed image block. Correspondingly, determining the quantization parameter predictor of the current to-be-reconstructed image block according to the coding scheme of the current to-be-reconstructed image block and the coding schemes of the M reconstructed image blocks based on the quantization parameters of the M reconstructed image blocks includes using the quantization parameter of the one reconstructed image block as the quantization parameter predictor of the current to-be-reconstructed image block.

Optionally, the one reconstructed image block is a reconstructed image block that is in the reconstructed image blocks falling within the preset range and that is closest to the current to-be-reconstructed image block in a decoding sequence.

Optionally, determining a quantization parameter predictor of the current to-be-reconstructed image block according to the coding scheme of the current to-be-reconstructed image block includes, if the coding scheme of the current to-be-reconstructed image block is the original resolution coding scheme, using a first quantization parameter as the quantization parameter predictor of the current to-be-reconstructed image block, or if the coding scheme of the current to-be-reconstructed image block is the downsampling coding scheme, using a second quantization parameter as the quantization parameter predictor of the current to-be-reconstructed image block. The first quantization parameter is a quantization parameter that is of a current image area in the original resolution coding scheme and that is obtained by parsing the code stream. The second quantization parameter is a quantization parameter that is of the current image area in the downsampling coding scheme and that is obtained by parsing the code stream. The current to-be-reconstructed image block is a part of the current image area.

Optionally, determining a quantization parameter predictor of the current to-be-reconstructed image block according to the coding scheme of the current to-be-reconstructed image block includes, if the coding scheme of the current to-be-reconstructed image block is the original resolution coding scheme, correcting a first quantization parameter based on the quantization parameter prediction difference to obtain the quantization parameter predictor of the current to-be-reconstructed image block, or if the coding scheme of the current to-be-reconstructed image block is the downsampling coding scheme, correcting a second quantization parameter based on the quantization parameter prediction difference to obtain the quantization parameter predictor of the current to-be-reconstructed image block. The first quantization parameter is a quantization parameter that is of a current image area in the original resolution coding scheme and that is obtained by parsing the code stream. The second quantization parameter is a quantization parameter that is of the current image area in the downsampling coding scheme and that is obtained by parsing the code stream. The current to-be-reconstructed image block is a part of the current image area.

According to a third aspect, this disclosure provides an image processing method, including obtaining a first quantization parameter of a current image area in an original resolution coding scheme, a second quantization parameter of the current image area in a downsampling coding scheme, a coding scheme of a current to-be-coded image block in the current image area, a coded signal of the current to-be-coded image block, and a prediction signal of the current to-be-coded image block, where the coding scheme of the current to-be-coded image block is the original resolution coding scheme or the downsampling coding scheme, and when the coding scheme of the current to-be-coded image block is the original resolution coding scheme, the coded signal is an original signal of the current to-be-coded image block, or when the coding scheme of the current to-be-coded image block is the downsampling coding scheme, the coded signal is a signal obtained after downsampling processing is performed on the original signal of the current to-be-coded image block, determining a quantization parameter of the current to-be-coded image block according to the coding scheme of the current to-be-coded image block, where the quantization parameter of the current to-be-coded image block is the first quantization parameter or the second quantization parameter, or the quantization parameter of the current to-be-coded image block is a quantization parameter obtained by correcting the first quantization parameter or a quantization parameter obtained by correcting the second quantization parameter, generating a residual signal of the current to-be-coded image block based on the prediction signal and the coded signal, and coding the residual signal based on the quantization parameter of the current to-be-coded image block.

A beneficial effect of this disclosure is as follows. Considering that image blocks have respective features, an encoder side differently codes the image blocks. Based on this, the encoder side may determine the quantization parameter of the current to-be-coded image block according to the coding scheme of the current to-be-coded image block. That is, the quantization parameter is pertinent for coding the current to-be-coded image block. Therefore, the encoder side implements a better coding effect.

Optionally, obtaining a second quantization parameter of the current image area in a downsampling coding scheme includes obtaining a quantization parameter prediction difference of the current image area, and calculating the second quantization parameter based on the first quantization parameter and the quantization parameter prediction difference.

Optionally, obtaining a coding scheme of a current to-be-coded image block includes determining, based on the first quantization parameter, first coding costs used when the original resolution coding scheme is used for the current to-be-coded image block, determining, based on the second quantization parameter, second coding costs used when the downsampling coding scheme is used for the current to-be-coded image block, and using a coding scheme corresponding to a lowest coding cost in the first coding costs and the second coding costs as the coding scheme of the current to-be-coded image block.

A beneficial effect of this disclosure is as follows. This method can be used to select a coding scheme with a lowest coding cost, and this makes coding easier.

Optionally, determining a quantization parameter of the current to-be-coded image block according to the coding scheme of the current to-be-coded image block includes, if the coding scheme of the current to-be-coded image block is the original resolution coding scheme, determining the quantization parameter of the current to-be-coded image block as the first quantization parameter, or if the coding scheme of the current to-be-coded image block is the downsampling coding scheme, determining the quantization parameter of the current to-be-coded image block as the second quantization parameter.

Optionally, the method further includes generating a code stream. The code stream includes the first quantization parameter, the second quantization parameter, and the coding scheme of the current to-be-coded image block, or the code stream includes the first quantization parameter, the quantization parameter prediction difference of the current image area, and the coding scheme of the current to-be-coded image block.

A beneficial effect of this disclosure is that the quantization parameter prediction difference is less than the second quantization parameter. Therefore, this manner can reduce bit overheads of the encoder side.

Optionally, obtaining a coding scheme of a current to-be-coded image block includes correcting the first quantization parameter for at least one time to obtain at least one third quantization parameter, and correcting the second quantization parameter for at least one time to obtain at least one fourth quantization parameter, determining, based on the third quantization parameters, third coding costs used when the original resolution coding scheme is used for the current to-be-coded image block, and determining, based on the fourth quantization parameters, fourth coding costs used when the downsampling coding scheme is used for the current to-be-coded image block, and using a coding scheme corresponding to a lowest coding cost in the third coding costs and the fourth coding costs as the coding scheme of the current to-be-coded image block.

A beneficial effect of this disclosure is as follows. This method can be used to select a coding scheme with a lowest coding cost, and this makes coding easier.

Optionally, determining a quantization parameter of the current to-be-coded image block according to the coding scheme of the current to-be-coded image block includes, if the coding scheme of the current to-be-coded image block is the original resolution coding scheme, determining a third quantization parameter with a lowest coding cost in the at least one third quantization parameter as the quantization parameter of the current to-be-coded image block, or if the coding scheme of the current to-be-coded image block is the downsampling coding scheme, determining a fourth quantization parameter with a lowest coding cost in the at least one fourth quantization parameter as the quantization parameter of the current to-be-coded image block.

Optionally, the method further includes obtaining a quantization parameter predictor of the current to-be-coded image block, calculating a quantization parameter prediction difference of the current to-be-coded image block based on the quantization parameter predictor and the quantization parameter of the current to-be-coded image block, and generating a code stream, where the code stream includes the coding scheme of the current to-be-coded image block and the quantization parameter prediction difference of the current to-be-coded image block.

A beneficial effect of this disclosure is that the quantization parameter prediction difference is less than the quantization parameter. Therefore, this manner can reduce bit overheads of the encoder side.

Optionally, obtaining a quantization parameter predictor of the current to-be-coded image block includes selecting M reconstructed image blocks according to a preset rule, and obtaining quantization parameters of the M reconstructed image blocks and coding schemes of the M reconstructed image blocks, where the M reconstructed image blocks belong to the same current image area as the current to-be-coded image block, and M is a positive integer, and determining the quantization parameter predictor of the current to-be-coded image block according to the coding scheme of the current to-be-coded image block and the coding schemes of the M reconstructed image blocks based on the quantization parameters of the M reconstructed image blocks.

A beneficial effect of this disclosure is as follows. This method can be used to effectively and accurately determine the quantization parameter predictor of the current to-be-coded image block.

Optionally, the M reconstructed image blocks are one reconstructed image block, and determining the quantization parameter predictor of the current to-be-coded image block according to the coding scheme of the current to-be-coded image block and the coding schemes of the M reconstructed image blocks based on the quantization parameters of the M reconstructed image blocks includes, if a coding scheme of the one reconstructed image block is the same as the coding scheme of the current to-be-coded image block, determining a quantization parameter of the one reconstructed image block as the quantization parameter predictor of the current to-be-coded image block, or if the coding scheme of the one reconstructed image block is different from the coding scheme of the current to-be-coded image block, determining the quantization parameter predictor of the current to-be-coded image block according to the coding scheme of the one reconstructed image block and the coding scheme of the current to-be-coded image block based on the first quantization parameter and the second quantization parameter.

Optionally, determining the quantization parameter predictor of the current to-be-coded image block according to the coding scheme of the one reconstructed image block and the coding scheme of the current to-be-coded image block based on the first quantization parameter and the second quantization parameter includes, if the coding scheme of the one reconstructed image block is the downsampling coding scheme, and the coding scheme of the current to-be-coded image block is the original resolution coding scheme, subtracting the second quantization parameter from the first quantization parameter to obtain a quantization difference, and calculating a sum of the quantization parameter of the one reconstructed image block and the quantization difference to obtain the quantization parameter predictor, or if the coding scheme of the one reconstructed image block is the original resolution coding scheme, and the coding scheme of the current to-be-coded image block is the downsampling coding scheme, subtracting the second quantization parameter from the first quantization parameter to obtain the quantization difference, and calculating a difference between the quantization parameter of the one reconstructed image block and the quantization difference to obtain the quantization parameter predictor.

Optionally, the one reconstructed image block is a previous reconstructed image block of the current to-be-coded image block in a coding sequence.

Optionally, M is greater than 1, and determining the quantization parameter predictor of the current to-be-coded image block according to the coding scheme of the current to-be-coded image block and the coding schemes of the M reconstructed image blocks based on the quantization parameters of the M reconstructed image blocks includes, if the coding schemes of the M reconstructed image blocks each are the same as the coding scheme of the current to-be-coded image block, determining an average of the quantization parameters of the M reconstructed image blocks as the quantization parameter predictor of the current to-be-coded image block, or if a coding scheme of one reconstructed image block is different from the coding scheme of the current to-be-coded image block, determining the quantization parameter predictor of the current to-be-coded image block according to the coding schemes of the M reconstructed image blocks and the coding scheme of the current to-be-coded image block based on the first quantization parameter and the second quantization parameter.

Optionally, determining the quantization parameter predictor of the current to-be-coded image block according to the coding schemes of the M reconstructed image blocks and the coding scheme of the current to-be-coded image block based on the first quantization parameter and the second quantization parameter includes, if the M reconstructed image blocks include a reconstructed image block coded using the downsampling coding scheme, and the coding scheme of the current to-be-coded image block is the original resolution coding scheme, calculating, based on the first quantization parameter, the second quantization parameter, and a quantization parameter of the reconstructed image block coded using the downsampling coding scheme, a corrected quantization parameter of the reconstructed image block coded using the downsampling coding scheme, and determining the average of the quantization parameters of the M reconstructed image blocks based on the corrected quantization parameter of the reconstructed image block coded using the downsampling coding scheme, where the average is the quantization parameter predictor of the current to-be-coded image block, or if the M reconstructed image blocks include a reconstructed image block coded using the original resolution coding scheme, and the coding scheme of the current to-be-coded image block is the downsampling coding scheme, calculating, based on the first quantization parameter, the second quantization parameter, and a quantization parameter of the reconstructed image block coded using the original resolution coding scheme, a corrected quantization parameter of the reconstructed image block coded using the original resolution coding scheme, and determining the average of the quantization parameters of the M reconstructed image blocks based on the corrected quantization parameter of the reconstructed image block coded using the original resolution coding scheme, where the average is the quantization parameter predictor of the current to-be-coded image block.

Optionally, calculating, based on the first quantization parameter, the second quantization parameter, and a quantization parameter of the reconstructed image block coded using the downsampling coding scheme, a corrected quantization parameter of the reconstructed image block coded using the downsampling coding scheme includes subtracting the second quantization parameter from the first quantization parameter to obtain a quantization difference, and calculating a sum of the quantization difference and the quantization parameter of the reconstructed image block coded using the downsampling coding scheme, to obtain the corrected quantization parameter of the reconstructed image block coded using the downsampling coding scheme.

A beneficial effect of this disclosure is as follows. This method can be used to effectively and accurately calculate the corrected quantization parameter of the reconstructed image block coded using the downsampling coding scheme.

Optionally, calculating, based on the first quantization parameter, the second quantization parameter, and a quantization parameter of the reconstructed image block coded using the original resolution coding scheme, a corrected quantization parameter of the reconstructed image block coded using the original resolution coding scheme includes subtracting the second quantization parameter from the first quantization parameter to obtain the quantization difference, and calculating a difference between the quantization difference and the quantization parameter of the reconstructed image block coded using the original resolution coding scheme, to obtain the corrected quantization parameter of the reconstructed image block coded using the original resolution coding scheme.

A beneficial effect of this disclosure is as follows. This method can be used to effectively and accurately calculate the corrected quantization parameter of the reconstructed image block coded using the original resolution coding scheme.

Optionally, the M reconstructed image blocks include an upper reconstructed image block and a left reconstructed image block of the current to-be-coded image block.

Optionally, the M reconstructed image blocks are one reconstructed image block, and the obtaining quantization parameters of the M reconstructed image blocks and coding schemes of the M reconstructed image blocks includes searching reconstructed image blocks falling within a preset range for a reconstructed image block having a same coding scheme as the current to-be-coded image block, and obtaining a quantization parameter of the one reconstructed image block and a coding scheme of the one reconstructed image block. Correspondingly, determining the quantization parameter predictor of the current to-be-coded image block according to the coding scheme of the current to-be-coded image block and the coding schemes of the M reconstructed image blocks based on the quantization parameters of the M reconstructed image blocks includes using the quantization parameter of the one reconstructed image block as the quantization parameter predictor of the current to-be-coded image block.

Optionally, the one reconstructed image block is a reconstructed image block that is in the reconstructed image blocks falling within the preset range and that is closest to the current to-be-coded image block in a coding sequence.

Optionally, obtaining a quantization parameter predictor of the current to-be-coded image block includes obtaining the first quantization parameter of the current image area in the original resolution coding scheme and the second quantization parameter of the current image area in the downsampling coding scheme, and if the coding scheme of the current to-be-coded image block is the original resolution coding scheme, using the first quantization parameter as the quantization parameter predictor of the current to-be-coded image block, or if the coding scheme of the current to-be-coded image block is the downsampling coding scheme, using the second quantization parameter as the quantization parameter predictor of the current to-be-coded image block.

The following describes an image processing device and system. Implementation principles and technical effects of the image processing device and system are similar to the foregoing principles and technical effects, and details are not described herein again.

According to a fourth aspect, this disclosure provides an image processing device, including a parsing module configured to parse a code stream to obtain a first quantization parameter of a current image area in an original resolution coding scheme, a second quantization parameter of the current image area in a downsampling coding scheme, a coding scheme of a current to-be-reconstructed image block in the current image area, a quantization coefficient of the current to-be-reconstructed image block, and a prediction signal of the current to-be-reconstructed image block, where the coding scheme of the current to-be-reconstructed image block is the original resolution coding scheme or the downsampling coding scheme, and the current to-be-reconstructed image block is a part of the current image area, a determining module configured to determine a quantization parameter of the current to-be-reconstructed image block according to the coding scheme of the current to-be-reconstructed image block, where the quantization parameter of the current to-be-reconstructed image block is the first quantization parameter or the second quantization parameter, and a reconstruction module configured to reconstruct the current to-be-reconstructed image block based on the quantization parameter, the quantization coefficient, and the prediction signal of the current to-be-reconstructed image block, to obtain a current reconstructed image block.

According to a fifth aspect, this disclosure provides an image processing device, including a parsing module configured to parse a code stream to obtain a quantization parameter prediction difference of a current to-be-reconstructed image block, a quantization coefficient of the current to-be-reconstructed image block, a coding scheme of the current to-be-reconstructed image block, and a prediction signal of the current to-be-reconstructed image block, where the coding scheme is an original resolution coding scheme or a downsampling coding scheme, a first determining module configured to determine a quantization parameter predictor of the current to-be-reconstructed image block according to the coding scheme of the current to-be-reconstructed image block, a second determining module configured to determine a quantization parameter of the current to-be-reconstructed image block based on the quantization parameter predictor and the quantization parameter prediction difference of the current to-be-reconstructed image block, and a reconstruction module configured to reconstruct the current to-be-reconstructed image block based on the quantization parameter, the quantization coefficient, and the prediction signal of the current to-be-reconstructed image block to obtain a current reconstructed image block.

According to a sixth aspect, this disclosure provides an image processing device, including a first obtaining module configured to obtain a first quantization parameter of a current image area in an original resolution coding scheme, a second quantization parameter of the current image area in a downsampling coding scheme, a coding scheme of a current to-be-coded image block in the current image area, a coded signal of the current to-be-coded image block, and a prediction signal of the current to-be-coded image block, where the coding scheme of the current to-be-coded image block is the original resolution coding scheme or the downsampling coding scheme, and when the coding scheme of the current to-be-coded image block is the original resolution coding scheme, the coded signal is an original signal of the current to-be-coded image block, or when the coding scheme of the current to-be-coded image block is the downsampling coding scheme, the coded signal is a signal obtained after downsampling processing is performed on the original signal of the current to-be-coded image block, a determining module configured to determine a quantization parameter of the current to-be-coded image block according to the coding scheme of the current to-be-coded image block, where the quantization parameter of the current to-be-coded image block is the first quantization parameter or the second quantization parameter, or the quantization parameter of the current to-be-coded image block is a quantization parameter obtained by correcting the first quantization parameter or a quantization parameter obtained by correcting the second quantization parameter, a generation module configured to generate a residual signal of the current to-be-coded image block based on the prediction signal and the coded signal, and a coding module configured to code the residual signal based on the quantization parameter of the current to-be-coded image block.

According to a seventh aspect, this disclosure provides an image processing system, including the image processing device according to the fourth aspect and the image processing device according to the sixth aspect.

According to an eighth aspect, this disclosure provides an image processing system, including the image processing device according to the fifth aspect and the image processing device according to the sixth aspect.

According to a ninth aspect, this disclosure provides an image processing device, and the device includes a decoder configured to perform the following operations of parsing a code stream to obtain a first quantization parameter of a current image area in an original resolution coding scheme, a second quantization parameter of the current image area in a downsampling coding scheme, a coding scheme of a current to-be-reconstructed image block in the current image area, a quantization coefficient of the current to-be-reconstructed image block, and a prediction signal of the current to-be-reconstructed image block, where the coding scheme of the current to-be-reconstructed image block is the original resolution coding scheme or the downsampling coding scheme, and the current to-be-reconstructed image block is a part of the current image area, determining a quantization parameter of the current to-be-reconstructed image block according to the coding scheme of the current to-be-reconstructed image block, where the quantization parameter of the current to-be-reconstructed image block is the first quantization parameter or the second quantization parameter, and reconstructing the current to-be-reconstructed image block based on the quantization parameter, the quantization coefficient, and the prediction signal of the current to-be-reconstructed image block, to obtain a current reconstructed image block.

According to a tenth aspect, this disclosure provides an image processing device, and the device includes a decoder configured to perform the following operations of parsing a code stream to obtain a quantization parameter prediction difference of a current to-be-reconstructed image block, a quantization coefficient of the current to-be-reconstructed image block, a coding scheme of the current to-be-reconstructed image block, and a prediction signal of the current to-be-reconstructed image block, where the coding scheme is an original resolution coding scheme or a downsampling coding scheme, determining a quantization parameter predictor of the current to-be-reconstructed image block according to the coding scheme of the current to-be-reconstructed image block, determining a quantization parameter of the current to-be-reconstructed image block based on the quantization parameter predictor and the quantization parameter prediction difference of the current to-be-reconstructed image block, and reconstructing the current to-be-reconstructed image block based on the quantization parameter, the quantization coefficient, and the prediction signal of the current to-be-reconstructed image block, to obtain a current reconstructed image block.

According to an eleventh aspect, this disclosure provides an image processing device, and the device includes an encoder configured to perform the following operations of obtaining a first quantization parameter of a current image area in an original resolution coding scheme, a second quantization parameter of the current image area in a downsampling coding scheme, a coding scheme of a current to-be-coded image block in the current image area, a coded signal of the current to-be-coded image block, and a prediction signal of the current to-be-coded image block, where the coding scheme of the current to-be-coded image block is the original resolution coding scheme or the downsampling coding scheme, and when the coding scheme of the current to-be-coded image block is the original resolution coding scheme, the coded signal is an original signal of the current to-be-coded image block, or when the coding scheme of the current to-be-coded image block is the downsampling coding scheme, the coded signal is a signal obtained after downsampling processing is performed on the original signal of the current to-be-coded image block, determining a quantization parameter of the current to-be-coded image block according to the coding scheme of the current to-be-coded image block, where the quantization parameter of the current to-be-coded image block is the first quantization parameter or the second quantization parameter, or the quantization parameter of the current to-be-coded image block is a quantization parameter obtained by correcting the first quantization parameter or a quantization parameter obtained by correcting the second quantization parameter, generating a residual signal of the current to-be-coded image block based on the prediction signal and the coded signal, and coding the residual signal based on the quantization parameter of the current to-be-coded image block.

According to a twelfth aspect, this disclosure provides a computer storage medium configured to store a computer software instruction used by the image processing device in the fourth aspect or the ninth aspect, which includes a program designed for performing the fourth aspect or the ninth aspect.

According to a thirteenth aspect, this disclosure provides a computer program product, and the computer program product includes an instruction. When the computer program is executed by a computer, the instruction enables the computer to perform a function performed by the image processing device in the fourth aspect or the ninth aspect.

According to a fourteenth aspect, this disclosure provides a computer storage medium configured to store a computer software instruction used by the image processing device in the fifth aspect or the tenth aspect, which includes a program designed for performing the fifth aspect or the tenth aspect.

According to a fifteenth aspect, this disclosure provides a computer program product, and the computer program product includes an instruction. When the computer program is executed by a computer, the instruction enables the computer to perform a function performed by the image processing device in the fifth aspect or the tenth aspect.

According to a sixteenth aspect, this disclosure provides a computer storage medium configured to store a computer software instruction used by the image processing device in the sixth aspect or the eleventh aspect, which includes a program designed for performing the sixth aspect or the eleventh aspect.

According to a seventeenth aspect, this disclosure provides a computer program product, and the computer program product includes an instruction. When the computer program is executed by a computer, the instruction enables the computer to perform a function performed by the image processing device in the sixth aspect or the eleventh aspect.

In conclusion, this disclosure provides the image processing method, device, and system. Considering that image blocks have respective features, the encoder side differently codes the image blocks. Based on this, the decoder side may determine the quantization parameter of the current to-be-reconstructed image block according to the coding scheme of the current to-be-reconstructed image block. That is, the quantization parameter is pertinent for reconstructing the current to-be-reconstructed image block. Therefore, a reconstructed image block obtained by the decoder side has a better effect. In addition, the encoder side may determine the quantization parameter of the current to-be-coded image block according to the coding scheme of the current to-be-coded image block. That is, the quantization parameter is pertinent for coding the current to-be-coded image block. Therefore, the encoder side implements a better coding effect.

BRIEF DESCRIPTION OF DRAWINGS

FIG. 15 is a flowchart of an image processing method according to still another embodiment of this disclosure;

DESCRIPTION OF EMBODIMENTS

Figure 1:
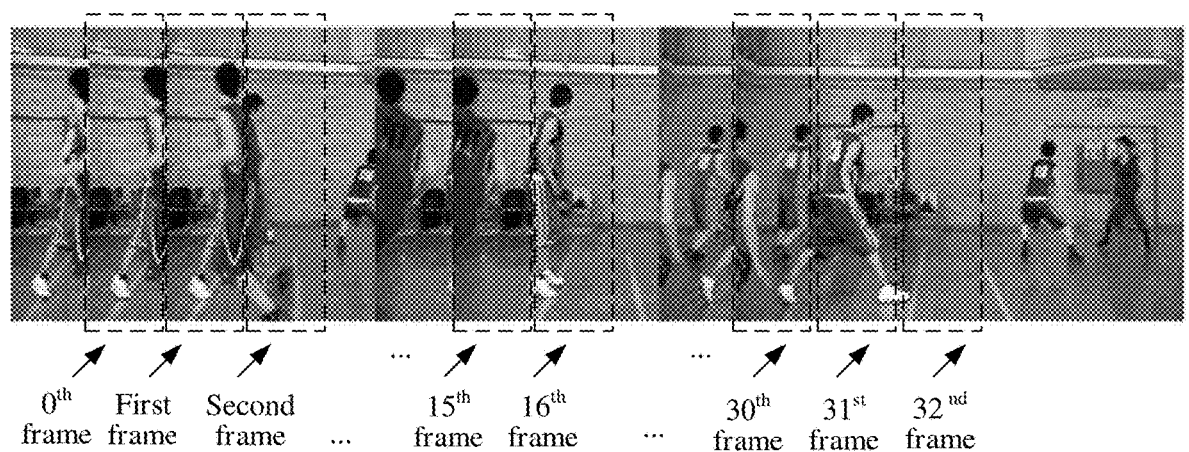
FIG. 1 is a schematic diagram of a digital video according to this disclosure.
Figure 2:
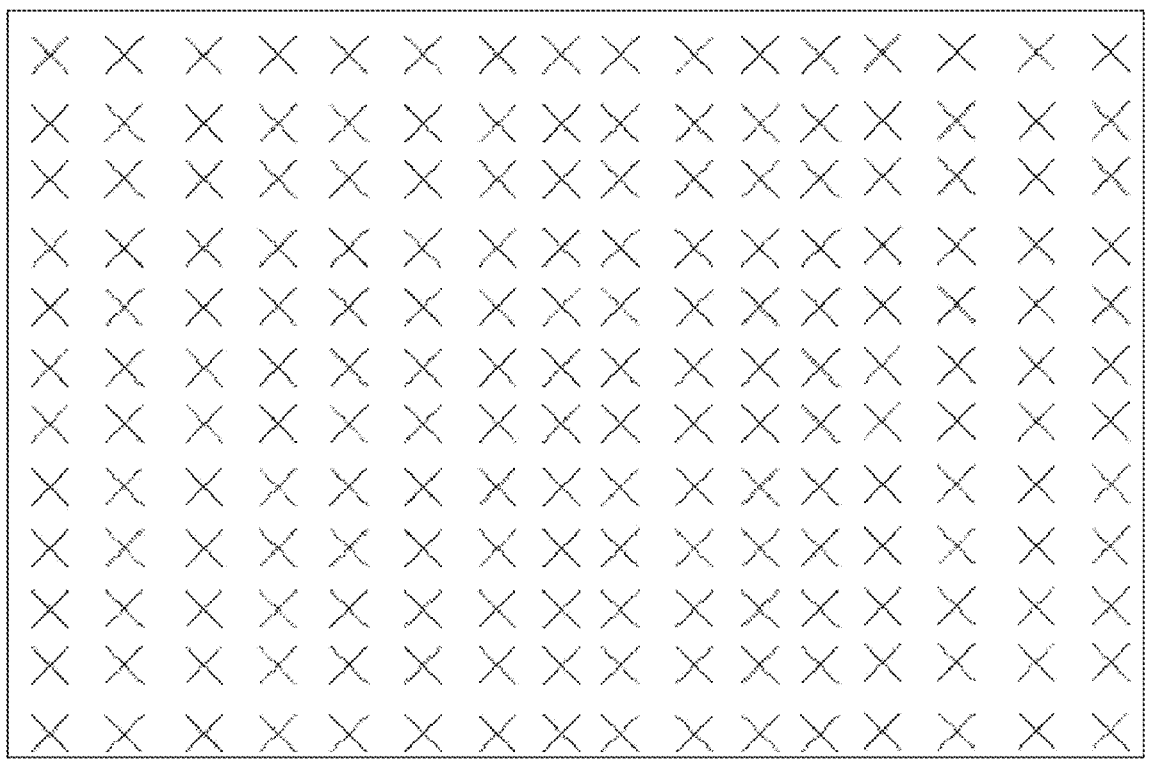
FIG. 2 is a schematic diagram of a digital image according to this disclosure.

The following describes some terms in this disclosure, to facilitate understanding of a person skilled in the art.

A digital video is a video recorded in a digital form. The digital video includes a plurality of frames of digital images. An original video usually includes a relatively large amount of data, which is not suitable for storage and transmission. Therefore, a high-efficiency video compression coding technology needs to be used to compress original data.

The video compression technology implements compression by eliminating a video redundancy. The video redundancy mainly includes a spatial redundancy, a temporal redundancy, a visual redundancy, and an information entropy redundancy.

Spatial redundancy: The spatial redundancy is a main data redundancy in a static image. The spatial redundancy means that adjacent pixels in an image have relatively approximate amplitudes. This spatial coherence is referred to as a spatial correlation or the spatial redundancy. The spatial redundancy is mainly eliminated using an intra-frame prediction method. The intra-frame prediction method means that a pixel in a current reconstructed image block is predicted through a video spatial domain correlation using a pixel in a reference reconstructed image block in order to eliminate a video spatial redundancy.

Temporal redundancy: The temporal redundancy is a redundancy that usually occurs in a video sequence. Adjacent images of a video usually include a same background and moving object or similar backgrounds and moving objects. However, the moving objects are in slightly different spatial locations. Such a high data correlation between adjacent images is referred to as the temporal redundancy. The temporal redundancy is mainly eliminated using an inter-frame prediction technology. The inter-frame prediction technology means that a current pixel is predicted using a pixel of a temporally adjacent image.

Visual redundancy: A human visual system is insensitive to changes of image details. Even if information about the slight changes is lost, human eyes cannot sense the loss. When original video data is recorded, it is usually assumed that the visual system is consistently sensitive to various types of content. Consequently, more data than that generated during ideal coding is generated, and this is referred to as the visual redundancy. The visual redundancy is mainly eliminated using a transform technology and a quantization technology. The transform technology means that frequency analysis is performed on an image sample, the image sample is transformed to frequency domain, and data presentation and bit reallocation are performed based on a magnitude of contribution made by different frequency signals to visual quality. This can correct improper presentation of uniform sampling in spatial domain. In addition, in a bit reallocation process, a requirement for eliminating the visual redundancy is comprehensively considered, and excessively refined representation of a high frequency component is omitted using a quantization operation. This implements effective compression.

Information entropy redundancy: It can be learned from an information theory that a pixel of image data can be represented only by allocating a corresponding quantity of bits based on an information entropy size of the pixel. However, for each pixel of the image data, it is very difficult to obtain an information entropy of the pixel during image obtaining. Therefore, all pixels are usually represented using a same quantity of bits. Consequently, a redundancy is inevitably caused. The information entropy redundancy is mainly eliminated using an entropy coding technology. The entropy coding technology is allocating different quantities of bits to data with different information entropies by collecting statistics about coefficient information entropy distribution.

Figure 3:
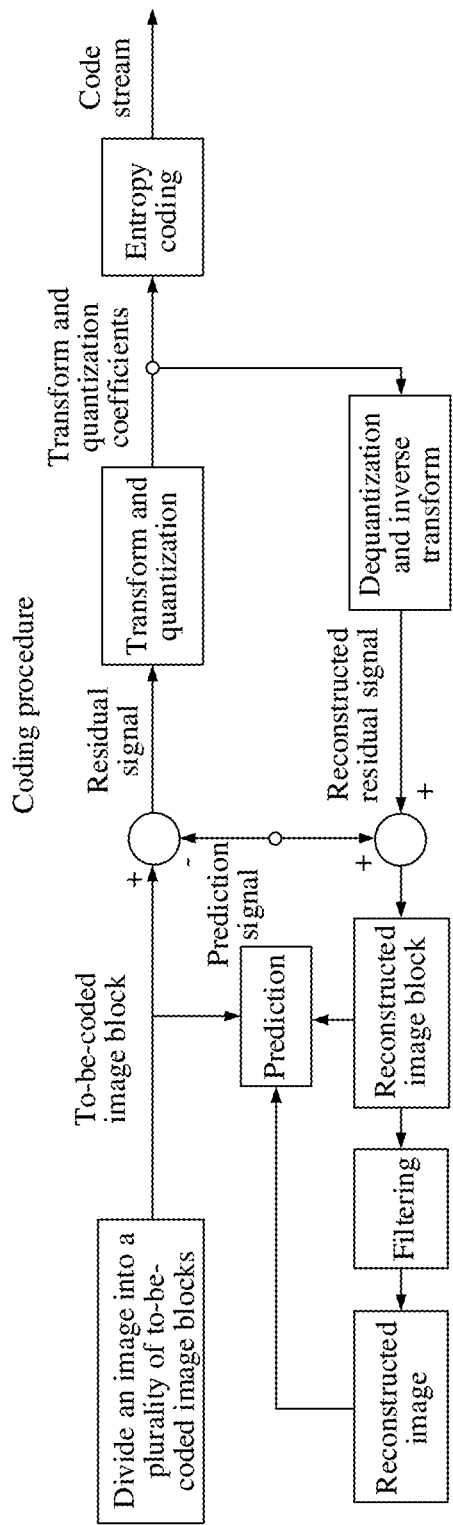
FIG. 3 is a schematic diagram of coding performed by an encoder side according to this disclosure.

A current mainstream video compression coding architecture is a hybrid coding architecture. The foregoing redundancies are eliminated using different technologies, and these technologies are combined to form a hybrid video coding architecture. As shown in FIG. 3, after receiving a video, an encoder side divides each frame of image that constitutes the video into to-be-coded image blocks, and sequentially codes the to-be-coded image blocks. For a current to-be-coded image block, the current to-be-coded image block is first predicted using a reference reconstructed image block to obtain a prediction signal of the current to-be-coded image block. The prediction signal is subtracted from an original signal of the current to-be-coded image block, to obtain a residual signal. After the prediction, an amplitude of the residual signal is far less than that of the original signal. A transform operation (optional operation) and a quantization operation are performed on the residual signal. A quantization coefficient is obtained after the transform and quantization, and then an entropy coding operation is performed on the quantization coefficient through entropy coding such as variable-length coding or binary encoding to obtain a code stream. The code stream usually includes information for dividing a to-be-coded image block, information obtained after entropy coding is performed on an image, and the like. Further, the encoder side needs to reconstruct the current to-be-coded image block to provide a reference pixel for coding a subsequently to-be-coded image block. Further, after obtaining the quantization coefficient of the current to-be-coded image block, the encoder side needs to perform dequantization and inverse transform on the quantization coefficient of the current to-be-coded image block to obtain a reconstructed residual signal, add the reconstructed residual signal and the prediction signal corresponding to the current to-be-coded image block to obtain a reconstruction signal of the current to-be-coded image block, and obtain a reconstructed image block based on the reconstruction signal.

Figure 4:
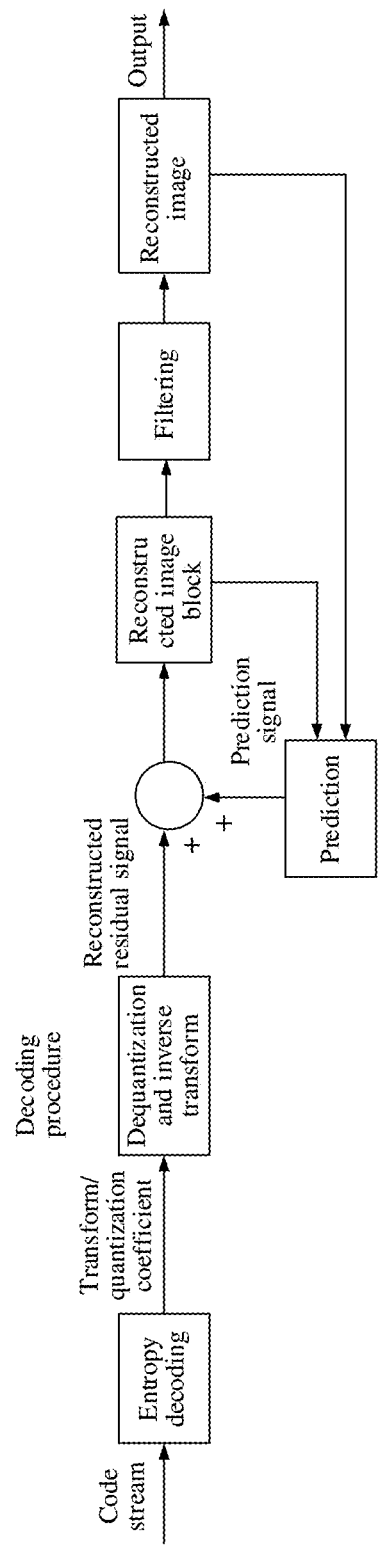
FIG. 4 is a schematic diagram of decoding performed by a decoder side according to this disclosure.

As shown in FIG. 4, after obtaining the code stream, a decoder side first performs entropy decoding on the code stream to obtain a quantization coefficient of a current to-be-reconstructed image block, and then performs dequantization and inverse transform on the quantization coefficient to obtain a reconstructed residual signal of the current to-be-reconstructed image block. The current to-be-reconstructed image block is predicted using a reference reconstructed image block to obtain a prediction signal of the current to-be-reconstructed image block. The prediction signal and the reconstructed residual signal are added to obtain a reconstruction signal of the current to-be-reconstructed image block. A current reconstructed image block corresponding to the current to-be-reconstructed image block is obtained based on the reconstruction signal.

Figure 5:
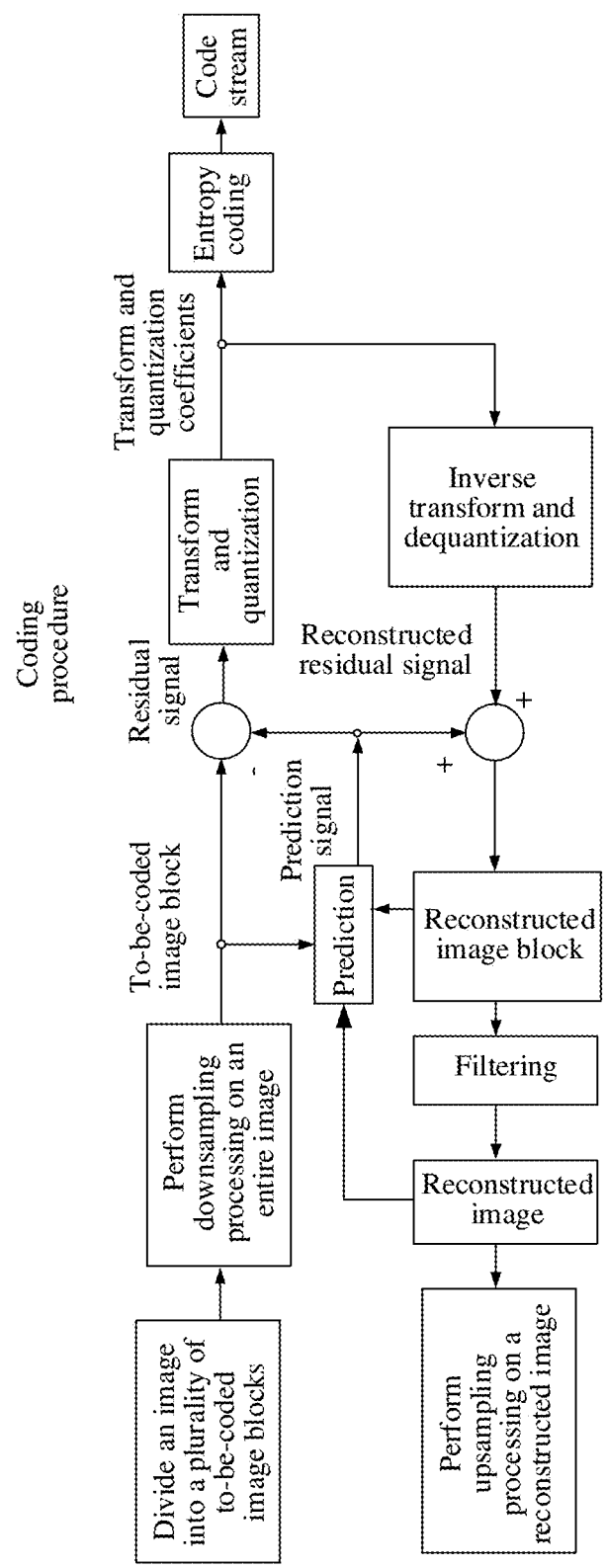
FIG. 5 is a schematic diagram of coding performed by an encoder side according to this disclosure.

To make coding and decoding easier, the encoder side first performs downsampling processing on each frame of image. As shown in FIG. 5, the encoder side performs downsampling processing on an entire image, and then codes each to-be-coded image block in an image obtained after the downsampling processing to obtain a code stream. A resolution of a reconstructed image block corresponding to each to-be-coded image block is a downsampling resolution. Correspondingly, the decoder side parses the code stream. A resolution of each to-be-reconstructed image block is a downsampling resolution, and a corresponding resolution of an obtained reconstructed image block is also a downsampling resolution. The decoder side needs to perform upsampling processing on the reconstructed image block to obtain a reconstructed image block of an original resolution.

Both the encoder side and the decoder side participate in a process of predicting a current reconstructed image block (a current to-be-coded image block or a current to-be-reconstructed image block) using a reference reconstructed image block to obtain a prediction signal of the current reconstructed image block. In this disclosure, a prediction mode (which is mainly the intra-frame prediction method) of the current reconstructed image block may be as follows.

Figures 6, 7:
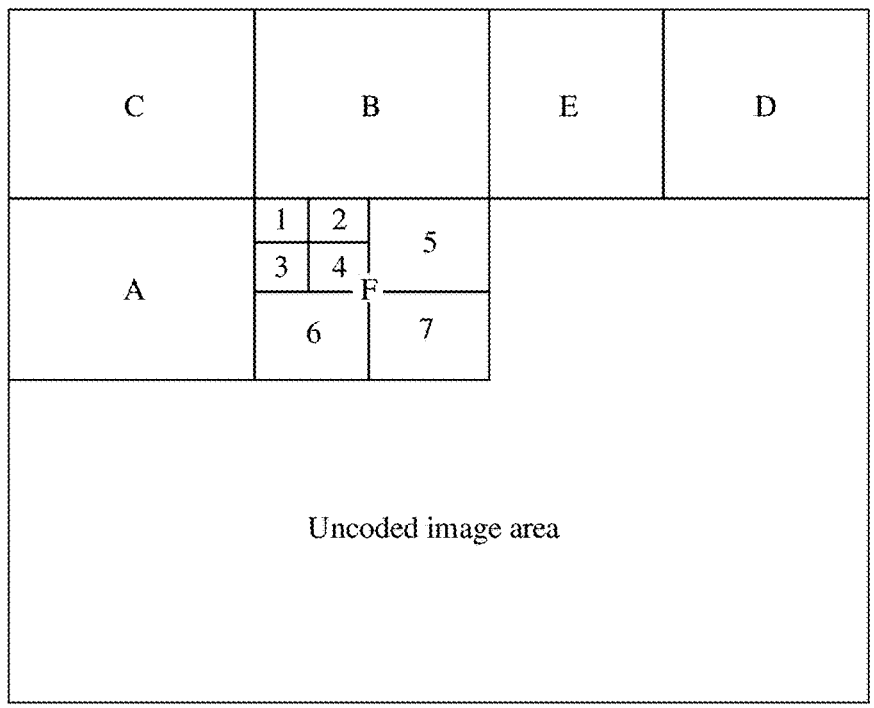
FIG. 6 is a schematic diagram of an image that is being coded according to an embodiment of this disclosure.
FIG. 7 is a schematic diagram of a reference pixel template according to an embodiment of this disclosure.

For example, FIG. 6 is a schematic diagram of an image that is being coded according to an embodiment of this disclosure. As shown in FIG. 6, the image includes a plurality of image blocks. The image is coded in a sequence from top to bottom and left to right. In FIG. 6, image blocks C, B, D, E, and A represent reconstructed image blocks, an image block F is a current to-be-coded image block, and another area in the image is an uncoded image area.

The H.265 standard is used herein to describe a specific process of the intra-frame prediction method. In H.265, a current to-be-coded image block can be divided into smaller sub image blocks for prediction. A structure in which sub image blocks are obtained through division is a quadtree structure. To be specific, one image block may be divided into four sub image blocks, and each sub image block may be further divided into four sub image blocks. As shown in FIG. 6, it is assumed that the current to-be-coded image block is divided into seven sub image blocks for prediction, or the current to-be-coded image block may be divided into more sub image blocks for prediction. Each sub image block is first predicted to obtain a prediction signal. Then a residual signal of the sub image block is obtained based on the prediction signal. Transform, quantization, and entropy coding are further performed on the residual signal. There are optionally 35 intra-frame prediction methods for predicting each sub image block, including a planar mode, a DC mode, and 33 angular prediction modes. A same reference pixel template (including a plurality of reference pixels) is used for all the prediction modes. FIG. 7 is a schematic diagram of a reference pixel template according to an embodiment of this disclosure. As shown in FIG. 7, pixels $P_{1,1}$, $P_{2,1}, \ldots, P_{N,1}, \ldots, P_{1,N}, P_{2,N}, \ldots$, and $P_{N,N}$ constitute a to-be-coded sub image block. For example, the to-be-coded sub image block may be a sub image block 1 in FIG. 6. As shown in FIG. 7, in addition to the to-be-coded sub image block, other reference pixels $R_{0,0}$, $R_{1,0}, \ldots$, $R_{2N+1,0}, \ldots$, and $R_{0,2N}$ constitute the reference pixel template. It is assumed that the to-be-coded sub image block is the sub image block 1 in FIG. 6. In this case, some of these reference pixels are pixels in the last row of the reference reconstructed image block B, and the other pixels are pixels in the rightmost column of the reference reconstructed image block A. In another standard, some of these reference pixels are pixels in a plurality of lower rows included in the reference reconstructed image block B, and the other pixels are pixels in a plurality of right columns included in the reference reconstructed image block A. That is, the reference pixel template is not limited in this disclosure.

Figure 8A:
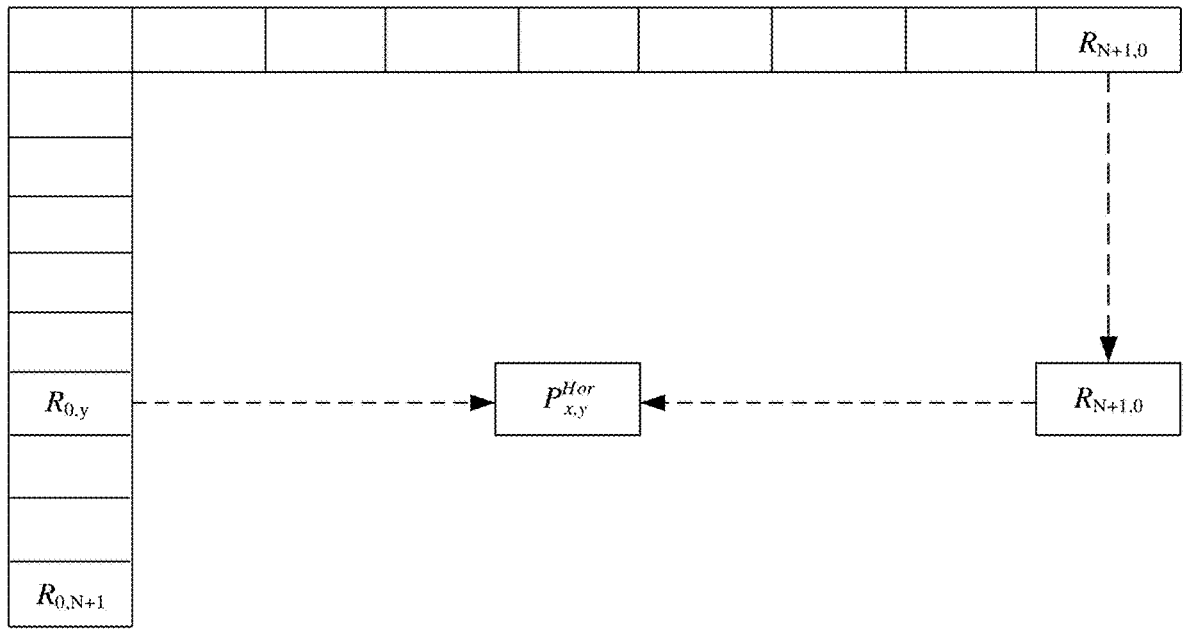
FIG. 8A and FIG. 8B are schematic diagrams of a planar mode according to an embodiment of this disclosure.
Figure 8B:
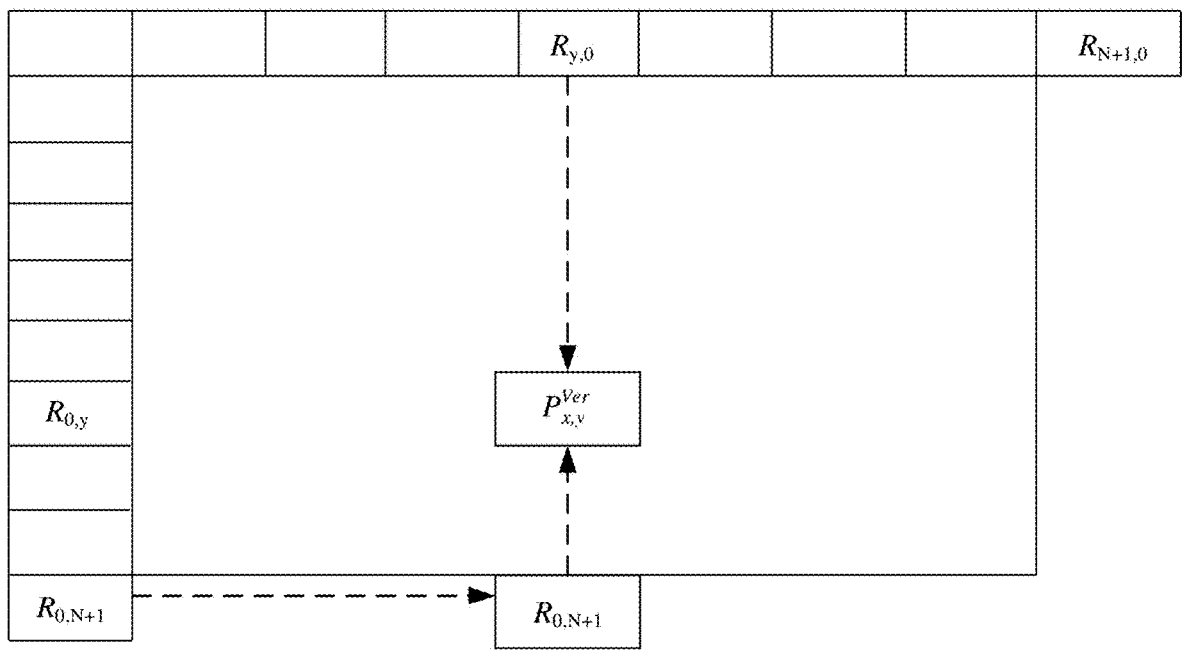

Planar Mode:

The planar mode is applicable to an area in which a pixel value changes slowly. FIG. 8A and FIG. 8B are a schematic diagram of a planar mode according to an embodiment of this disclosure. As shown in FIG. 8A and FIG. 8B, two linear filters in horizontal and vertical directions are used to respectively obtain two predictors $P_{x,y}^{Hor}$ and $P_{x,y}^{Ver}$, and an average of $P_{x,y}^{Hor}$ and $P_{x,y}^{Ver}$ is used as a prediction signal of a pixel (x, y).

DC Mode:

The DC mode is applicable to a large-scale flat area. A prediction signal of a current to-be-coded sub image block may be obtained using an average of a left reference pixel and an upper reference pixel of the current to-be-coded sub image block. As shown in FIG. 7, a prediction signal of each pixel in the to-be-coded sub image block may be obtained using an average of $R_{0,1}, \ldots, R_{0,N}, R_{1,0}, \ldots R_{N,0}$.

Figure 9:
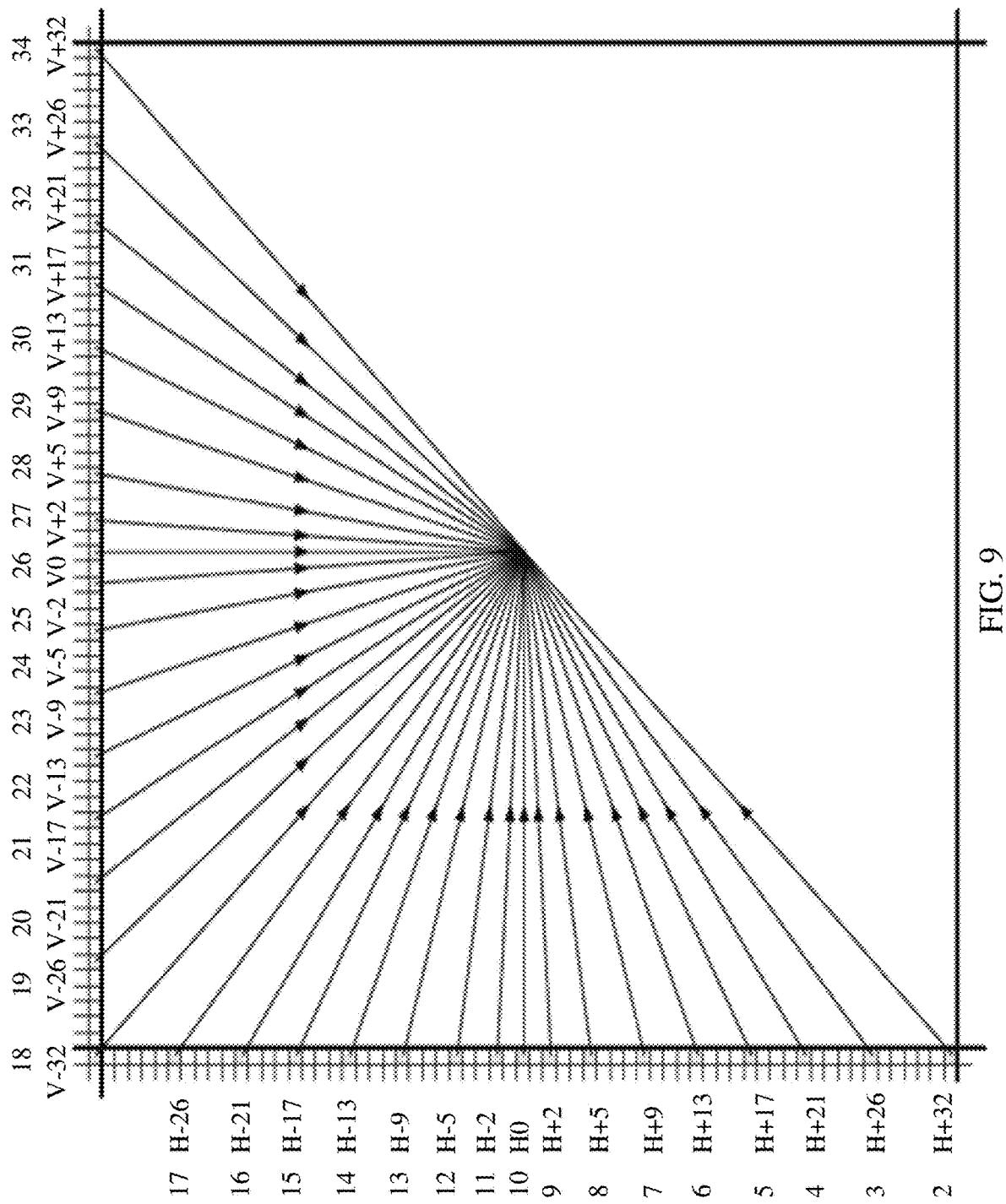
FIG. 9 is a schematic diagram of specific directions of 33 angular prediction modes according to an embodiment of this disclosure.

Angular Mode:

H.265/HEVC stipulates the 33 angular prediction modes to better adapt to textures in different directions in video content. FIG. 9 is a schematic diagram of specific directions of 33 angular prediction modes according to an embodiment of this disclosure. As shown in FIG. 9, the 33 angular prediction modes are classified into horizontal modes (a mode 2 to a mode 17) and vertical modes (a mode 18 to a mode 34), where V0 (mode 26) and H0 (mode 10) respectively indicate a vertical direction and a horizontal direction, and prediction directions of remaining angular prediction modes each may be considered as an angular deflection from the vertical direction or the horizontal direction. Herein, the vertical direction V0 (mode 26) is used as an example to describe an angular prediction process. The vertical prediction means that a current to-be-coded sub image block is predicted using reference pixels in an adjacent row above the current to-be-coded sub image block. A prediction signal of each pixel in the current to-be-coded sub image block is equal to a pixel value of a reference pixel corresponding to a column in which the pixel is located. That is, $P_{x,y}=R_{y,0}$. For another angular prediction mode, there is an angular deflection from the horizontal direction or the vertical direction, and a location of a reference pixel may be calculated based on the angular deflection. The reference pixel may be between two adjacent reference pixels. In this case, an interpolation operation needs to be performed on the calculated location between the two reference pixels to obtain the reference pixel, and a prediction signal is generated using the obtained reference pixel.

It should be noted that the intra-frame prediction method is also applicable to the decoder side, and details are not described herein again in this disclosure.

Further, this disclosure relates to a quantization process and a dequantization process.

Further, the encoder side participates in the foregoing quantization process. The quantization process is a process of mapping continuous values or a large quantity of possible discrete values of signals to a finite quantity of discrete amplitude values. During video coding, a transform coefficient is obtained after a residual signal is transformed. The transform coefficient usually has a relatively large dynamic range. The transform coefficient is quantized to effectively reduce a signal value range and further implement a better compression effect. A quantization method commonly used in a video standard is scale quantization. The scale quantization is dividing an input value field into equally spaced intervals. An output value (namely, a reconstruction value) corresponding to each interval is a midpoint of the interval, and a length of the interval is referred to as a quantization step. A specific quantization process is dividing a quantization step by a transform coefficient, and then rounding a division result to obtain a quantization coefficient.

The decoder side participates in the foregoing dequantization process. The dequantization process is multiplying a quantization coefficient by a quantization step to obtain a reconstructed transform coefficient. In the H.264 standard and the H.265 standard, a quantization parameter is used to determine the quantization step. The quantization parameter ranges from 0 to 51. In addition, each time the quantization parameter is increased by 1, the quantization step is approximately increased by 12.25%.

Further, this disclosure relates to image downsampling processing and image upsampling processing.

The image downsampling processing relates to information in three aspects: 1. Downsampling ratio. 2. Downsampling location. 3. Filter used for downsampling.

The downsampling ratio is a ratio of an original image to an image obtained after downsampling, and may be separately described in a horizontal direction and a vertical direction. For example, for an image signal, horizontal downsampling may be performed at a ratio of 2:1, and vertical downsampling may be performed at a ratio of 4:1, or no horizontal downsampling is performed, and vertical downsampling is performed at a ratio of 2:1, or horizontal downsampling and vertical downsampling both are performed at a ratio of 2:1.

The downsampling location is a location relationship between a downsampling point and an original sampling point. For example, the downsampling point may be in a same location as some original sampling points, or the downsampling point is between several original sampling points.

The downsampling filter may be a 3-lobe Lanczos filter, a bilinear filter, a bicubic filter, a Gaussian filter, or the like.

Figure 10:
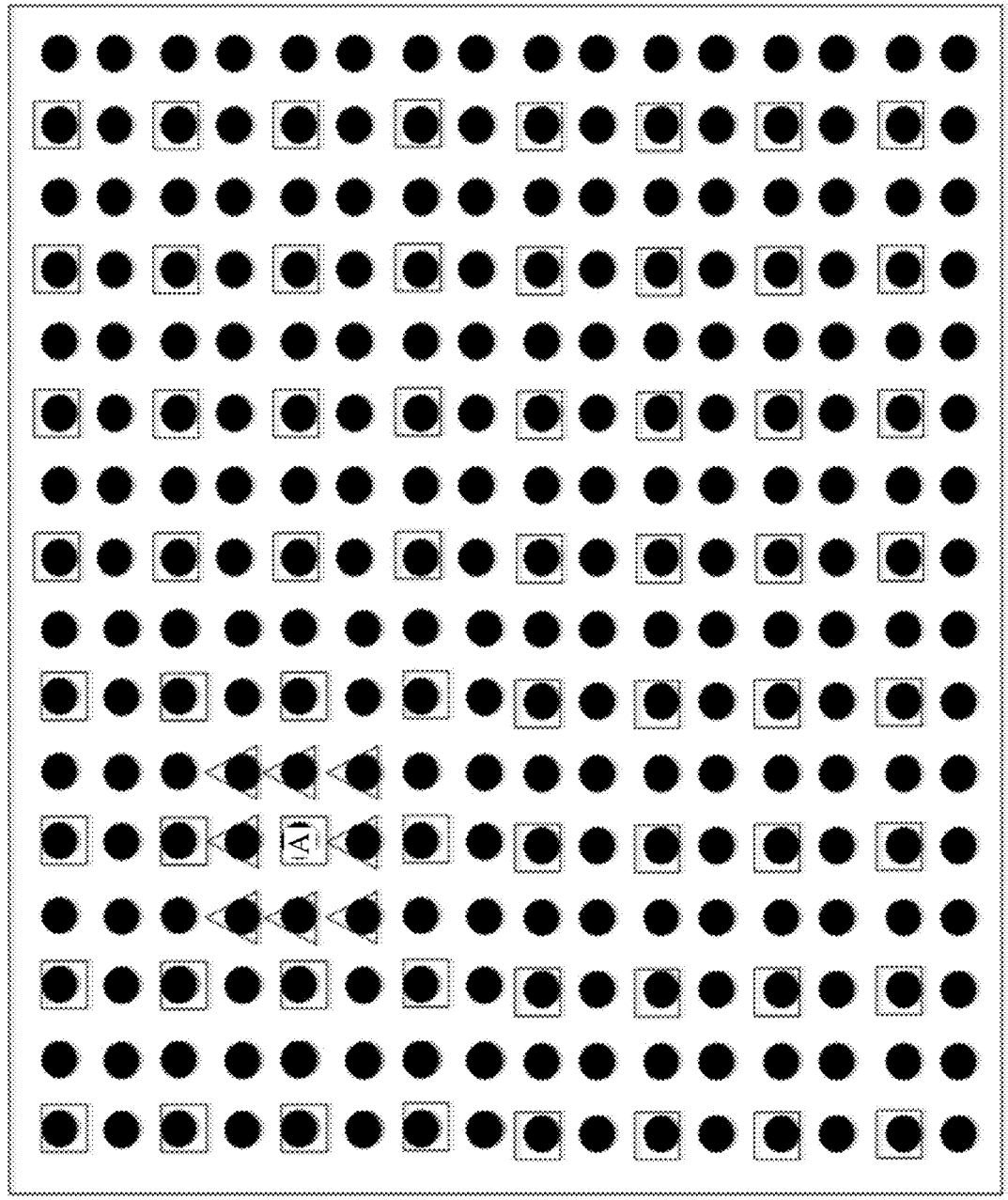
FIG. 10 is a schematic diagram of image downsampling according to an embodiment of this disclosure.

The following uses an image block of a 16×16 resolution (an actual image is much larger, for example, 1920×1080) as an example to describe a downsampling process. FIG. 10 is a schematic diagram of image downsampling according to an embodiment of this disclosure. Assuming that sampling ratios in a horizontal direction and a vertical direction both are 2:1, a location of a downsampling point is a location of the left of two original sampling points in the horizontal direction, and the location of the downsampling point is a location of the upper of two original sampling points in the vertical direction. As shown in FIG. 10, a circle surrounded by a box indicates a downsampling point location, and a downsampling filter is as follows:

$$\frac{1}{16}\begin{bmatrix} 1 & 2 & 1 \\ 2 & 4 & 2 \\ 1 & 2 & 1 \end{bmatrix} = \frac{1}{4}\begin{bmatrix} 1 \\ 2 \\ 1 \end{bmatrix} * \frac{1}{4}[\,1\ \ 2\ \ 1\,].$$

The filter is a simple low-pass filter. The low-pass filter may be considered as one two-dimensional filter, or may be considered as two one-dimensional filters. If the filter is considered as the one two-dimensional filter, both horizontal downsampling and vertical downsampling may be completed in one filtering operation. As shown in FIG. 10, when downsampling is performed on a downsampling point A, eight adjacent original sampling points (circles surround by triangles) are used, and a pixel value of the downsampling point A is calculated according to the foregoing filter. If the filter is considered as the two one-dimensional filters, horizontal downsampling or vertical downsampling first needs to be completed, and then vertical downsampling or horizontal downsampling is performed on a horizontal downsampling result or a vertical downsampling result. As shown in FIG. 10, when downsampling is performed on the downsampling point A, horizontal downsampling is first performed using left and right original sampling points of the downsampling point A, then vertical downsampling is performed on a downsampling result using upper and lower original sampling points of the downsampling point A, and the pixel value of the downsampling point A is calculated according to the foregoing filters. A same method is used to perform downsampling processing on the entire 16*16 image block. A final downsampling result is shown in FIG. 10. A location of each downsampling point is represented by a circle surrounded by a box, and a pixel value of the downsampling point is obtained through a filtering operation. As shown in FIG. 10, an image block obtained after downsampling has an 8×8 resolution.

The encoder side or the decoder side usually needs to perform upsampling processing on an image obtained after downsampling to obtain an image of an original resolution. The foregoing upsampling processing relates to information in three aspects: 1. Upsampling ratio. 2. Upsampling location. 3. Filter used for upsampling.

The upsampling ratio is a ratio of an image on which no upsampling is performed to an image obtained after upsampling, and may be separately described in a horizontal direction and a vertical direction. For example, for an image signal on which no upsampling is performed, horizontal upsampling may be performed at a ratio of 1:2, and vertical upsampling may be performed at a ratio of 1:4, or no horizontal upsampling is performed, and vertical upsampling is performed at a ratio of 1:2, or horizontal upsampling and vertical upsampling both are performed at a ratio of 1:2.

Figure 11:
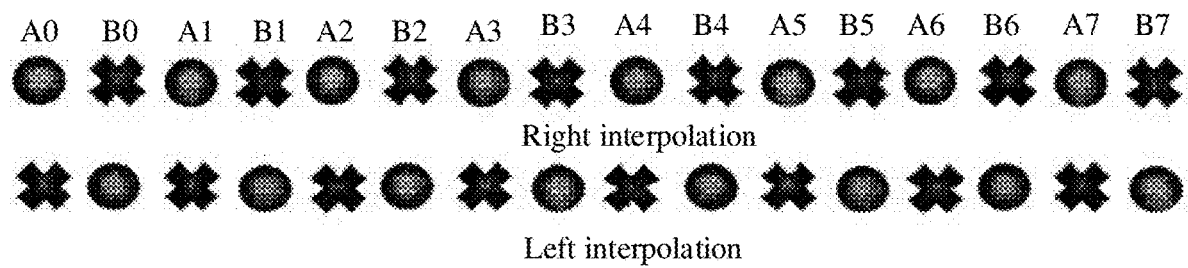
FIG. 11 is a schematic diagram of image upsampling according to an embodiment of this disclosure.

The upsampling location is a location relationship between a sampling point obtained after upsampling and a sampling point on which no upsampling is performed. For example, FIG. 11 is a schematic diagram of image upsampling according to an embodiment of this disclosure. As shown in FIG. 11, in the first row, a location of a sampling point obtained after horizontal upsampling is performed at an upsampling ratio of 1:2 may be on the right of a sampling point on which no upsampling is performed, where x represents a location of the sampling point obtained after upsampling, and a circle represents a location of the sampling point on which no upsampling is performed. In the second row, a location of a sampling point obtained after horizontal upsampling is performed at an upsampling ratio of 1:2 may be on the left of a sampling point on which no upsampling is performed, where x represents a location of the sampling point obtained after upsampling, and a circle represents a location of the sampling point on which no upsampling is performed. It should be noted that the location of the sampling point obtained after upsampling needs to correspond to location selection of the foregoing downsampling point. For example, during downsampling, a location of a left original sampling point is selected as a location of a downsampling point. In this case, during upsampling, a location of a right sampling point on which no upsampling is performed (the downsampling point) is selected as a location of a sampling point obtained after upsampling.

The upsampling filter may be a Discrete Cosine Transform Interpolation Filter (DCTIF), a bilinear interpolation filter, a sinc filter, or the like. The following uses an image block of an 8×8 resolution (namely, the foregoing image block obtained after downsampling) as an example to describe an upsampling process. It is assumed that upsampling ratios in a horizontal direction and a vertical direction both are 1:2. In the horizontal direction, the location of the sampling point obtained after upsampling is a location of a right sampling point on which no upsampling is performed. In the vertical direction, the location of the sampling point obtained after upsampling is a location of a lower sampling point on which no upsampling is performed. Herein, an example in which the DCTIF filter separately performs horizontal upsampling and vertical upsampling is used to describe a process of the upsampling processing. The DCTIF filter is (−1, 4, −11, 40, 40, −11, 4, −1). It is assumed that horizontal upsampling needs to be performed currently. In FIG. 11, assuming that a sampling point B3 needs to be inserted, a pixel value of B3 is determined using the following formula:

$$B_3 = (-A_0 + 4*A_1 - 11*A_2 + 40*A_3 + 40*A_4 - 11*A_5 + 4*A_6 - A_7) >> 6.$$

Figure 12:
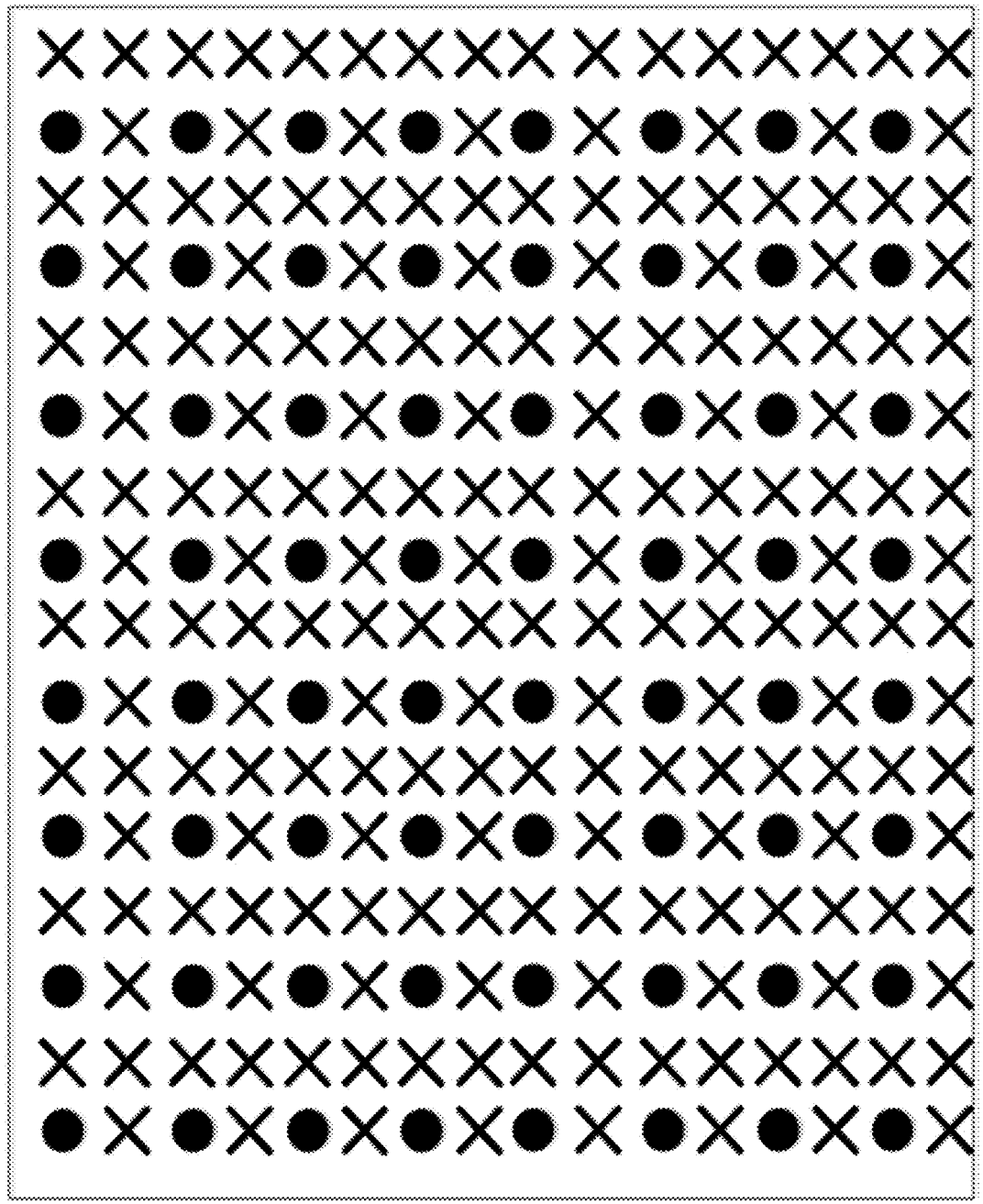
FIG. 12 is a schematic diagram of image upsampling according to an embodiment of this disclosure.

For an interpolation sampling point at another location, for example, B7, four right pixels of B7 need to be used, and these pixels cannot be obtained currently. Actually, A7 is usually repeated four times to calculate a pixel value of B7. Vertical upsampling is similar to horizontal upsampling, and details are not described herein again. Alternatively, vertical upsampling may be performed before horizontal upsampling. FIG. 12 is a schematic diagram of image upsampling according to an embodiment of this disclosure. As shown in FIG. 12, x represents a sampling point obtained after upsampling, and a circle represents a sampling point on which no upsampling is performed.

In the other approaches, the encoder side performs downsampling processing on an entire image. However, all image blocks included in the entire image may have different features. For example, some image blocks may be relatively flat. In this case, the encoder side can perform downsampling processing on the image blocks. Some image blocks may have many details. In this case, these details are lost if downsampling processing is performed. Consequently, an effect of coding performed by the encoder side is poor, and correspondingly some reconstructed image blocks obtained by the decoder side are relatively blur. That is, an effect of a reconstructed image block obtained by the decoder side is poor.

To resolve the foregoing technical problem, this disclosure provides an image processing method, device, and system. This disclosure is on the basis of the schematic diagrams of coding in FIG. 3 and FIG. 5. As shown in FIG. 3 and FIG. 5, a to-be-coded image block included in an image may be coded using an original resolution coding scheme shown in FIG. 3 or a downsampling coding scheme shown in FIG. 5. The original resolution coding scheme is directly coding a current to-be-coded image block. The downsampling coding scheme is first performing downsampling processing on a current to-be-coded image block, and then coding a current to-be-coded image block obtained after the downsampling. Usually, a texture image block is coded using the original resolution coding scheme, and a smooth image block is coded using the downsampling coding scheme. The encoder side needs to mark a coding scheme used for each to-be-coded image block, and writes the mark into a code stream. Therefore, the decoder side performs a corresponding operation on a to-be-reconstructed image block based on the mark. A main idea of this disclosure is as follows. The decoder side may code a to-be-reconstructed image block using the original resolution coding scheme or the downsampling coding scheme, determine a quantization parameter of the to-be-reconstructed image block according to the coding scheme of the to-be-reconstructed image block, and reconstruct the to-be-reconstructed image block based on the quantization parameter. Correspondingly, the encoder side may code a to-be-coded image block using the original resolution coding scheme or the downsampling coding scheme, determine a quantization parameter of the to-be-coded image block according to the coding scheme of the to-be-coded image block, and perform coding based on the quantization parameter.

Figure 13:
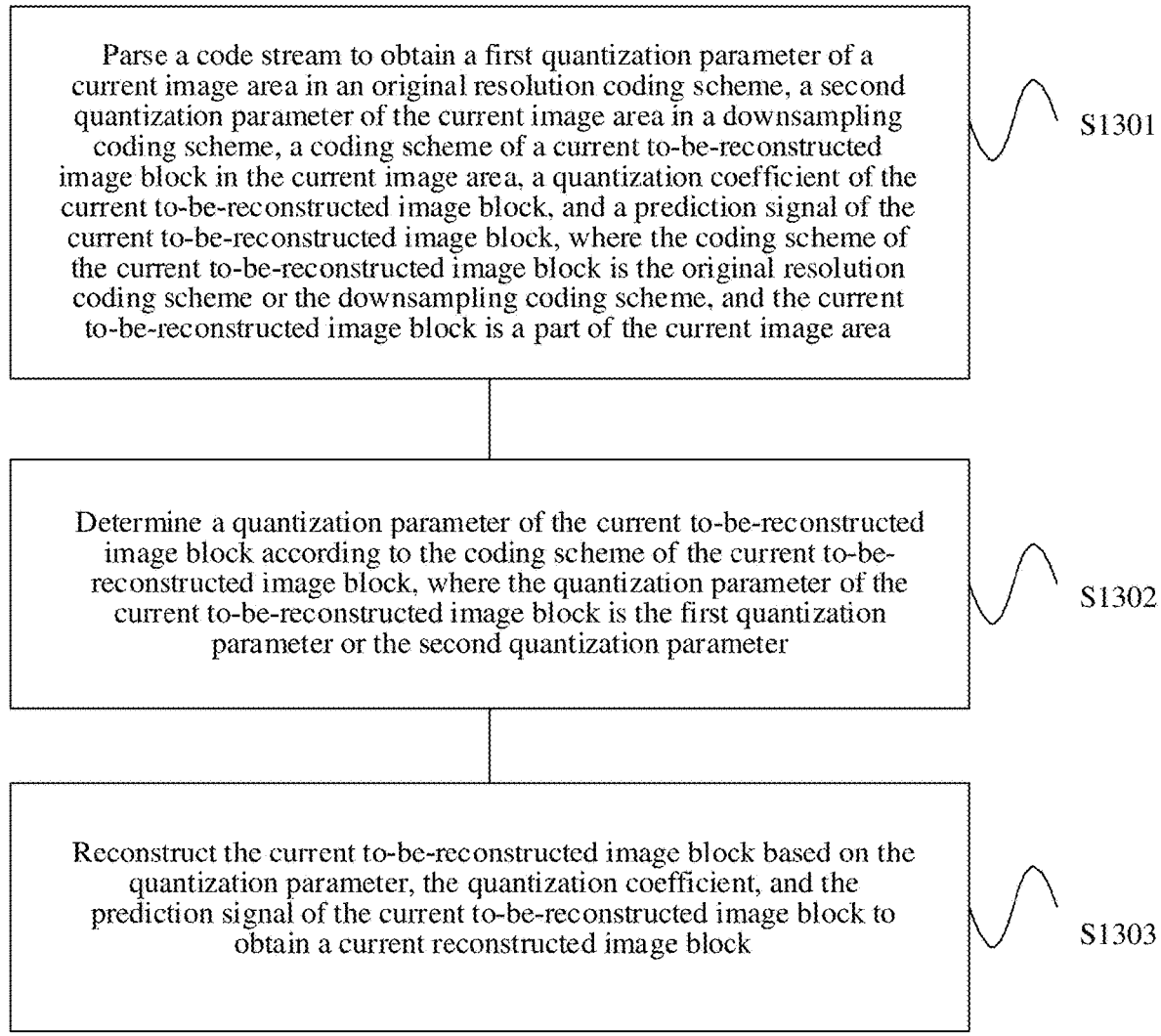
FIG. 13 is a flowchart of an image processing method according to an embodiment of this disclosure.

FIG. 13 is a flowchart of an image processing method according to an embodiment of this disclosure. As shown in FIG. 13, the method includes the following procedure.

Step S1301: Parse a code stream to obtain a first quantization parameter of a current image area in an original resolution coding scheme, a second quantization parameter of the current image area in a downsampling coding scheme, a coding scheme of a current to-be-reconstructed image block in the current image area, a quantization coefficient of the current to-be-reconstructed image block, and a prediction signal of the current to-be-reconstructed image block, where the coding scheme of the current to-be-reconstructed image block is the original resolution coding scheme or the downsampling coding scheme, and the current to-be-reconstructed image block is a part of the current image area.

Step S1302: Determine a quantization parameter of the current to-be-reconstructed image block according to the coding scheme of the current to-be-reconstructed image block, where the quantization parameter of the current to-be-reconstructed image block is the first quantization parameter or the second quantization parameter.

Step S1303: Reconstruct the current to-be-reconstructed image block based on the quantization parameter, the quantization coefficient, and the prediction signal of the current to-be-reconstructed image block to obtain a current reconstructed image block.

Step S1301 is described in detail. Further, the first quantization parameter may be a quantization parameter at a video level (sequence level), an image level, or an image slice level in the original resolution coding scheme. The image area in this embodiment of the present disclosure may be an image, or may be an image slice. Using the video level as an example, the first quantization parameter can be used, provided that the original resolution coding scheme is used for each frame of image in a same video and each image block in each frame of image. Using the image level as an example, the first quantization parameter can be used, provided that the original resolution coding scheme is used for each image block in a same image. Using the image slice level as an example, the first quantization parameter can be used, provided that the original resolution coding scheme is used for each image block in a same image slice. Similarly, the second quantization parameter may be a quantization parameter at a video level (sequence level), an image level, or an image slice level in the downsampling coding scheme.

Optionally, if the first quantization parameter is a quantization parameter at the video level, the second quantization parameter is also a quantization parameter at the video level. Similarly, if the first quantization parameter is a quantization parameter at the image level, the second quantization parameter is also a quantization parameter at the image level. If the first quantization parameter is a quantization parameter at the image slice level, the second quantization parameter is also a quantization parameter at the image slice level.

For a value range of the first quantization parameter, refer to an existing standard. For example, the first quantization parameter ranges from 0 to 51 in H.265, and the second quantization parameter is usually less than the first quantization parameter.

The first quantization parameter and the second quantization parameter may be directly carried in the code stream generated by an encoder side.

Alternatively, the code stream includes the first quantization parameter and a quantization parameter prediction difference of the current image area. Optionally, the quantization parameter prediction difference is a difference calculated by the encoder side by subtracting the second quantization parameter from the first quantization parameter. Correspondingly, obtaining a second quantization parameter of the current image area in a downsampling coding scheme includes calculating a difference between the first quantization parameter and the quantization parameter prediction difference to obtain the second quantization parameter. Alternatively, the quantization parameter prediction difference is a difference calculated by the encoder side by subtracting the first quantization parameter from the second quantization parameter. Correspondingly, obtaining a second quantization parameter of the current image area in a downsampling coding scheme includes calculating a sum of the first quantization parameter and the quantization parameter prediction difference to obtain the second quantization parameter. Alternatively, the quantization parameter prediction difference is a quantization parameter prediction difference directly obtained from a configuration file of the encoder side. In this case, a decoder side may obtain a meaning represented by the quantization parameter prediction difference. For example, the meaning represented by the quantization parameter prediction difference may be the difference obtained by subtracting the second quantization parameter from the first quantization parameter. In this case, obtaining a second quantization parameter of the current image area in a downsampling coding scheme includes calculating the difference between the first quantization parameter and the quantization parameter prediction difference to obtain the second quantization parameter. Alternatively, the meaning represented by the quantization parameter prediction difference may be the difference obtained by subtracting the first quantization parameter from the second quantization parameter. In this case, obtaining a second quantization parameter of the current image area in a downsampling coding scheme includes calculating the sum of the first quantization parameter and the quantization parameter prediction difference to obtain the second quantization parameter. The quantization parameter prediction difference is less than the second quantization parameter. Therefore, this manner can reduce bit overheads of the encoder side.

Alternatively, the code stream includes the second quantization parameter and the quantization parameter prediction difference. The first quantization parameter may be determined based on the second quantization parameter and the quantization parameter prediction difference. A method for determining the first quantization parameter is similar to a method for determining the second quantization parameter, and details are not described herein again.

The coding scheme of the current to-be-reconstructed image block may be directly carried in the code stream. One or more bits may be used to indicate the coding scheme of the current to-be-reconstructed image block. For example, when one bit is used to indicate the coding scheme of the current to-be-reconstructed image block, 0 may be used to indicate that the coding scheme of the current to-be-reconstructed image block is the original resolution coding scheme, and 1 may be used to indicate that the coding scheme of the current to-be-reconstructed image block is the downsampling coding scheme, or 1 may be used to indicate that the coding scheme of the current to-be-reconstructed image block is the original resolution coding scheme, and 0 may be used to indicate that the coding scheme of the current to-be-reconstructed image block is the downsampling coding scheme.

Alternatively, the coding scheme of the current to-be-reconstructed image block may be derived using another parameter information in the code stream.

Optionally, the decoder side predicts the current to-be-reconstructed image block using M reference reconstructed image blocks of the current to-be-reconstructed image block to obtain the prediction signal of the current to-be-reconstructed image block, where M is a positive integer greater than or equal to 1. For example, if the coding scheme of the current to-be-reconstructed image block is the original resolution coding scheme, and the M reference reconstructed image blocks include a reference reconstructed image block coded using the original resolution coding scheme, a reference pixel of the current to-be-reconstructed image block is determined in pixels of the reference reconstructed image block coded using the original resolution coding scheme. If the coding scheme of the current to-be-reconstructed image block is the original resolution coding scheme, and the M reference reconstructed image blocks include a reference reconstructed image block coded using the downsampling coding scheme, a pixel required for reconstructing the current to-be-reconstructed image block is obtained from pixels of the reference reconstructed image block coded using the downsampling coding scheme, and upsampling processing is performed on the pixel required for reconstructing the current to-be-reconstructed image block to obtain the reference pixel of the current to-be-reconstructed image block. If the coding scheme of the current to-be-reconstructed image block is the downsampling coding scheme, and the M reference reconstructed image blocks include the reference reconstructed image block coded using the downsampling coding scheme, the reference pixel of the current to-be-reconstructed image block is determined in the pixels of the reference reconstructed image block coded using the downsampling coding scheme. If the coding scheme of the current to-be-reconstructed image block is the downsampling coding scheme, and the M reference reconstructed image blocks include the reference reconstructed image block coded using the original resolution coding scheme, the pixel required for reconstructing the current to-be-reconstructed image block is obtained from the pixels of the reference reconstructed image block coded using the original resolution coding scheme, and downsampling processing is performed on the pixel required for reconstructing the current to-be-reconstructed image block to obtain the reference pixel of the current to-be-reconstructed image block. Finally, according to the foregoing intra-frame prediction method, the prediction signal of the current to-be-reconstructed image block is obtained using the reference pixel of the current to-be-reconstructed image block. How to obtain the prediction signal of the current to-be-reconstructed image block is not limited in this disclosure.

Step S1302 is described in detail. In an optional manner, if the coding scheme of the current to-be-reconstructed image block is the original resolution coding scheme, the first quantization parameter is used as the quantization parameter of the current to-be-reconstructed image block, or if the coding scheme of the current to-be-reconstructed image block is the downsampling coding scheme, the second quantization parameter is used as the quantization parameter of the current to-be-reconstructed image block.

In another optional manner, if the coding scheme of the current to-be-reconstructed image block is the original resolution coding scheme, the first quantization parameter is corrected for at least one time, and an obtained correction result is used as the quantization parameter of the current to-be-reconstructed image block, or if the coding scheme of the current to-be-reconstructed image block is the downsampling coding scheme, the second quantization parameter is corrected for at least one time, and an obtained correction result is used as the quantization parameter of the current to-be-reconstructed image block.

For example, a difference between the first quantization parameter and a correction factor is calculated, and the obtained difference is used as the quantization parameter of the current to-be-reconstructed image block. The correction factor may be set based on an actual requirement, for example, may be 3. Alternatively, a product of the first quantization parameter and a correction factor is calculated, and the obtained product is used as the quantization parameter of the current to-be-reconstructed image block. The correction factor may be set based on an actual requirement, for example, may be 0.2. Similarly, the second quantization parameter may also be corrected using a same method.

For example, a fixed scale factor is preset, and the decoder side may directly determine the second quantization parameter based on the first quantization parameter and the scale factor. The scale factor ranges from 0 to 1. For example, when horizontal 2:1 downsampling and vertical 2:1 downsampling are performed, the scale factor is approximately 0.8 according to experience. That is, the second quantization parameter is 0.8 times of the first quantization parameter. If a downsampling scaling ratio increases, for example, horizontal 2:1 downsampling is performed and no vertical downsampling is performed, the scale factor also increases. For example, the scale factor may be 0.9. If the downsampling scaling ratio decreases, for example, horizontal 4:1 downsampling and vertical 4:1 downsampling are performed, the scale factor also decreases. For example, the scale factor may be 0.6.

Step S1303 is described in detail. Optionally, entropy decoding may be performed on the code stream to obtain the quantization coefficient of the current to-be-reconstructed image block. A quantization step is obtained based on the quantization parameter using a plurality of other approaches. The quantization coefficient is multiplied by the quantization step to obtain a reconstructed transform coefficient. Inverse transform is performed on the transform coefficient to obtain a reconstructed residual signal of the current to-be-reconstructed image block. Then, the prediction signal and the reconstructed residual signal are added to obtain a reconstruction signal of the current to-be-reconstructed image block. Finally, the current reconstructed image block corresponding to the current to-be-reconstructed image block is obtained based on the reconstruction signal.

It should be noted that an example in which the encoder side performs a transform operation and the decoder side performs an inverse transform operation is used in this embodiment of this disclosure. Actually, the encoder side may not perform the transform operation, and correspondingly the decoder side does not perform the inverse transform operation either. Details are not described below.

Optionally, if a coding scheme of the current reconstructed image block is the downsampling coding scheme, the method further includes performing upsampling processing on the current reconstructed image block based on a pixel of an adjacent reconstructed image block required for performing upsampling processing on the current reconstructed image block. For details, refer to the foregoing upsampling processing method. The adjacent reconstructed image block required for performing upsampling processing on the current reconstructed image block is related to a filter used by the decoder side to perform upsampling processing. For example, the required adjacent reconstructed image block may be an upper image block, a lower image block, a left image block, and a right image block. Alternatively, the required adjacent reconstructed image block includes an upper image block, a lower image block, a left image block, a right image block, an upper-left image block, a lower-left image block, an upper-right image block, and a lower-right image block of the current reconstructed image block. A process of the upsampling processing is not limited in this disclosure.

In conclusion, because image blocks have respective features in this disclosure, and the encoder side differently codes the image blocks, the decoder side may determine the quantization parameter of the current to-be-reconstructed image block according to the coding scheme of the current to-be-reconstructed image block. That is, the quantization parameter is pertinent for reconstructing the current to-be-reconstructed image block. Therefore, a reconstructed image block obtained by the decoder side has a better effect.

Figure 14:
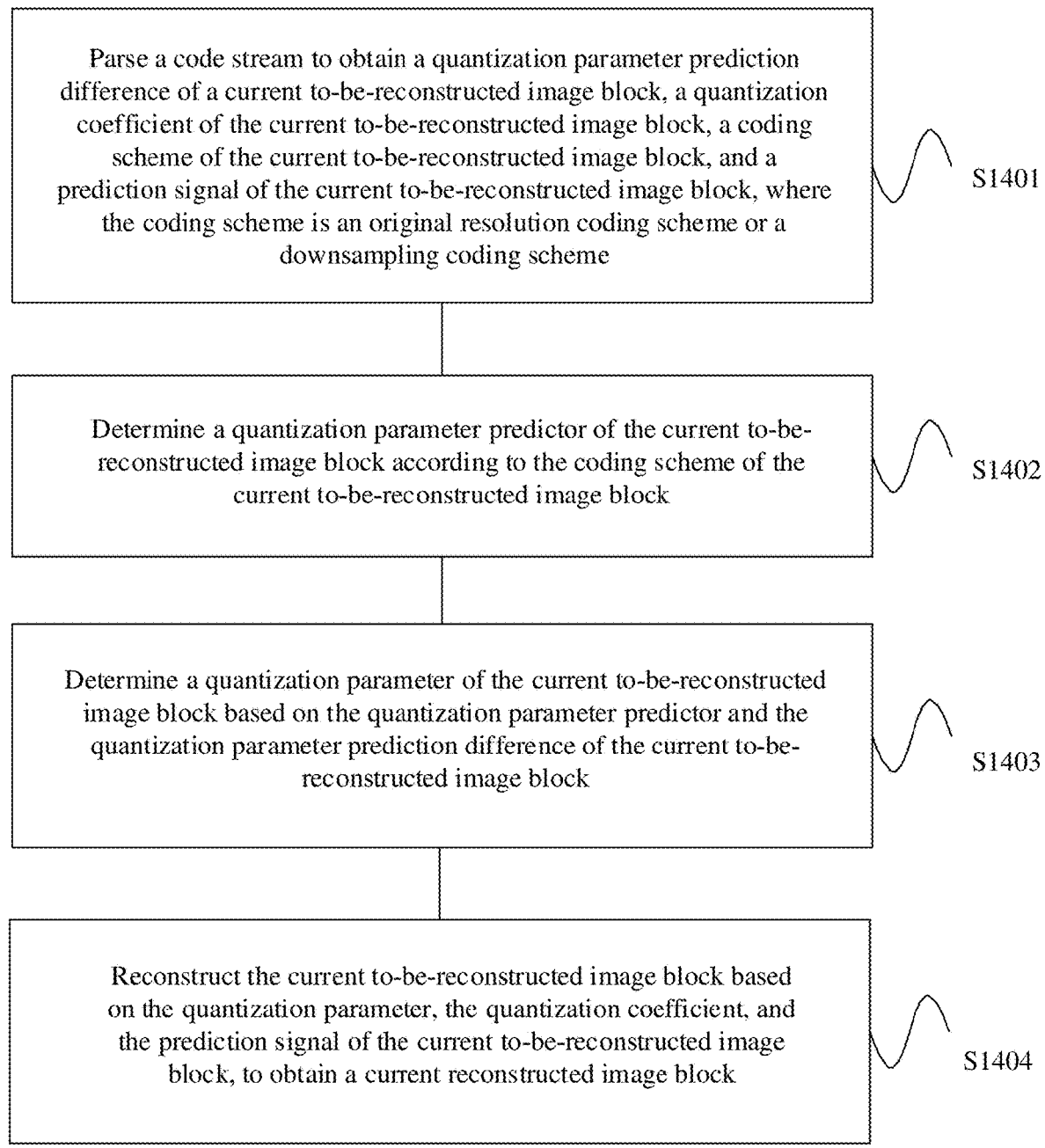
FIG. 14 is a flowchart of an image processing method according to another embodiment of this disclosure.

FIG. 14 is a flowchart of an image processing method according to another embodiment of this disclosure. As shown in FIG. 14, the method includes the following procedure.

Step S1401: Parse a code stream to obtain a quantization parameter prediction difference of a current to-be-reconstructed image block, a quantization coefficient of the current to-be-reconstructed image block, a coding scheme of the current to-be-reconstructed image block, and a prediction signal of the current to-be-reconstructed image block, where the coding scheme is an original resolution coding scheme or a downsampling coding scheme.

Step S1402: Determine a quantization parameter predictor of the current to-be-reconstructed image block according to the coding scheme of the current to-be-reconstructed image block.

Step S1403: Determine a quantization parameter of the current to-be-reconstructed image block based on the quantization parameter predictor and the quantization parameter prediction difference of the current to-be-reconstructed image block.

Step S1404: Reconstruct the current to-be-reconstructed image block based on the quantization parameter, the quantization coefficient, and the prediction signal of the current to-be-reconstructed image block to obtain a current reconstructed image block.

Step S1401 is described in detail. Further, the quantization parameter prediction difference may be obtained by an encoder side based on the quantization parameter predictor corresponding to the current to-be-reconstructed image block and the quantization parameter of the current to-be-reconstructed image block. For example, the encoder side subtracts the quantization parameter predictor corresponding to the current to-be-reconstructed image block from the quantization parameter of the current to-be-reconstructed image block, to obtain the quantization parameter prediction difference. Alternatively, the encoder side subtracts the quantization parameter predictor corresponding to the current to-be-reconstructed image block from the quantization parameter of the current to-be-reconstructed image block, adjusts a difference to finally obtain the quantization parameter prediction difference, and adds the quantization parameter prediction difference to the code stream. Alternatively, the encoder side subtracts the quantization parameter of the current to-be-reconstructed image block from the quantization parameter predictor corresponding to the current to-be-reconstructed image block, to obtain the quantization parameter prediction difference. Alternatively, the encoder side subtracts the quantization parameter of the current to-be-reconstructed image block from the quantization parameter predictor corresponding to the current to-be-reconstructed image block, adjusts a difference to finally obtain the quantization parameter prediction difference, and adds the quantization parameter prediction difference to the code stream. Alternatively, the quantization parameter prediction difference is a quantization parameter prediction difference directly obtained from a configuration file of the encoder side.

It should be noted that, in the previous embodiment, the quantization parameter prediction difference is the quantization parameter prediction difference corresponding to the current image area. However, in this embodiment, the quantization parameter prediction difference is the quantization parameter prediction difference corresponding to the current to-be-reconstructed image block.

The coding scheme of the current to-be-reconstructed image block may be directly carried in the code stream. One or more bits may be used to indicate the coding scheme of the current to-be-reconstructed image block. For example, when one bit is used to indicate the coding scheme of the current to-be-reconstructed image block, 0 may be used to indicate that the coding scheme of the current to-be-reconstructed image block is the original resolution coding scheme, and 1 may be used to indicate that the coding scheme of the current to-be-reconstructed image block is the downsampling coding scheme, or 1 may be used to indicate that the coding scheme of the current to-be-reconstructed image block is the original resolution coding scheme, and 0 may be used to indicate that the coding scheme of the current to-be-reconstructed image block is the downsampling coding scheme.

Alternatively, the coding scheme of the current to-be-reconstructed image block may be derived using another parameter information in the code stream.

A decoder side predicts the current to-be-reconstructed image block using M reference reconstructed image blocks of the current to-be-reconstructed image block, to obtain the prediction signal of the current to-be-reconstructed image block, where M is a positive integer greater than or equal to 1. For example, if the coding scheme of the current to-be-reconstructed image block is the original resolution coding scheme, and the M reference reconstructed image blocks include a reference reconstructed image block coded using the original resolution coding scheme, a reference pixel of the current to-be-reconstructed image block is determined in pixels of the reference reconstructed image block coded using the original resolution coding scheme. If the coding scheme of the current to-be-reconstructed image block is the original resolution coding scheme, and the M reference reconstructed image blocks include a reference reconstructed image block coded using the downsampling coding scheme, a pixel required for reconstructing the current to-be-reconstructed image block is obtained from pixels of the reference reconstructed image block coded using the downsampling coding scheme, and upsampling processing is performed on the pixel required for reconstructing the current to-be-reconstructed image block to obtain the reference pixel of the current to-be-reconstructed image block. If the coding scheme of the current to-be-reconstructed image block is the downsampling coding scheme, and the M reference reconstructed image blocks include the reference reconstructed image block coded using the downsampling coding scheme, the reference pixel of the current to-be-reconstructed image block is determined in the pixels of the reference reconstructed image block coded using the downsampling coding scheme. If the coding scheme of the current to-be-reconstructed image block is the downsampling coding scheme, and the M reference reconstructed image blocks include the reference reconstructed image block coded using the original resolution coding scheme, the pixel required for reconstructing the current to-be-reconstructed image block is obtained from the pixels of the reference reconstructed image block coded using the original resolution coding scheme, and downsampling processing is performed on the pixel required for reconstructing the current to-be-reconstructed image block to obtain the reference pixel of the current to-be-reconstructed image block. Finally, according to the foregoing intra-frame prediction method, the prediction signal of the current to-be-reconstructed image block is obtained using the reference pixel of the current to-be-reconstructed image block. How to obtain the prediction signal of the current to-be-reconstructed image block is not limited in this disclosure.

Step S1402 is described in detail. In an optional manner 1, the quantization parameter predictor of the current to-be-reconstructed image block is directly determined according to the coding scheme of the current to-be-reconstructed image block. For example, if the coding scheme of the current to-be-reconstructed image block is the original resolution coding scheme, the quantization parameter predictor of the current to-be-reconstructed image block is determined as a quantization parameter A, or if the coding scheme of the current to-be-reconstructed image block is the downsampling coding scheme, the quantization parameter predictor of the current to-be-reconstructed image block is determined as a quantization parameter B.

In an optional manner 2, M reconstructed image blocks are selected according to a preset rule, and quantization parameters of the M reconstructed image blocks and coding schemes of the M reconstructed image blocks are obtained. The M reconstructed image blocks belong to a same current image area as the current to-be-reconstructed image block, and M is a positive integer. The quantization parameter predictor of the current to-be-reconstructed image block is determined according to the coding scheme of the current to-be-reconstructed image block and the coding schemes of the M reconstructed image blocks based on the quantization parameters of the M reconstructed image blocks.

The preset rule may be selecting a previous reconstructed image block of the current to-be-reconstructed image block in a decoding sequence, selecting an upper reconstructed image block and a left reconstructed image block of the current to-be-reconstructed image block, or selecting, in a decoding sequence from reconstructed image blocks falling within a preset range, a reconstructed image block that has a same coding scheme as the current to-be-reconstructed image block and that is closest to the current to-be-reconstructed image block. It should be noted that the preset rule is not limited in this disclosure.

If the current to-be-reconstructed image block is the first image block in a current image in the decoding sequence, that is, the M reconstructed image blocks do not exist in the current image, when the coding scheme of the current to-be-reconstructed image block is the original resolution coding scheme, a first quantization parameter of a current image area in the original resolution coding scheme is obtained, and the first quantization parameter is used as the quantization parameter predictor of the current to-be-reconstructed image block, or when the coding scheme of the current to-be-reconstructed image block is the downsampling coding scheme, a second quantization parameter of the current image area in the downsampling coding scheme is obtained, and the second quantization parameter is used as the quantization parameter predictor of the current to-be-reconstructed image block.

In an optional manner 3, if the coding scheme of the current to-be-reconstructed image block is the original resolution coding scheme, a first quantization parameter is used as the quantization parameter predictor of the current to-be-reconstructed image block, or if the coding scheme of the current to-be-reconstructed image block is the downsampling coding scheme, a second quantization parameter is used as the quantization parameter predictor of the current to-be-reconstructed image block. The first quantization parameter is a quantization parameter that is of a current image area in the original resolution coding scheme and that is obtained by parsing the code stream. The second quantization parameter is a quantization parameter that is of the current image area in the downsampling coding scheme and that is obtained by parsing the code stream. The current to-be-reconstructed image block is a part of the current image area.

In an optional manner 4, if the coding scheme of the current to-be-reconstructed image block is the original resolution coding scheme, a first quantization parameter is corrected based on the quantization parameter prediction difference to obtain the quantization parameter predictor of the current to-be-reconstructed image block, or if the coding scheme of the current to-be-reconstructed image block is the downsampling coding scheme, a second quantization parameter is corrected based on the quantization parameter prediction difference to obtain the quantization parameter predictor of the current to-be-reconstructed image block. The first quantization parameter is a quantization parameter that is of a current image area in the original resolution coding scheme and that is obtained by parsing the code stream. The second quantization parameter is a quantization parameter that is of the current image area in the downsampling coding scheme and that is obtained by parsing the code stream. The current to-be-reconstructed image block is a part of the current image area.

The manner 2 is described in detail.

Case 1: The M reconstructed image blocks are one reconstructed image block, and determining the quantization parameter predictor of the current to-be-reconstructed image block according to the coding scheme of the current to-be-reconstructed image block and the coding schemes of the M reconstructed image blocks based on the quantization parameters of the M reconstructed image blocks includes, if a coding scheme of the one reconstructed image block is the same as the coding scheme of the current to-be-reconstructed image block, determining a quantization parameter of the one reconstructed image block as the quantization parameter predictor of the current to-be-reconstructed image block, or if the coding scheme of the one reconstructed image block is different from the coding scheme of the current to-be-reconstructed image block, determining the quantization parameter predictor of the current to-be-reconstructed image block according to the coding scheme of the one reconstructed image block and the coding scheme of the current to-be-reconstructed image block based on a first quantization parameter and a second quantization parameter. The first quantization parameter is a quantization parameter that is of the current image area in the original resolution coding scheme and that is obtained by parsing the code stream. The second quantization parameter is a quantization parameter that is of the current image area in the downsampling coding scheme and that is obtained by parsing the code stream. The current to-be-reconstructed image block is a part of the current image area.

Optionally, if the coding scheme of the one reconstructed image block is the downsampling coding scheme, and the coding scheme of the current to-be-reconstructed image block is the original resolution coding scheme, the second quantization parameter is subtracted from the first quantization parameter to obtain a quantization difference, and a sum of the quantization parameter of the one reconstructed image block and the quantization difference is calculated to obtain the quantization parameter predictor, or if the coding scheme of the one reconstructed image block is the original resolution coding scheme, and the coding scheme of the current to-be-reconstructed image block is the downsampling coding scheme, the second quantization parameter is subtracted from the first quantization parameter to obtain the quantization difference, and a difference between the quantization parameter of the one reconstructed image block and the quantization difference is calculated to obtain the quantization parameter predictor.

Alternatively, if the coding schemes of the M reconstructed image blocks each are the downsampling coding scheme, and the coding scheme of the current to-be-reconstructed image block is the original resolution coding scheme, the second quantization parameter is subtracted from the first quantization parameter to obtain the quantization difference, the quantization difference is corrected, for example, the quantization difference is multiplied by an adjustment factor, and a sum of the quantization parameter of the one reconstructed image block and a corrected quantization difference is calculated to obtain the quantization parameter predictor. Alternatively, if the coding scheme of the one reconstructed image block is the original resolution coding scheme, and the coding scheme of the current to-be-reconstructed image block is the downsampling coding scheme, the second quantization parameter is subtracted from the first quantization parameter to obtain the quantization difference, the quantization difference is corrected, and a difference between the quantization parameter of the one reconstructed image block and the corrected quantization difference is calculated to obtain the quantization parameter predictor.

Further, if the coding scheme of the one reconstructed image block is the same as the coding scheme of the current to-be-reconstructed image block, it indicates that the quantization parameter of the one reconstructed image block may be directly used as the quantization parameter predictor. If the coding scheme of the one reconstructed image block is the downsampling coding scheme, and the coding scheme of the current to-be-reconstructed image block is the original resolution coding scheme, it indicates that a value needs to be added to the quantization parameter of the one reconstructed image block to obtain the quantization parameter predictor. If the coding scheme of the one reconstructed image block is the original resolution coding scheme, and the coding scheme of the current to-be-reconstructed image block is the downsampling coding scheme, it indicates that a value needs to be subtracted from the quantization parameter of the one reconstructed image block to obtain the quantization parameter predictor.

Optionally, the one reconstructed image block is a previous reconstructed image block of the current to-be-reconstructed image block in a decoding sequence. For example, in the H.265 standard, assuming that the decoding sequence is from top to bottom and from left to right, and the current to-be-reconstructed image block is a non-left-boundary image block, the previous reconstructed image block of the current to-be-reconstructed image block is on the left of the current to-be-reconstructed image block, and is adjacent to the current to-be-reconstructed image block. Assuming that the decoding sequence is from top to bottom and from left to right, and the current to-be-reconstructed image block is a left-boundary image block, the previous reconstructed image block of the current to-be-reconstructed image block is a leftmost reconstructed image block in an upper row of the current to-be-reconstructed image block.

Case 2: M is greater than 1, and determining the quantization parameter predictor of the current to-be-reconstructed image block according to the coding scheme of the current to-be-reconstructed image block and the coding schemes of the M reconstructed image blocks based on the quantization parameters of the M reconstructed image blocks includes, if the coding schemes of the M reconstructed image blocks each are the same as the coding scheme of the current to-be-reconstructed image block, determining an average of the quantization parameters of the M reconstructed image blocks as the quantization parameter predictor of the current to-be-reconstructed image block, or if a coding scheme of one reconstructed image block is different from the coding scheme of the current to-be-reconstructed image block, determining the quantization parameter predictor of the current to-be-reconstructed image block according to the coding schemes of the M reconstructed image blocks and the coding scheme of the current to-be-reconstructed image block based on a first quantization parameter and a second quantization parameter. The first quantization parameter is a quantization parameter that is of the current image area in the original resolution coding scheme and that is obtained by parsing the code stream. The second quantization parameter is a quantization parameter that is of the current image area in the downsampling coding scheme and that is obtained by parsing the code stream. The current to-be-reconstructed image block is a part of the current image area.

Optionally, if the M reconstructed image blocks include a reconstructed image block coded using the downsampling coding scheme, and the coding scheme of the current to-be-reconstructed image block is the original resolution coding scheme, a corrected quantization parameter of the reconstructed image block coded using the downsampling coding scheme is calculated based on the first quantization parameter, the second quantization parameter, and a quantization parameter of the reconstructed image block coded using the downsampling coding scheme, and the average of the quantization parameters of the M reconstructed image blocks is determined based on the corrected quantization parameter of the reconstructed image block coded using the downsampling coding scheme. The average is the quantization parameter predictor of the current to-be-reconstructed image block. If the M reconstructed image blocks include a reconstructed image block coded using the original resolution coding scheme, and the coding scheme of the current to-be-reconstructed image block is the downsampling coding scheme, a corrected quantization parameter of the reconstructed image block coded using the original resolution coding scheme is calculated, and the average of the quantization parameters of the M reconstructed image blocks is determined based on the first quantization parameter, the second quantization parameter, a quantization parameter of the reconstructed image block coded using the original resolution coding scheme, and the corrected quantization parameter of the reconstructed image block coded using the original resolution coding scheme. The average is the quantization parameter predictor of the current to-be-reconstructed image block.

Optionally, calculating, based on the first quantization parameter, the second quantization parameter, and a quantization parameter of the reconstructed image block coded using the downsampling coding scheme, a corrected quantization parameter of the reconstructed image block coded using the downsampling coding scheme includes subtracting the second quantization parameter from the first quantization parameter to obtain a quantization difference, and calculating a sum of the quantization difference and the quantization parameter of the reconstructed image block coded using the downsampling coding scheme to obtain the corrected quantization parameter of the reconstructed image block coded using the downsampling coding scheme, or subtracting the first quantization parameter from the second quantization parameter to obtain a quantization difference, and calculating a difference between the quantization difference and the quantization parameter of the reconstructed image block coded using the downsampling coding scheme, to obtain the corrected quantization parameter of the reconstructed image block coded using the downsampling coding scheme.

Based on this, optionally, the determining the average of the quantization parameters of the M reconstructed image blocks based on the corrected quantization parameter of the reconstructed image block coded using the downsampling coding scheme includes determining, as the quantization parameter predictor of the current to-be-reconstructed image block, an average of corrected quantization parameters of all (or some) reconstructed image blocks that are in the M reconstructed image blocks and that are coded using the original resolution coding scheme and quantization parameters of all (or some) reconstructed image blocks that are in the M reconstructed image blocks and that are coded using the downsampling coding scheme.

Optionally, calculating, based on the first quantization parameter, the second quantization parameter, and a quantization parameter of the reconstructed image block coded using the original resolution coding scheme, a corrected quantization parameter of the reconstructed image block coded using the original resolution coding scheme includes subtracting the second quantization parameter from the first quantization parameter to obtain the quantization difference, and calculating a difference between the quantization difference and the quantization parameter of the reconstructed image block coded using the original resolution coding scheme to obtain the corrected quantization parameter of the reconstructed image block coded using the original resolution coding scheme, or subtracting the first quantization parameter from the second quantization parameter to obtain the quantization difference, and calculating a sum of the quantization difference and the quantization parameter of the reconstructed image block coded using the original resolution coding scheme to obtain the corrected quantization parameter of the reconstructed image block coded using the original resolution coding scheme.

Based on this, optionally, determining the average of the quantization parameters of the M reconstructed image blocks based on the corrected quantization parameter of the reconstructed image block coded using the original resolution coding scheme includes determining, as the quantization parameter predictor of the current to-be-reconstructed image block, an average of corrected quantization parameters of all (or some) reconstructed image blocks that are in the M reconstructed image blocks and that are coded using the downsampling coding scheme and quantization parameters of all (or some) reconstructed image blocks that are in the M reconstructed image blocks and that are coded using the original resolution coding scheme.

Optionally, the M reconstructed image blocks include an upper reconstructed image block and a left reconstructed image block of the current to-be-reconstructed image block.

Further, it is assumed that M is equal to 2, the M reconstructed image blocks are an upper reconstructed image block and a left reconstructed image block of the current to-be-reconstructed image block, and the current to-be-reconstructed image block, the upper reconstructed image block, and the left reconstructed image block are all coded using the original resolution coding scheme or the downsampling coding scheme. In this case, an average of a quantization parameter of the upper reconstructed image block and a quantization parameter of the left reconstructed image block is calculated to obtain the quantization parameter predictor of the current to-be-reconstructed image block. It is assumed that both the current to-be-reconstructed image block and the upper reconstructed image block are coded using the original resolution coding scheme, and the left reconstructed image block is coded using the downsampling coding scheme. In this case, the quantization difference between the first quantization parameter and the second quantization parameter is calculated, a sum of the quantization parameter of the left reconstructed image block and the quantization difference is calculated to obtain a corrected quantization parameter of the left reconstructed image block, and an average of the quantization parameter of the upper reconstructed image block and the corrected quantization parameter of the left reconstructed image block is calculated to obtain the quantization parameter predictor of the current to-be-reconstructed image block. It is assumed that both the current to-be-reconstructed image block and the upper reconstructed image block are coded using the downsampling coding scheme, and the left reconstructed image block is coded using the original resolution coding scheme. In this case, the quantization difference between the first quantization parameter and the second quantization parameter is calculated, a difference between the quantization parameter of the left reconstructed image block and the quantization difference is calculated to obtain the corrected quantization parameter of the left reconstructed image block, and the average of the quantization parameter of the upper reconstructed image block and the corrected quantization parameter of the left reconstructed image block is calculated to obtain the quantization parameter predictor of the current to-be-reconstructed image block.

It should be noted that the quantization parameter predictor of the current to-be-reconstructed image block is usually determined in the manner in the case 2. When there is no left reconstructed image block or upper reconstructed image block in the current to-be-reconstructed image block, the quantization parameter predictor of the current to-be-reconstructed image block may be determined in the manner in the case 1.

Case 3: The M reconstructed image blocks are one reconstructed image block, and obtaining quantization parameters of the M reconstructed image blocks and coding schemes of the M reconstructed image blocks includes searching reconstructed image blocks falling within a preset range for a reconstructed image block having a same coding scheme as the current to-be-reconstructed image block. The preset range is a preset range in the current image area. Optionally, the preset range may be a quantity of reconstructed image blocks from which a reconstructed image block is selected and that rank ahead of the current to-be-reconstructed image block, or the preset range may be a slice from which a reconstructed image block is selected. After the reconstructed image block is found, a quantization parameter of the reconstructed image block is obtained. Correspondingly, determining the quantization parameter predictor of the current to-be-reconstructed image block according to the coding scheme of the current to-be-reconstructed image block and the coding schemes of the M reconstructed image blocks based on the quantization parameters of the M reconstructed image blocks includes using the quantization parameter of the reconstructed image block as the quantization parameter predictor of the current to-be-reconstructed image block.

Optionally, the one reconstructed image block is a reconstructed image block that is in the reconstructed image blocks falling within the preset range and that is closest to the current to-be-reconstructed image block in a decoding sequence.

The reconstructed image block having the same coding scheme as the current to-be-reconstructed image block is found from the reconstructed image blocks falling within the preset range in the current image area, in the following two optional manners.

Manner 1: A coding scheme of a previous reconstructed image block of the current to-be-reconstructed image block is determined in the decoding sequence. If the coding scheme of the current to-be-reconstructed image block is the same as the coding scheme of the previous reconstructed image block, a quantization parameter of the previous reconstructed image block is used as the quantization parameter predictor of the current to-be-reconstructed image block. If the coding scheme of the current to-be-reconstructed image block is different from the coding scheme of the previous reconstructed image block, a coding scheme of a reconstructed image block that is prior to the previous reconstructed image block is determined. If the coding scheme of the current to-be-reconstructed image block is the same as the coding scheme of the reconstructed image block that is prior to the previous reconstructed image block, a quantization parameter of the reconstructed image block that is prior to the previous reconstructed image block is used as the quantization parameter predictor of the current to-be-reconstructed image block, otherwise, the foregoing method continues to be performed until the reconstructed image block having the same coding scheme as the current to-be-reconstructed image block is found, and the quantization parameter of the reconstructed image block is used as the quantization parameter predictor of the current to-be-reconstructed image block. The reconstructed image block having the same coding scheme as the current to-be-reconstructed image block is usually searched for without crossing slices, that is, is searched for in a slice in which the current to-be-reconstructed image block is located.

Manner 2: A latest quantization parameter of a reconstructed image block coded using the downsampling coding scheme is assigned to a variable $QP_{down}^{prev}$, and a latest quantization parameter of a reconstructed image block coded using the original resolution coding scheme is assigned to a variable $QP_{org}^{prev}$. For example, in the decoding sequence, if a coding scheme of the first reconstructed image block is the original resolution coding scheme, a quantization parameter of the first reconstructed image block is assigned to $QP_{org}^{prev}$, if a coding scheme of the second reconstructed image block is the downsampling coding scheme, a quantization parameter of the second reconstructed image block is assigned to $QP_{down}^{prev}$, if a coding scheme of the third reconstructed image block is the original resolution coding scheme, a quantization parameter of the third reconstructed image block is assigned to $QP_{org}^{prev}$, and the like. In this way, the latest quantization parameter of the reconstructed image block coded using the downsampling coding scheme is assigned to the variable $QP_{down}^{prev}$, and the latest quantization parameter of the reconstructed image block coded using the original resolution coding scheme is assigned to the variable $QP_{org}^{prev}$. If the coding scheme of the current to-be-reconstructed image block is the original resolution coding scheme, a quantization parameter corresponding to $QP_{org}^{prev}$ is used as the quantization parameter predictor of the current to-be-reconstructed image block. If the coding scheme of the current to-be-reconstructed image block is the downsampling coding scheme, a quantization parameter corresponding to $QP_{down}^{prev}$ is used as the quantization parameter predictor of the current to-be-reconstructed image block.

The foregoing optional manner 4 is described in detail. Correcting a first quantization parameter based on the quantization parameter prediction difference to obtain the quantization parameter predictor of the current to-be-reconstructed image block includes subtracting the quantization parameter prediction difference from the first quantization parameter to obtain the quantization parameter predictor of the current to-be-reconstructed image block, or subtracting the quantization parameter prediction difference from the first quantization parameter, and then correcting a difference to obtain the quantization parameter predictor of the current to-be-reconstructed image block. Similarly, correcting a second quantization parameter based on the quantization parameter prediction difference to obtain the quantization parameter predictor of the current to-be-reconstructed image block includes subtracting the quantization parameter prediction difference from the second quantization parameter to obtain the quantization parameter predictor of the current to-be-reconstructed image block, or subtracting the quantization parameter prediction difference from the second quantization parameter, and then correcting a difference to obtain the quantization parameter predictor of the current to-be-reconstructed image block.

Step S1403 is described in detail. Optionally, the decoder side pre-negotiates a method for calculating the quantization parameter predictor with the encoder side. Based on this, the decoder side may reversely calculate the quantization parameter of the current to-be-reconstructed image block according to the method for calculating the quantization parameter predictor. For example, if the encoder side calculates a difference between the quantization parameter of the current to-be-reconstructed image block and the quantization parameter predictor corresponding to the current to-be-reconstructed image block to obtain the quantization parameter prediction difference, the decoder side may calculate a sum of the quantization parameter predictor and the quantization parameter prediction difference of the current to-be-reconstructed image block to obtain the quantization parameter of the current to-be-reconstructed image block. If the encoder side calculates the difference between the quantization parameter of the current to-be-reconstructed image block and the quantization parameter predictor corresponding to the current to-be-reconstructed image block, and then multiplies a difference by an adjustment factor to finally obtain the quantization parameter prediction difference, the decoder side may first calculate a quotient of the quantization parameter prediction difference and the adjustment factor to obtain a division result, and then calculate a sum of the quantization parameter predictor of the current to-be-reconstructed image block and the division result to obtain the quantization parameter of the current to-be-reconstructed image block.

Optionally, the decoder side may not pre-negotiate the method for calculating the quantization parameter predictor with the encoder side, but add the method to the code stream. Alternatively, the encoder side first sends a message to the decoder side, and the message carries the method.

Step S1404 is the same as step S1303, and corresponding content and effects are not described herein again.

Optionally, after step S1404, the method further includes generating a reconstruction signal of the current to-be-reconstructed image block, reconstructing the current to-be-reconstructed image block based on the reconstruction signal to obtain the current reconstructed image block, and if the coding scheme of the current reconstructed image block is the downsampling coding scheme, performing upsampling processing on the current reconstructed image block based on a pixel of an adjacent reconstructed image block required for performing upsampling processing on the current reconstructed image block. For details about the upsampling processing performed on the current reconstructed image block, refer to the foregoing upsampling processing method. The adjacent reconstructed image block required for performing upsampling processing on the current reconstructed image block is related to a filter used by the decoder side to perform upsampling processing. For example, the required adjacent reconstructed image block may be an upper image block, a lower image block, a left image block, and a right image block. Alternatively, the required adjacent reconstructed image block includes an upper image block, a lower image block, a left image block, a right image block, an upper-left image block, a lower-left image block, an upper-right image block, and a lower-right image block of the current reconstructed image block. A process of the upsampling processing is not limited in this disclosure.

In conclusion, because image blocks have respective features in this disclosure, and the encoder side differently codes the image blocks, the decoder side may determine the quantization parameter of the current to-be-reconstructed image block according to the coding scheme of the current to-be-reconstructed image block. That is, the quantization parameter is pertinent for reconstructing the current to-be-reconstructed image block. Therefore, a reconstructed image block obtained by the decoder side has a better effect.

FIG. 15 is a flowchart of an image processing method according to still another embodiment of this disclosure. As shown in FIG. 15, the method includes the following procedure.

Step S1501: Obtain a first quantization parameter of a current image area in an original resolution coding scheme, a second quantization parameter of the current image area in a downsampling coding scheme, a coding scheme of a current to-be-coded image block in the current image area, a coded signal of the current to-be-coded image block, and a prediction signal of the current to-be-coded image block.

Step S1502: Determine a quantization parameter of the current to-be-coded image block according to the coding scheme of the current to-be-coded image block, where the quantization parameter of the current to-be-reconstructed image block is a first quantization parameter or a second quantization parameter, or the quantization parameter of the current to-be-reconstructed image block is a quantization parameter obtained by correcting the first quantization parameter or a quantization parameter obtained by correcting the second quantization parameter.

Step S1503: Generate a residual signal of the current to-be-coded image block based on the prediction signal and the coded signal.

Step S1504: Code the residual signal based on the quantization parameter of the current to-be-reconstructed image block.

Step S1501 is described in detail. The first quantization parameter may be a quantization parameter at a video level (sequence level), an image level, or an image slice level in the original resolution coding scheme. The image area in this embodiment of the present disclosure may be an image, or may be an image slice. Using the video level as an example, the first quantization parameter can be used, provided that the original resolution coding scheme is used for each frame of image in a same video and each image block in each frame of image. Using the image level as an example, the first quantization parameter can be used, provided that the original resolution coding scheme is used for each image block in a same image. Using the image slice level as an example, the first quantization parameter can be used, provided that the original resolution coding scheme is used for each image block in a same image slice. Similarly, the second quantization parameter may be a quantization parameter at a video level (sequence level), an image level, or an image slice level in the downsampling coding scheme.

Optionally, if the first quantization parameter is a quantization parameter at the video level, the second quantization parameter is also a quantization parameter at the video level. Similarly, if the first quantization parameter is a quantization parameter at the image level, the second quantization parameter is also a quantization parameter at the image level. If the first quantization parameter is a quantization parameter at the image slice level, the second quantization parameter is also a quantization parameter at the image slice level.

For a value range of the first quantization parameter, refer to an existing standard. For example, the first quantization parameter ranges from 0 to 51 in H.265, and the second quantization parameter is usually less than the first quantization parameter.

Optionally, obtaining a first quantization parameter and a second quantization parameter includes that the first quantization parameter and the second quantization parameter are directly obtained from a configuration file of an encoder side.

Alternatively, the first quantization parameter and a quantization parameter prediction difference of the current image area are directly obtained from the configuration file of the encoder side. A meaning represented by the quantization parameter prediction difference may be a difference obtained by subtracting the second quantization parameter from the first quantization parameter. In this case, obtaining a second quantization parameter of the current image area in a downsampling coding scheme includes calculating a difference between the first quantization parameter and the quantization parameter prediction difference to obtain the second quantization parameter. Alternatively, the meaning represented by the quantization parameter prediction difference may be a difference obtained by subtracting the first quantization parameter from the second quantization parameter. In this case, obtaining a second quantization parameter of the current image area in a downsampling coding scheme includes calculating a sum of the first quantization parameter and the quantization parameter prediction difference to obtain the second quantization parameter.

Alternatively, the second quantization parameter and the quantization parameter prediction difference of the current image area are directly obtained from the configuration file of the encoder side. A meaning represented by the quantization parameter prediction difference is the same as that of the foregoing quantization parameter prediction difference. The first quantization parameter may be determined based on the second quantization parameter and the quantization parameter prediction difference. A specific method for determining the first quantization parameter is similar to a method for determining the second quantization parameter, and details are not described herein again.

The coding scheme of the current to-be-coded image block is the original resolution coding scheme or the downsampling coding scheme. When the coding scheme of the current to-be-coded image block is the original resolution coding scheme, the coded signal is an original signal of the current to-be-coded image block, or when the coding scheme of the current to-be-coded image block is the downsampling coding scheme, the coded signal is a signal obtained after downsampling processing is performed on the original signal of the current to-be-coded image block.

The coding scheme of the current to-be-coded image block is obtained in the following several optional manners.

Optional manner 1: The coding scheme of the current to-be-coded image block is directly obtained. That is, the coding mode of the current to-be-coded image block is determined.

Optional manner 2: First coding costs used when the original resolution coding scheme is used for the current to-be-coded image block is determined based on the first quantization parameter, second coding costs used when the downsampling coding scheme is used for the current to-be-coded image block is determined based on the second quantization parameter, and a coding scheme corresponding to a lowest coding cost in the first coding costs and the second coding costs is used as the coding scheme of the current to-be-coded image block.

Optionally, the encoder side may calculate a coding cost of a current coded image block using a rate-distortion optimization (RDO) method. The RDO method is an optimal method for improving video compression performance. A principle of the RDO method is that a loss (image quality) in a video and a bit rate (a data amount required for coding) are simultaneously optimized to achieve an optimal balancing point. This algorithm is initially used by an encoder during video compression. However, the algorithm may also be used to code various multimedia including videos and audios, provided that both quality and a file size are considered during coding.

Optionally, a process of calculating a coding cost using the RDO method is as follows. It is assumed that the current to-be-coded image block is coded using the original resolution coding scheme, after obtaining a quantization coefficient of the current to-be-coded image block, the encoder side needs to perform dequantization on the quantization coefficient of the current to-be-coded image block based on the first quantization parameter to obtain a transform coefficient, perform inverse transform on the transform coefficient to obtain a reconstructed residual signal, add the reconstructed residual signal and the prediction signal corresponding to the current to-be-coded image block to obtain a reconstruction signal of the current to-be-coded image block, and obtain a current reconstructed image block based on the reconstruction signal. An error between the current reconstructed image block and a to-be-coded image block is calculated, and a smaller error indicates a lower first coding cost. Calculating an error between the current reconstructed image block and a to-be-coded image block includes calculating a difference between each pixel in the current reconstructed image block and a corresponding pixel in the to-be-coded image block, to obtain a corresponding difference, calculating a weighted average of all differences in the current reconstructed image block, and finally obtaining the error between the current reconstructed image block and the to-be-coded image block.

It is assumed that the current to-be-coded image block is coded using the downsampling coding scheme, after obtaining a quantization coefficient of the current to-be-coded image block, the encoder side needs to perform dequantization on the quantization coefficient of the current to-be-coded image block based on the second quantization parameter to obtain a transform coefficient, perform inverse transform on the transform coefficient to obtain a reconstructed residual signal, add the reconstructed residual signal and the prediction signal corresponding to the current to-be-coded image block, to obtain a reconstruction signal of the current to-be-coded image block, and obtain a current reconstructed image block based on the reconstruction signal. An error between the current reconstructed image block and a to-be-coded image block is calculated, and a smaller error indicates a lower second coding cost. Calculating an error between the current reconstructed image block and a to-be-coded image block includes calculating a difference between each pixel in the current reconstructed image block and a corresponding pixel in the to-be-coded image block to obtain a corresponding difference, calculating a weighted average of all differences in the current reconstructed image block, and finally obtaining the error between the current reconstructed image block and the to-be-coded image block.

Optionally, it is assumed that there is a fixed mapping relationship between a quantization parameter and a coding cost. In this case, the first coding cost used when the original resolution coding scheme is used for the current to-be-coded image block may be directly determined based on the first quantization parameter, the second coding cost used when the downsampling coding scheme is used for the current to-be-coded image block may be directly determined based on the second quantization parameter, and the coding scheme corresponding to the lower coding cost of the first coding cost and the second coding cost is used as the coding scheme of the current to-be-coded image block.

Based on this, in this disclosure, a coding scheme used for the to-be-coded image block is a coding scheme with a minimum coding cost. This makes coding performed by the encoder side easier, and improves coding efficiency of the encoder side.

Optional manner 3: The first quantization parameter is corrected for at least one time to obtain at least one third quantization parameter, and the second quantization parameter is corrected for at least one time to obtain at least one fourth quantization parameter, third coding costs used when the original resolution coding scheme is used for the current to-be-coded image block is determined based on the third quantization parameters, and fourth coding costs used when the downsampling coding scheme is used for the current to-be-coded image block is determined based on the fourth quantization parameters, and a coding scheme corresponding to a lowest coding cost in the third coding costs and the fourth coding costs is used as the coding scheme of the current to-be-coded image block.

For example, the first quantization parameter is corrected twice, which includes correcting the first quantization parameter for the first time such that a third quantization parameter is obtained by subtracting 3 from the first quantization parameter, and correcting the first quantization parameter for the second time such that a third quantization parameter is obtained by subtracting 6 from the first quantization parameter. The second quantization parameter is corrected twice, which includes correcting the second quantization parameter for the first time such that a fourth quantization parameter is obtained by subtracting 3 from the second quantization parameter, and correcting the second quantization parameter for the second time such that a fourth quantization parameter is obtained by subtracting 6 from the second quantization parameter. Then, the third coding cost and the fourth coding cost may be determined using a method similar to the foregoing method, and the coding scheme corresponding to the lower coding cost of the third coding cost and the fourth coding cost is used as the coding scheme of the current to-be-coded image block.

Further, the encoder side predicts the current to-be-coded image block using M reference reconstructed image blocks of the current to-be-coded image block to obtain the prediction signal of the current to-be-coded image block, where M is a positive integer greater than or equal to 1. For example, if the coding scheme of the current to-be-coded image block is the original resolution coding scheme, and the M reference reconstructed image blocks include a reference reconstructed image block coded using the original resolution coding scheme, a reference pixel of the current to-be-coded image block is determined in pixels of the reference reconstructed image block coded using the original resolution coding scheme. If the coding scheme of the current to-be-coded image block is the original resolution coding scheme, and the M reference reconstructed image blocks include a reference reconstructed image block coded using the downsampling coding scheme, a pixel required for reconstructing the current to-be-coded image block is obtained from pixels of the reference reconstructed image block coded using the downsampling coding scheme, and upsampling processing is performed on the pixel required for reconstructing the current to-be-coded image block to obtain the reference pixel of the current to-be-coded image block. If the coding scheme of the current to-be-coded image block is the downsampling coding scheme, and the M reference reconstructed image blocks include the reference reconstructed image block coded using the downsampling coding scheme, the reference pixel of the current to-be-coded image block is determined in the pixels of the reference reconstructed image block coded using the downsampling coding scheme. If the coding scheme of the current to-be-coded image block is the downsampling coding scheme, and the M reference reconstructed image blocks include the reference reconstructed image block coded using the original resolution coding scheme, the pixel required for reconstructing the current to-be-coded image block is obtained from the pixels of the reference reconstructed image block coded using the original resolution coding scheme, and downsampling processing is performed on the pixel required for reconstructing the current to-be-coded image block, to obtain the reference pixel of the current to-be-coded image block. Finally, according to the foregoing intra-frame prediction method, the prediction signal of the current to-be-coded image block is obtained using the reference pixel of the current to-be-coded image block. How to obtain the prediction signal of the current to-be-coded image block is not limited in this disclosure.

Step S1503 is described in detail. A difference between the coded signal and the prediction signal of the current to-be-coded image block is calculated to obtain the residual signal of the current to-be-coded image block. How to calculate the residual signal of the current to-be-coded image block is not limited in this disclosure.

Step S1504 is described in detail. Transform and quantization operations are performed on the residual signal, and the quantization coefficient is obtained after the transform and quantization. How to code the residual signal is not limited in this disclosure. In some embodiments, the quantization operation may be directly performed on the residual signal to obtain the quantization coefficient. That is, no transform operation is performed on the residual signal. For example, no transform operation needs to be performed on the residual signal in a transform skip mode.

Step S1502 is described in detail according to the second optional manner of obtaining a coding scheme. If the coding scheme of the current to-be-coded image block is the original resolution coding scheme, the quantization parameter of the current to-be-coded image block is determined as the first quantization parameter, or if the coding scheme of the current to-be-coded image block is the downsampling coding scheme, the quantization parameter of the current to-be-coded image block is determined as the second quantization parameter.

Further, the image processing method includes generating a code stream. The code stream includes the first quantization parameter, the second quantization parameter, and the coding scheme of the current to-be-reconstructed image block, or the code stream includes the first quantization parameter, the quantization parameter prediction difference of the current image area, and the coding scheme of the current to-be-reconstructed image block. Entropy coding is performed on the quantization coefficient of the current to-be-coded image block to obtain the code stream.

Step S1502 is described in detail according to the third optional manner of obtaining a coding scheme. If the coding scheme of the current to-be-coded image block is the original resolution coding scheme, one of the at least one third quantization parameter is determined as the quantization parameter of the current to-be-coded image block, or if the coding scheme of the current to-be-coded image block is the downsampling coding scheme, one of the at least one fourth quantization parameter is determined as the quantization parameter of the current to-be-coded image block.

Optionally, if the coding scheme of the current to-be-coded image block is the original resolution coding scheme, a third quantization parameter corresponding to a lowest third coding cost is selected from all the third coding costs as the quantization parameter of the current to-be-coded image block, or if the coding scheme of the current to-be-coded image block is the downsampling coding scheme, a fourth quantization parameter corresponding to a lowest fourth coding cost is selected from all the fourth coding costs as the quantization parameter of the current to-be-coded image block.

Further, the image processing method includes obtaining a quantization parameter predictor of the current to-be-coded image block, calculating a quantization parameter prediction difference of the current to-be-coded image block based on the quantization parameter predictor and the quantization parameter of the current to-be-coded image block, and generating a code stream. The code stream includes the coding scheme of the current to-be-coded image block and the quantization parameter prediction difference of the current to-be-coded image block.

The encoder side subtracts the quantization parameter predictor corresponding to the current to-be-reconstructed image block from the quantization parameter of the current to-be-reconstructed image block to obtain the quantization parameter prediction difference. Alternatively, the encoder side subtracts the quantization parameter predictor corresponding to the current to-be-reconstructed image block from the quantization parameter of the current to-be-reconstructed image block, adjusts a difference to finally obtain the quantization parameter prediction difference, and adds the quantization parameter prediction difference to the code stream. Alternatively, the encoder side subtracts the quantization parameter of the current to-be-reconstructed image block from the quantization parameter predictor corresponding to the current to-be-reconstructed image block to obtain the quantization parameter prediction difference. Alternatively, the encoder side subtracts the quantization parameter of the current to-be-reconstructed image block from the quantization parameter predictor corresponding to the current to-be-reconstructed image block, and then adjusts a difference to finally obtain the quantization parameter prediction difference. Alternatively, the quantization parameter prediction difference is a quantization parameter prediction difference directly obtained from the configuration file of the encoder side.

The quantization parameter predictor of the current to-be-coded image block is obtained in the following several optional manners.

In an optional manner, the quantization parameter predictor of the current to-be-coded image block is directly determined according to the coding scheme of the current to-be-coded image block. For example, if the coding scheme of the current to-be-coded image block is the original resolution coding scheme, the quantization parameter predictor of the current to-be-coded image block is determined as a quantization parameter A, or if the coding scheme of the current to-be-coded image block is the downsampling coding scheme, the quantization parameter predictor of the current to-be-coded image block is determined as a quantization parameter B.

In an optional manner 2, M reconstructed image blocks are selected according to a preset rule, quantization parameters of the M reconstructed image blocks and coding schemes of the M reconstructed image blocks are obtained, where the M reconstructed image blocks belong to the same current image area as the current to-be-coded image block, and M is a positive integer, and the quantization parameter predictor of the current to-be-coded image block is determined according to the coding scheme of the current to-be-coded image block and the coding schemes of the M reconstructed image blocks based on the quantization parameters of the M reconstructed image blocks.

The preset rule may be selecting a previous reconstructed image block of the current to-be-coded image block in a coding sequence, selecting an upper reconstructed image block and a left reconstructed image block of the current to-be-coded image block, or selecting, in the coding sequence from reconstructed image blocks falling within a preset range, a reconstructed image block that has a same coding scheme as the current to-be-coded image block and that is closest to the current to-be-coded image block. It should be noted that the preset rule is not limited in this disclosure.

Specially, if the current to-be-coded image block is the first image block in a current image in the decoding sequence, that is, when the M reconstructed image blocks do not exist in the current image, the first quantization parameter of the current image area in the original resolution coding scheme is obtained when the coding scheme of the current to-be-coded image block is the original resolution coding scheme, and the first quantization parameter is used as the quantization parameter predictor of the current to-be-coded image block, or the second quantization parameter of the current image area in the downsampling coding scheme is obtained when the coding scheme of the current to-be-coded image block is the downsampling coding scheme, and the second quantization parameter is used as the quantization parameter predictor of the current to-be-coded image block.

In an optional manner 3, if the coding scheme of the current to-be-coded image block is the original resolution coding scheme, the first quantization parameter is used as the quantization parameter predictor of the current to-be-coded image block, or if the coding scheme of the current to-be-coded image block is the downsampling coding scheme, the second quantization parameter is used as the quantization parameter predictor of the current to-be-coded image block.

The manner 2 is described in detail.

Case 1: The M reconstructed image blocks are one reconstructed image block, and determining the quantization parameter predictor of the current to-be-coded image block according to the coding scheme of the current to-be-coded image block and the coding schemes of the M reconstructed image blocks based on the quantization parameters of the M reconstructed image blocks includes, if a coding scheme of the one reconstructed image block is the same as the coding scheme of the current to-be-coded image block, determining a quantization parameter of the one reconstructed image block as the quantization parameter predictor of the current to-be-coded image block, or if the coding scheme of the one reconstructed image block is different from the coding scheme of the current to-be-coded image block, determining the quantization parameter predictor of the current to-be-coded image block according to the coding scheme of the one reconstructed image block and the coding scheme of the current to-be-coded image block based on the first quantization parameter and the second quantization parameter.

Optionally, if the coding scheme of the one reconstructed image block is the downsampling coding scheme, and the coding scheme of the current to-be-coded image block is the original resolution coding scheme, the second quantization parameter is subtracted from the first quantization parameter to obtain a quantization difference, and a sum of the quantization parameter of the one reconstructed image block and the quantization difference is calculated to obtain the quantization parameter predictor, or if the coding scheme of the one reconstructed image block is the original resolution coding scheme, and the coding scheme of the current to-be-coded image block is the downsampling coding scheme, the second quantization parameter is subtracted from the first quantization parameter to obtain the quantization difference, and a difference between the quantization parameter of the one reconstructed image block and the quantization difference is calculated to obtain the quantization parameter predictor.

Alternatively, if the coding schemes of the M reconstructed image blocks each are the downsampling coding scheme, and the coding scheme of the current to-be-coded image block is the original resolution coding scheme, the second quantization parameter is subtracted from the first quantization parameter to obtain the quantization difference, and then the quantization difference is corrected. For example, the quantization difference is multiplied by an adjustment factor. A sum of the quantization parameter of the one reconstructed image block and a corrected quantization difference is calculated to obtain the quantization parameter predictor. Alternatively, if the coding scheme of the one reconstructed image block is the original resolution coding scheme, and the coding scheme of the current to-be-coded image block is the downsampling coding scheme, the second quantization parameter is subtracted from the first quantization parameter to obtain the quantization difference, the quantization difference is corrected, and a difference between the quantization parameter of the one reconstructed image block and the corrected quantization difference is calculated to obtain the quantization parameter predictor.

Further, if the coding scheme of the one reconstructed image block is the same as the coding scheme of the current to-be-coded image block, it indicates that the quantization parameter of the one reconstructed image block may be directly used as the quantization parameter predictor. If the coding scheme of the one reconstructed image block is the downsampling coding scheme, and the coding scheme of the current to-be-coded image block is the original resolution coding scheme, it indicates that a value needs to be added to the quantization parameter of the one reconstructed image block to obtain the quantization parameter predictor. If the coding scheme of the one reconstructed image block is the original resolution coding scheme, and the coding scheme of the current to-be-coded image block is the downsampling coding scheme, it indicates that a value needs to be subtracted from the quantization parameter of the one reconstructed image block to obtain the quantization parameter predictor.

Optionally, the one reconstructed image block is a previous reconstructed image block of the current to-be-coded image block in a coding sequence. For example, in the H.265 standard, assuming that the coding sequence is from top to bottom and from left to right, and the current to-be-coded image block is a non-left-boundary image block, the previous reconstructed image block of the current to-be-coded image block is on the left of the current to-be-coded image block, and is adjacent to the current to-be-coded image block. Assuming that the coding sequence is from top to bottom and from left to right, and the current to-be-coded image block is a left-boundary image block, the previous reconstructed image block of the current to-be-coded image block is a rightmost reconstructed image block in an upper row of the current to-be-coded image block.

Optionally, M is greater than 1, and determining the quantization parameter predictor of the current to-be-coded image block according to the coding scheme of the current to-be-coded image block and the coding schemes of the M reconstructed image blocks based on the quantization parameters of the M reconstructed image blocks includes, if the coding schemes of the M reconstructed image blocks each are the same as the coding scheme of the current to-be-coded image block, determining an average of the quantization parameters of the M reconstructed image blocks as the quantization parameter predictor of the current to-be-coded image block, or if a coding scheme of one reconstructed image block is different from the coding scheme of the current to-be-reconstructed image block, determining the quantization parameter predictor of the current to-be-coded image block according to the coding schemes of the M reconstructed image blocks and the coding scheme of the current to-be-coded image block based on the first quantization parameter and the second quantization parameter.

Optionally, if the M reconstructed image blocks include a reconstructed image block coded using the downsampling coding scheme, and the coding scheme of the current to-be-coded image block is the original resolution coding scheme, a corrected quantization parameter of the reconstructed image block coded using the downsampling coding scheme is calculated based on the first quantization parameter, the second quantization parameter, and a quantization parameter of the reconstructed image block coded using the downsampling coding scheme, and the average of the quantization parameters of the M reconstructed image blocks is determined based on the corrected quantization parameter of the reconstructed image block coded using the downsampling coding scheme. The average is the quantization parameter predictor of the current to-be-coded image block. If the M reconstructed image blocks include a reconstructed image block coded using the original resolution coding scheme, and the coding scheme of the current to-be-coded image block is the downsampling coding scheme, a corrected quantization parameter of the reconstructed image block coded using the original resolution coding scheme is calculated, and the average of the quantization parameters of the M reconstructed image blocks is determined based on the first quantization parameter, the second quantization parameter, a quantization parameter of the reconstructed image block coded using the original resolution coding scheme, and the corrected quantization parameter of the reconstructed image block coded using the original resolution coding scheme. The average is the quantization parameter predictor of the current to-be-coded image block.

Optionally, calculating, based on the first quantization parameter, the second quantization parameter, and a quantization parameter of the reconstructed image block coded using the downsampling coding scheme, a corrected quantization parameter of the reconstructed image block coded using the downsampling coding scheme includes subtracting the second quantization parameter from the first quantization parameter to obtain a quantization difference, and calculating a sum of the quantization difference and the quantization parameter of the reconstructed image block coded using the downsampling coding scheme to obtain the corrected quantization parameter of the reconstructed image block coded using the downsampling coding scheme, or subtracting the first quantization parameter from the second quantization parameter to obtain a quantization difference, and calculating a difference between the quantization difference and the quantization parameter of the reconstructed image block coded using the downsampling coding scheme, to obtain the corrected quantization parameter of the reconstructed image block coded using the downsampling coding scheme.

Based on this, optionally, determining the average of the quantization parameters of the M reconstructed image blocks based on the corrected quantization parameter of the reconstructed image block coded using the downsampling coding scheme includes determining, as the quantization parameter predictor of the current to-be-coded image block, an average of corrected quantization parameters of all (or some) reconstructed image blocks that are in the M reconstructed image blocks and that are coded using the original resolution coding scheme and quantization parameters of all (or some) reconstructed image blocks that are in the M reconstructed image blocks and that are coded using the downsampling coding scheme.

Optionally, calculating, based on the first quantization parameter, the second quantization parameter, and a quantization parameter of the reconstructed image block coded using the original resolution coding scheme, a corrected quantization parameter of the reconstructed image block coded using the original resolution coding scheme includes subtracting the second quantization parameter from the first quantization parameter to obtain the quantization difference, and calculating a difference between the quantization difference and the quantization parameter of the reconstructed image block coded using the original resolution coding scheme to obtain the corrected quantization parameter of the reconstructed image block coded using the original resolution coding scheme, or subtracting the first quantization parameter from the second quantization parameter to obtain the quantization difference, and calculating a sum of the quantization difference and the quantization parameter of the reconstructed image block coded using the original resolution coding scheme, to obtain the corrected quantization parameter of the reconstructed image block coded using the original resolution coding scheme.

Based on this, optionally, deter scheme, or mining the average of the quantization parameters of the M reconstructed image blocks based on the corrected quantization parameter of the reconstructed image block coded using the original resolution coding scheme includes determining, as the quantization parameter predictor of the current to-be-coded image block, an average of corrected quantization parameters of all (or some) reconstructed image blocks that are in the M reconstructed image blocks and that are coded using the downsampling coding scheme and quantization parameters of all (or some) reconstructed image blocks that are in the M reconstructed image blocks and that are coded using the original resolution coding scheme.

Optionally, the M reconstructed image blocks include an upper reconstructed image block and a left reconstructed image block of the current to-be-coded image block.

Further, it is assumed that M is equal to 2, the M reconstructed image blocks are an upper reconstructed image block and a left reconstructed image block of the current to-be-coded image block, and the current to-becoded image block, the upper reconstructed image block, and the left reconstructed image block all are coded using the original resolution coding scheme or the downsampling coding scheme. In this case, an average of a quantization parameter of the upper reconstructed image block and a quantization parameter of the left reconstructed image block is calculated to obtain the quantization parameter predictor of the current to-be-coded image block. It is assumed that both the current to-be-coded image block and the upper reconstructed image block are coded using the original resolution coding scheme, and the left reconstructed image block is coded using the downsampling coding scheme. In this case, the quantization difference between the first quantization parameter and the second quantization parameter is calculated, a sum of the quantization parameter of the left reconstructed image block and the quantization difference is calculated to obtain a corrected quantization parameter of the left reconstructed image block, and an average of the quantization parameter of the upper reconstructed image block and the corrected quantization parameter of the left reconstructed image block is calculated to obtain the quantization parameter predictor of the current to-be-coded image block. It is assumed that both the current to-be-coded image block and the upper reconstructed image block are coded using the downsampling coding scheme, and the left reconstructed image block is coded using the original resolution coding scheme. In this case, the quantization difference between the first quantization parameter and the second quantization parameter is calculated, a sum of the quantization parameter of the left reconstructed image block and the quantization difference is calculated to obtain a corrected quantization parameter of the left reconstructed image block, and the average of the quantization parameter of the upper reconstructed image block and the corrected quantization parameter of the left reconstructed image block is calculated to obtain the quantization parameter predictor of the current to-be-coded image block.

It should be noted that the quantization parameter predictor of the current to-be-coded image block is usually determined in the manner in the case 2. When there is no left reconstructed image block or upper reconstructed image block in the current to-be-coded image block, the quantization parameter predictor of the current to-be-coded image block may be determined in the manner in the case 1.

Case 3: The M reconstructed image blocks are one reconstructed image block, and the obtaining quantization parameters of the M reconstructed image blocks and coding schemes of the M reconstructed image blocks includes searching reconstructed image blocks falling within a preset range for a reconstructed image block having a same coding scheme as the current to-be-coded image block. The preset range is a preset range in the current image area. Optionally, the preset range may be a quantity of reconstructed image blocks from which a reconstructed image block is selected and that rank ahead of the current to-be-coded image block, or the preset range may be a slice from which a reconstructed image block is selected. After the reconstructed image block is found, a quantization parameter of the reconstructed image block is obtained. Correspondingly, determining the quantization parameter predictor of the current to-be-coded image block according to the coding scheme of the current to-be-reconstructed image block and the coding schemes of the M reconstructed image blocks based on the quantization parameters of the M reconstructed image blocks includes using the quantization parameter of the reconstructed image block as the quantization parameter predictor of the current to-be-coded image block.

Optionally, the one reconstructed image block is a reconstructed image block that is in the reconstructed image blocks falling within the preset range and that is closest to the current to-be-reconstructed image block in a coding sequence.

Further, a coding scheme of a previous reconstructed image block of the current to-be-coded image block is determined in the coding sequence. If the coding scheme of the current to-be-coded image block is the same as the coding scheme of the previous reconstructed image block, a quantization parameter of the previous reconstructed image block is used as the quantization parameter predictor of the current to-be-coded image block. If the coding scheme of the current to-be-coded image block is different from the coding scheme of the previous reconstructed image block, a coding scheme of a reconstructed image block that is prior to the previous reconstructed image block is determined. If the coding scheme of the current to-be-coded image block is the same as the coding scheme of the reconstructed image block that is prior to the previous reconstructed image block, a quantization parameter of the reconstructed image block that is prior to the previous reconstructed image block is used as the quantization parameter predictor of the current to-be-coded image block, otherwise, the foregoing method continues to be performed until the reconstructed image block having the same coding scheme as the current to-be-coded image block is found, and the quantization parameter of the reconstructed image block is used as the quantization parameter predictor of the current to-be-coded image block. The reconstructed image block having the same coding scheme as the current to-be-coded image block is usually searched for without crossing slices, that is, is searched for in a slice in which the current to-be-coded image block is located.

Alternatively, a latest quantization parameter of a reconstructed image block coded using the downsampling coding scheme is assigned to a variable $QP_{down}^{prev}$, and a latest quantization parameter of a reconstructed image block coded using the original resolution coding scheme is assigned to a variable $QP_{org}^{prev}$. For example, in the decoding sequence, if a coding scheme of the first reconstructed image block is the original resolution coding scheme, a quantization parameter of the first reconstructed image block is assigned to $QP_{org}^{prev}$. If a coding scheme of the second reconstructed image block is the downsampling coding scheme, a quantization parameter of the second reconstructed image block is assigned to $QP_{down}^{prev}$. If a coding scheme of the third reconstructed image block is the original resolution coding scheme, a quantization parameter of the third reconstructed image block is assigned to $QP_{org}^{prev}$. By analogy, the latest quantization parameter of the reconstructed image block coded using the downsampling coding scheme is assigned to the variable $QP_{down}^{prev}$, and the latest quantization parameter of the reconstructed image block coded using the original resolution coding scheme is assigned to $QP_{org}^{prev}$. If the coding scheme of the current to-be-reconstructed image block is the original resolution coding scheme, a quantization parameter corresponding to $QP_{org}^{prev}$ is used as the quantization parameter predictor of the current to-be-coded image block. If the coding scheme of the current to-be-reconstructed image block is the downsampling coding scheme, a quantization parameter corresponding to $QP_{down}^{prev}$ is used as the quantization parameter predictor of the current to-be-coded image block.

In conclusion, because image blocks have respective features in this disclosure, and the encoder side differently codes the image blocks, the encoder side may determine the quantization parameter of the current to-be-coded image block according to the coding scheme of the current to-be-reconstructed image block. That is, the quantization parameter is pertinent for coding the current to-be-coded image block. Therefore, the encoder side implements a better coding effect.

Figure 16:
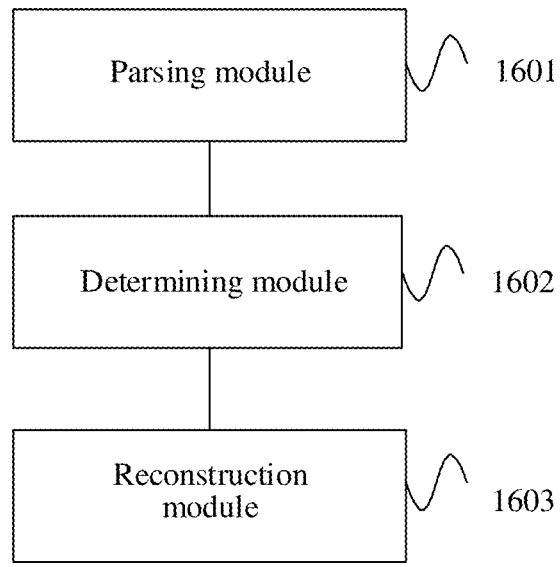
FIG. 16 is a schematic structural diagram of an image processing device according to an embodiment of this disclosure.

FIG. 16 is a schematic structural diagram of an image processing device according to an embodiment of this disclosure. As shown in FIG. 16, the device includes a parsing module 1601, a determining module 1602, and a reconstruction module 1603. The parsing module 1601 is configured to parse a code stream to obtain a first quantization parameter of a current image area in an original resolution coding scheme, a second quantization parameter of the current image area in a downsampling coding scheme, a coding scheme of a current to-be-reconstructed image block in the current image area, a quantization coefficient of the current to-be-reconstructed image block, and a prediction signal of the current to-be-reconstructed image block. The coding scheme of the current to-be-reconstructed image block is the original resolution coding scheme or the downsampling coding scheme, and the current to-be-reconstructed image block is a part of the current image area.

The determining module 1602 is configured to determine a quantization parameter of the current to-be-reconstructed image block according to the coding scheme of the current to-be-reconstructed image block. The quantization parameter of the current to-be-reconstructed image block is the first quantization parameter or the second quantization parameter.

The reconstruction module 1603 is configured to reconstruct the current to-be-reconstructed image block based on the quantization parameter, the quantization coefficient, and the prediction signal of the current to-be-reconstructed image block, to obtain a current reconstructed image block.

Optionally, the code stream includes the first quantization parameter and the second quantization parameter, or the code stream includes the first quantization parameter and a quantization parameter prediction difference of the current image area. Correspondingly, the parsing module 1601 is further configured to calculate the second quantization parameter based on the first quantization parameter and the quantization parameter prediction difference.

Optionally, the determining module 1602 is further configured to, if the coding scheme of the current to-be-reconstructed image block is the original resolution coding scheme, use the first quantization parameter as the quantization parameter of the current to-be-reconstructed image block, or if the coding scheme of the current to-be-reconstructed image block is the downsampling coding scheme, use the second quantization parameter as the quantization parameter of the current to-be-reconstructed image block.

The image processing device provided in this disclosure may perform the image processing method corresponding to FIG. 13 and optional manners of the method. Implementation principles and technical effects thereof are similar, and details are not described herein again.

Figure 17:
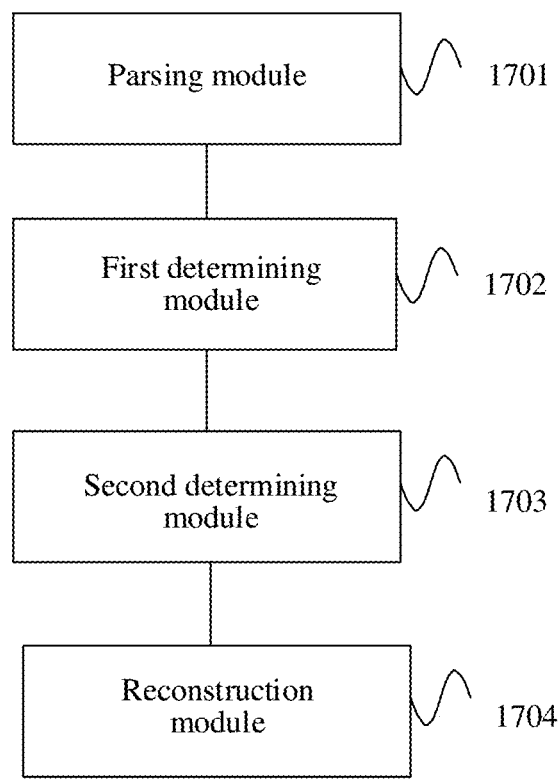
FIG. 17 is a schematic structural diagram of an image processing device according to another embodiment of this disclosure.

FIG. 17 is a schematic structural diagram of an image processing device according to another embodiment of this disclosure. As shown in FIG. 17, the device includes a parsing module 1701, a first determining module 1702, a second determining module 1703, and a reconstruction module 1704. The parsing module 1701 is configured to parse a code stream to obtain a quantization parameter prediction difference of a current to-be-reconstructed image block, a quantization coefficient of the current to-be-reconstructed image block, a coding scheme of the current to-be-reconstructed image block, and a prediction signal of the current to-be-reconstructed image block. The coding scheme is an original resolution coding scheme or a downsampling coding scheme.

The first determining module 1702 is configured to determine a quantization parameter predictor of the current to-be-reconstructed image block according to the coding scheme of the current to-be-reconstructed image block.

The second determining module 1703 is configured to determine a quantization parameter of the current to-be-reconstructed image block based on the quantization parameter predictor and the quantization parameter prediction difference of the current to-be-reconstructed image block.

The reconstruction module 1704 is configured to reconstruct the current to-be-reconstructed image block based on the quantization parameter, the quantization coefficient, and the prediction signal of the current to-be-reconstructed image block to obtain a current reconstructed image block.

Optionally, the first determining module 1702 is further configured to select M reconstructed image blocks according to a preset rule, and obtain quantization parameters of the M reconstructed image blocks and coding schemes of the M reconstructed image blocks, where the M reconstructed image blocks belong to a same current image area as the current to-be-reconstructed image block, and M is a positive integer, and determine the quantization parameter predictor of the current to-be-reconstructed image block according to the coding scheme of the current to-be-reconstructed image block and the coding schemes of the M reconstructed image blocks based on the quantization parameters of the M reconstructed image blocks.

Optionally, the M reconstructed image blocks are one reconstructed image block, and the first determining module 1702 is further configured to, if a coding scheme of the one reconstructed image block is the same as the coding scheme of the current to-be-reconstructed image block, determine a quantization parameter of the one reconstructed image block as the quantization parameter predictor of the current to-be-reconstructed image block, or if the coding scheme of the one reconstructed image block is different from the coding scheme of the current to-be-reconstructed image block, determine the quantization parameter predictor of the current to-be-reconstructed image block according to the coding scheme of the one reconstructed image block and the coding scheme of the current to-be-reconstructed image block based on a first quantization parameter and a second quantization parameter, where the first quantization parameter is a quantization parameter that is of the current image area in the original resolution coding scheme and that is obtained by parsing the code stream, the second quantization parameter is a quantization parameter that is of the current image area in the downsampling coding scheme and that is obtained by parsing the code stream, and the current to-be-reconstructed image block is a part of the current image area.

Optionally, the first determining module 1702 is further configured to, if the coding scheme of the one reconstructed image block is the downsampling coding scheme, and the coding scheme of the current to-be-reconstructed image block is the original resolution coding scheme, subtract the second quantization parameter from the first quantization parameter to obtain a quantization difference, and calculate a sum of the quantization parameter of the one reconstructed image block and the quantization difference to obtain the quantization parameter predictor, or if the coding scheme of the one reconstructed image block is the original resolution coding scheme, and the coding scheme of the current to-be-reconstructed image block is the downsampling coding scheme, subtract the second quantization parameter from the first quantization parameter to obtain the quantization difference, and calculate a difference between the quantization parameter of the one reconstructed image block and the quantization difference to obtain the quantization parameter predictor.

Optionally, the one reconstructed image block is a previous reconstructed image block of the current to-be-reconstructed image block in a decoding sequence.

Optionally, M is greater than 1, and the first determining module 1702 is further configured to, if the coding schemes of the M reconstructed image blocks each are the same as the coding scheme of the current to-be-reconstructed image block, determine an average of the quantization parameters of the M reconstructed image blocks as the quantization parameter predictor of the current to-be-reconstructed image block, or if a coding scheme of one reconstructed image block is different from the coding scheme of the current to-be-reconstructed image block, determine the quantization parameter predictor of the current to-be-reconstructed image block according to the coding schemes of the M reconstructed image blocks and the coding scheme of the current to-be-reconstructed image block based on a first quantization parameter and a second quantization parameter, where the first quantization parameter is a quantization parameter that is of the current image area in the original resolution coding scheme and that is obtained by parsing the code stream, the second quantization parameter is a quantization parameter that is of the current image area in the downsampling coding scheme and that is obtained by parsing the code stream, and the current to-be-reconstructed image block is a part of the current image area.

Optionally, the first determining module 1702 is further configured to, if the M reconstructed image blocks include a reconstructed image block coded using the downsampling coding scheme, and the coding scheme of the current to-be-reconstructed image block is the original resolution coding scheme, calculate, based on the first quantization parameter, the second quantization parameter, and a quantization parameter of the reconstructed image block coded using the downsampling coding scheme, a corrected quantization parameter of the reconstructed image block coded using the downsampling coding scheme, and determine the average of the quantization parameters of the M reconstructed image blocks based on the corrected quantization parameter of the reconstructed image block coded using the downsampling coding scheme, where the average is the quantization parameter predictor of the current to-be-reconstructed image block, or if the M reconstructed image blocks include a reconstructed image block coded using the original resolution coding scheme, and the coding scheme of the current to-be-reconstructed image block is the downsampling coding scheme, calculate, based on the first quantization parameter, the second quantization parameter, and a quantization parameter of the reconstructed image block coded using the original resolution coding scheme, a corrected quantization parameter of the reconstructed image block coded using the original resolution coding scheme, and determine the average of the quantization parameters of the M reconstructed image blocks based on the corrected quantization parameter of the reconstructed image block coded using the original resolution coding scheme, where the average is the quantization parameter predictor of the current to-be-reconstructed image block.

Optionally, the first determining module 1702 is further configured to subtract the second quantization parameter from the first quantization parameter to obtain a quantization difference, and calculate a sum of the quantization difference and the quantization parameter of the reconstructed image block coded using the downsampling coding scheme, to obtain the corrected quantization parameter of the reconstructed image block coded using the downsampling coding scheme.

Optionally, the first determining module 1702 is further configured to subtract the second quantization parameter from the first quantization parameter to obtain the quantization difference, and calculate a difference between the quantization difference and the quantization parameter of the reconstructed image block coded using the original resolution coding scheme, to obtain the corrected quantization parameter of the reconstructed image block coded using the original resolution coding scheme.

Optionally, the M reconstructed image blocks include an upper reconstructed image block and a left reconstructed image block of the current to-be-reconstructed image block.

Optionally, the M reconstructed image blocks are one reconstructed image block, and the first determining module 1702 is further configured to search reconstructed image blocks falling within a preset range for a reconstructed image block having a same coding scheme as the current to-be-reconstructed image block, obtain a quantization parameter of the one reconstructed image block, and use the quantization parameter of the one reconstructed image block as the quantization parameter predictor of the current to-be-reconstructed image block.

Optionally, the one reconstructed image block is a reconstructed image block that is in the reconstructed image blocks falling within the preset range and that is closest to the current to-be-reconstructed image block in a decoding sequence.

Optionally, the first determining module 1702 is further configured to, if the coding scheme of the current to-be-reconstructed image block is the original resolution coding scheme, use a first quantization parameter as the quantization parameter predictor of the current to-be-reconstructed image block, or if the coding scheme of the current to-be-reconstructed image block is the downsampling coding scheme, use a second quantization parameter as the quantization parameter predictor of the current to-be-reconstructed image block. The first quantization parameter is a quantization parameter that is of a current image area in the original resolution coding scheme and that is obtained by parsing the code stream, the second quantization parameter is a quantization parameter that is of the current image area in the downsampling coding scheme and that is obtained by parsing the code stream, and the current to-be-reconstructed image block is a part of the current image area.

Optionally, the first determining module 1702 is further configured to, if the coding scheme of the current to-be-reconstructed image block is the original resolution coding scheme, correct a first quantization parameter based on the quantization parameter prediction difference to obtain the quantization parameter predictor of the current to-be-reconstructed image block, or if the coding scheme of the current to-be-reconstructed image block is the downsampling coding scheme, correct a second quantization parameter based on the quantization parameter prediction difference to obtain the quantization parameter predictor of the current to-be-reconstructed image block. The first quantization parameter is a quantization parameter that is of a current image area in the original resolution coding scheme and that is obtained by parsing the code stream, the second quantization parameter is a quantization parameter that is of the current image area in the downsampling coding scheme and that is obtained by parsing the code stream, and the current to-be-reconstructed image block is a part of the current image area.

The image processing device provided in this disclosure may perform the image processing method corresponding to FIG. 14 and optional manners of the method. Implementation principles and technical effects thereof are similar, and details are not described herein again.

Figure 18:
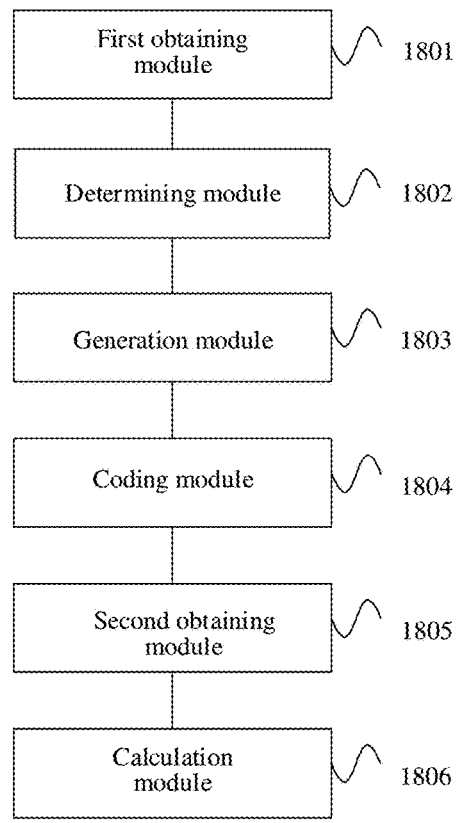
FIG. 18 is a schematic structural diagram of an image processing device according to still another embodiment of this disclosure.

FIG. 18 is a schematic structural diagram of an image processing device according to still another embodiment of this disclosure. As shown in FIG. 18, the device includes a first obtaining module 1801, a determining module 1802, a generation module 1803, and a coding module 1804. The first obtaining module 1801 is configured to obtain a first quantization parameter of a current image area in an original resolution coding scheme, a second quantization parameter of the current image area in a downsampling coding scheme, a coding scheme of a current to-be-coded image block in the current image area, a coded signal of the current to-be-coded image block, and a prediction signal of the current to-be-coded image block. The coding scheme of the current to-be-coded image block is the original resolution coding scheme or the downsampling coding scheme. When the coding scheme of the current to-be-coded image block is the original resolution coding scheme, the coded signal is an original signal of the current to-be-coded image block, or when the coding scheme of the current to-be-coded image block is the downsampling coding scheme, the coded signal is a signal obtained after downsampling processing is performed on the original signal of the current to-be-coded image block.

The determining module 1802 is configured to determine a quantization parameter of the current to-be-coded image block according to the coding scheme of the current to-be-reconstructed image block. The quantization parameter of the current to-be-reconstructed image block is the first quantization parameter or the second quantization parameter, or the quantization parameter of the current to-be-reconstructed image block is a quantization parameter obtained by correcting the first quantization parameter or a quantization parameter obtained by correcting the second quantization parameter.

The generation module 1803 is configured to generate a residual signal of the current to-be-coded image block based on the prediction signal and the coded signal.

The coding module 1804 is configured to code the residual signal based on the quantization parameter of the current to-be-reconstructed image block.

Optionally, the first obtaining module 1801 is further configured to obtain a quantization parameter prediction difference of the current image area, and calculate the second quantization parameter based on the first quantization parameter and the quantization parameter prediction difference.

Optionally, the first obtaining module 1801 is further configured to determine, based on the first quantization parameter, first coding costs used when the original resolution coding scheme is used for the current to-be-coded image block, determine, based on the second quantization parameter, second coding costs used when the downsampling coding scheme is used for the current to-be-coded image block, and use a coding scheme corresponding to a lowest coding cost in the first coding costs and the second coding costs as the coding scheme of the current to-be-coded image block.

Optionally, the determining module 1802 is further configured to, if the coding scheme of the current to-be-coded image block is the original resolution coding scheme, determine the quantization parameter of the current to-be-coded image block as the first quantization parameter, or if the coding scheme of the current to-be-coded image block is the downsampling coding scheme, determine the quantization parameter of the current to-be-coded image block as the second quantization parameter.

Optionally, the generation module 1803 is further configured to generate a code stream. The code stream includes the first quantization parameter, the second quantization parameter, and the coding scheme of the current to-be-reconstructed image block, or the code stream includes the first quantization parameter, the quantization parameter prediction difference of the current image area, and the coding scheme of the current to-be-reconstructed image block.

Optionally, the first obtaining module 1801 is further configured to correct the first quantization parameter for at least one time to obtain at least one third quantization parameter, and correct the second quantization parameter for at least one time to obtain at least one fourth quantization parameter, determine, based on the third quantization parameters, third coding costs used when the original resolution coding scheme is used for the current to-be-coded image block, and determine, based on the fourth quantization parameters, fourth coding costs used when the downsampling coding scheme is used for the current to-be-coded image block, and use a coding scheme corresponding to a lowest coding cost in the third coding costs and the fourth coding costs as the coding scheme of the current to-be-coded image block.

Optionally, the determining module 1802 is further configured to, if the coding scheme of the current to-be-coded image block is the original resolution coding scheme, determine a third quantization parameter with a lowest coding cost in the at least one third quantization parameter as the quantization parameter of the current to-be-coded image block, or if the coding scheme of the current to-be-coded image block is the downsampling coding scheme, determine a fourth quantization parameter with a lowest coding cost in the at least one fourth quantization parameter as the quantization parameter of the current to-be-coded image block.

Optionally, the device further includes a second obtaining module 1805 and a calculation module 1806. The second obtaining module 1805 is configured to obtain a quantization parameter predictor of the current to-be-coded image block. The calculation module 1806 is configured to calculate a quantization parameter prediction difference of the current to-be-coded image block based on the quantization parameter predictor and the quantization parameter of the current to-be-coded image block. The generation module 1803 is further configured to generate a code stream. The code stream includes the coding scheme of the current to-be-coded image block and the quantization parameter prediction difference of the current to-be-coded image block.

Optionally, the second obtaining module 1805 is further configured to select M reconstructed image blocks according to a preset rule, and obtain quantization parameters of the M reconstructed image blocks and coding schemes of the M reconstructed image blocks, where the M reconstructed image blocks belong to the same current image area as the current to-be-coded image block, and M is a positive integer, and determine the quantization parameter predictor of the current to-be-coded image block according to the coding scheme of the current to-be-coded image block and the coding schemes of the M reconstructed image blocks based on the quantization parameters of the M reconstructed image blocks.

Optionally, the M reconstructed image blocks are one reconstructed image block, and the second obtaining module 1805 is further configured to, if a coding scheme of the one reconstructed image block is the same as the coding scheme of the current to-be-coded image block, determine a quantization parameter of the one reconstructed image block as the quantization parameter predictor of the current to-be-coded image block, or if the coding scheme of the one reconstructed image block is different from the coding scheme of the current to-be-coded image block, determine the quantization parameter predictor of the current to-be-coded image block according to the coding scheme of the one reconstructed image block and the coding scheme of the current to-be-coded image block based on the first quantization parameter and the second quantization parameter.

Optionally, the second obtaining module 1805 is further configured to, if the coding scheme of the one reconstructed image block is the downsampling coding scheme, and the coding scheme of the current to-be-coded image block is the original resolution coding scheme, subtract the second quantization parameter from the first quantization parameter to obtain a quantization difference, and calculate a sum of the quantization parameter of the one reconstructed image block and the quantization difference to obtain the quantization parameter predictor, or if the coding scheme of the one reconstructed image block is the original resolution coding scheme, and the coding scheme of the current to-be-coded image block is the downsampling coding scheme, subtract the second quantization parameter from the first quantization parameter to obtain the quantization difference, and calculate a difference between the quantization parameter of the one reconstructed image block and the quantization difference to obtain the quantization parameter predictor.

Optionally, the one reconstructed image block is a previous reconstructed image block of the current to-be-coded image block in a coding sequence.

Optionally, M is greater than 1, and the second obtaining module 1805 is further configured to, if the coding schemes of the M reconstructed image blocks each are the same as the coding scheme of the current to-be-coded image block, determine an average of the quantization parameters of the M reconstructed image blocks as the quantization parameter predictor of the current to-be-coded image block, or if a coding scheme of one reconstructed image block is different from the coding scheme of the current to-be-coded image block, determine the quantization parameter predictor of the current to-be-coded image block according to the coding schemes of the M reconstructed image blocks and the coding scheme of the current to-be-coded image block based on the first quantization parameter and the second quantization parameter.

Optionally, the second obtaining module 1805 is further configured to, if the M reconstructed image blocks include a reconstructed image block coded using the downsampling coding scheme, and the coding scheme of the current to-be-coded image block is the original resolution coding scheme, calculate, based on the first quantization parameter, the second quantization parameter, and a quantization parameter of the reconstructed image block coded using the downsampling coding scheme, a corrected quantization parameter of the reconstructed image block coded using the downsampling coding scheme, and determine the average of the quantization parameters of the M reconstructed image blocks based on the corrected quantization parameter of the reconstructed image block coded using the downsampling coding scheme, where the average is the quantization parameter predictor of the current to-be-coded image block, or if the M reconstructed image blocks include a reconstructed image block coded using the original resolution coding scheme, and the coding scheme of the current to-be-coded image block is the downsampling coding scheme, calculate, based on the first quantization parameter, the second quantization parameter, and a quantization parameter of the reconstructed image block coded using the original resolution coding scheme, a corrected quantization parameter of the reconstructed image block coded using the original resolution coding scheme, and determine the average of the quantization parameters of the M reconstructed image blocks based on the corrected quantization parameter of the reconstructed image block coded using the original resolution coding scheme, where the average is the quantization parameter predictor of the current to-be-coded image block.

Optionally, the second obtaining module 1805 is further configured to subtract the second quantization parameter from the first quantization parameter to obtain a quantization difference, and calculate a sum of the quantization difference and the quantization parameter of the reconstructed image block coded using the downsampling coding scheme, to obtain the corrected quantization parameter of the reconstructed image block coded using the downsampling coding scheme.

Optionally, the second obtaining module 1805 is further configured to subtract the second quantization parameter from the first quantization parameter to obtain the quantization difference, and calculate a difference between the quantization difference and the quantization parameter of the reconstructed image block coded using the original resolution coding scheme, to obtain the corrected quantization parameter of the reconstructed image block coded using the original resolution coding scheme.

Optionally, the M reconstructed image blocks include an upper reconstructed image block and a left reconstructed image block of the current to-be-coded image block.

Optionally, the M reconstructed image blocks are one reconstructed image block, and the second obtaining module 1805 is further configured to search reconstructed image blocks falling within a preset range for a reconstructed image block having a same coding scheme as the current to-be-coded image block, obtain a quantization parameter of the one reconstructed image block and a coding scheme of the one reconstructed image block, and use the quantization parameter of the one reconstructed image block as the quantization parameter predictor of the current to-be-coded image block.

Optionally, the one reconstructed image block is a reconstructed image block that is in the reconstructed image blocks falling within the preset range and that is closest to the current to-be-reconstructed image block in a coding sequence.

Optionally, the second obtaining module 1805 is further configured to obtain the first quantization parameter of the current image area in the original resolution coding scheme and the second quantization parameter of the current image area in the downsampling coding scheme, and if the coding scheme of the current to-be-coded image block is the original resolution coding scheme, use the first quantization parameter as the quantization parameter predictor of the current to-be-coded image block, or if the coding scheme of the current to-be-coded image block is the downsampling coding scheme, use the second quantization parameter as the quantization parameter predictor of the current to-be-coded image block.

The image processing device provided in this disclosure may perform the image processing method corresponding to FIG. 15 and optional manners of the method. Implementation principles and technical effects thereof are similar, and details are not described herein again.

Figure 19:
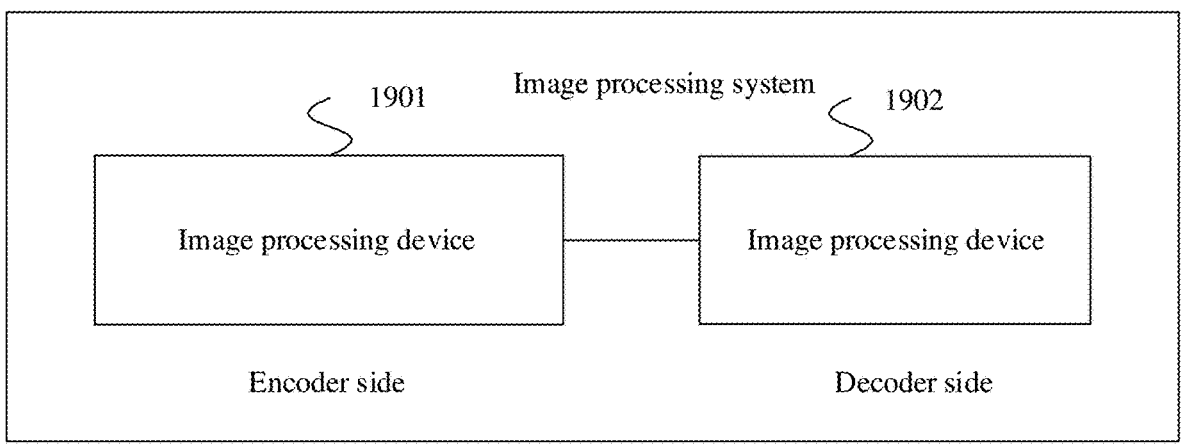
FIG. 19 is a schematic structural diagram of an image processing system according to an embodiment of this disclosure.

FIG. 19 is a schematic structural diagram of an image processing system according to this disclosure. As shown in FIG. 19, the system includes an image processing device 1901 configured to perform the method shown in FIG. 13, and an image processing device 1902 configured to perform the method shown in FIG. 15.

Figure 20:
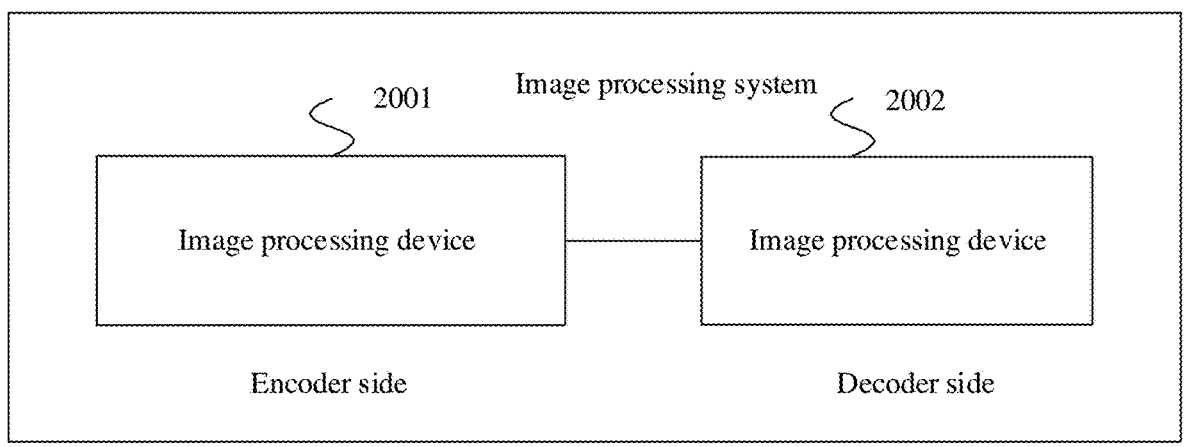
FIG. 20 is a schematic structural diagram of an image processing system according to an embodiment of this disclosure.

FIG. 20 is a schematic structural diagram of an image processing system according to this disclosure. As shown in FIG. 20, the system includes an image processing device 2001 configured to perform the method shown in FIG. 14, and an image processing device 2002 configured to perform the method shown in FIG. 15.

This disclosure provides an image processing device, and the device includes a processor and a memory configured to store an executable instruction of the processor. The processor may perform the image processing method corresponding to FIG. 13 and optional manners of the method. Implementation principles and technical effects thereof are similar, and details are not described herein again.

This disclosure provides an image processing device, and the device includes a processor and a memory configured to store an executable instruction of the processor. The processor may perform the image processing method corresponding to FIG. 14 and optional manners of the method. Implementation principles and technical effects thereof are similar, and details are not described herein again.

This disclosure provides an image processing device, and the device includes a processor and a memory configured to store an executable instruction of the processor. The processor may perform the image processing method corresponding to FIG. 15 and optional manners of the method. Implementation principles and technical effects thereof are similar, and details are not described herein again.

The invention claimed is:

1. An image processing method, comprising:
parsing a code stream to obtain a quantization parameter prediction difference of a current image block, a quantization coefficient of the current image block, a coding scheme of the current image block, and a prediction signal of the current image block, wherein the coding scheme is an original resolution coding scheme or a downsampling coding scheme, and wherein the current image block belongs to a current image area;
determining a quantization parameter predictor of the current image block according to the coding scheme;
determining a quantization parameter of the current image block based on the quantization parameter predictor and the quantization parameter prediction difference;
reconstructing the current image block based on the quantization parameter, the quantization coefficient, and the prediction signal to obtain a current reconstructed image block;
selecting M reconstructed image blocks according to a preset rule, wherein the M reconstructed image blocks comprise a reconstructed image block;
obtaining second quantization parameters of the M reconstructed image blocks and second coding schemes of the M reconstructed image blocks, wherein the M reconstructed image blocks belong to the current image area, and wherein M is a positive integer;
determining the quantization parameter predictor based on the coding scheme, the second coding schemes, and the second quantization parameters;
setting a third quantization parameter of the reconstructed image block as the quantization parameter predictor when a third coding scheme of the reconstructed image block is the same as the coding scheme; and
when the third coding scheme is different from the coding scheme:
parsing the code stream to obtain a fourth quantization parameter of the current image area in the original resolution coding scheme;
parsing the code stream to obtain a fifth quantization parameter of the current image area in the downsampling coding scheme; and
determining the quantization parameter predictor according to the third coding scheme and the coding scheme based on the fourth quantization parameter and the fifth quantization parameter when the third coding scheme is different from the coding scheme, wherein the current image block is a part of the current image area.

2. The image processing method of claim 1, wherein M is greater than one, and wherein the image processing method further comprises:
setting an average of the second quantization parameters as the quantization parameter predictor when each of the second coding schemes is the same as the coding scheme; and
when a third coding scheme of a reconstructed image block of the M reconstructed image blocks is different from the coding scheme:
parsing the code stream to obtain a third quantization parameter of the current image area in the original resolution coding scheme;
parsing the code stream to obtain a fourth quantization parameter of the current image area in the downsampling coding scheme; and
determining the quantization parameter predictor according to the second coding schemes and the coding scheme based on the third quantization parameter and the fourth quantization parameter, wherein the current image block is a part of the current image area.

3. The image processing method of claim 2, further comprising:
when the M reconstructed image blocks comprise a second reconstructed image block and the coding scheme is the original resolution coding scheme:
calculating, based on the third quantization parameter, the fourth quantization parameter, and a fifth quantization parameter of the second reconstructed image block, a corrected quantization parameter of the second reconstructed image block; and
determining the average of the second quantization parameters based on the corrected quantization parameter, wherein the second reconstructed image block is coded using the downsampling coding scheme;
when the M reconstructed image blocks comprise a third reconstructed image block and the coding scheme is the downsampling coding scheme:
calculating, based on the third quantization parameter, the fourth quantization parameter, and a sixth quantization parameter of the third reconstructed image block, a second corrected quantization parameter of the third reconstructed image block; and
determining the average of the second quantization parameters based on the second corrected quantization parameter, wherein the third reconstructed image block is coded using the original resolution coding scheme; and setting the average of the second quantization parameters as the quantization parameter predictor.

4. The image processing method of claim 1, wherein the M reconstructed image blocks comprise a reconstructed image block, and wherein the image processing method further comprises:

searching reconstructed image blocks falling within a preset range for the reconstructed image block, wherein the reconstructed image block comprises a same coding scheme as the current image block;

obtaining a third quantization parameter of the reconstructed image block; and setting the third quantization parameter as the quantization parameter predictor.

5. The image processing method of claim 1, further comprising:

parsing the code stream to obtain a second quantization parameter of the current image area in the original resolution coding scheme;

either setting the second quantization parameter as the quantization parameter predictor or correcting the second quantization parameter based on the quantization parameter prediction difference to obtain the quantization parameter predictor when the coding scheme is the original resolution coding scheme;

parsing the code stream to obtain a third quantization parameter of the current image area in the downsampling coding scheme; and either setting the third quantization parameter as the quantization parameter predictor or correcting the third quantization parameter based on the quantization parameter prediction difference to obtain the quantization parameter predictor when the coding scheme is the downsampling coding scheme.

6. An image processing device, comprising:

a memory configured to store computer-executable instructions; and a processor coupled to the memory, wherein the computer-executable instructions cause the processor to be configured to:

parse a code stream to obtain a quantization parameter prediction difference of a current image block, a quantization coefficient of the current image block, a coding scheme of the current image block, and a prediction signal of the current image block, wherein the coding scheme is an original resolution coding scheme or a downsampling coding scheme, and wherein the current image block belongs to a current image area;

determine a quantization parameter predictor of the current image block according to the coding scheme;

determine a quantization parameter of the current image block based on the quantization parameter predictor and the quantization parameter prediction difference;

reconstruct the current image block based on the quantization parameter, the quantization coefficient, and the prediction signal to obtain a current reconstructed image block;

select M reconstructed image blocks according to a preset rule, wherein the M reconstructed image blocks comprise a reconstructed image block;

obtain second quantization parameters of the M reconstructed image blocks and second coding schemes of the M reconstructed image blocks, wherein the M reconstructed image blocks belong to the current image area, and wherein M is a positive integer;

determine the quantization parameter predictor based on the coding scheme, the second coding schemes, and the second quantization parameters;

set a third quantization parameter of the reconstructed image block as the quantization parameter predictor when a third coding scheme of the reconstructed image block is the same as the coding scheme; and when the third coding scheme is different from the coding scheme:

parse the code stream to obtain a fourth quantization parameter of the current image area in the original resolution coding scheme;

parse the code stream to obtain a fifth quantization parameter of the current image area in the downsampling coding scheme; and determine the quantization parameter predictor according to the third coding scheme and the coding scheme based on the fourth quantization parameter and the fifth quantization parameter, wherein the current image block is a part of the current image area.

7. The image processing device of claim 6, wherein M is greater than one, and wherein the computer-executable instructions further cause the processor to be configured to:

set an average of the second quantization parameters as the quantization parameter predictor when each of the second coding schemes is the same as the coding scheme;

parse the code stream to obtain a third quantization parameter of the current image area in the original resolution coding scheme; and when a third coding scheme of a reconstructed image block of the M reconstructed image blocks is different from the coding scheme:

parse the code stream to obtain a fourth quantization parameter of the current image area in the downsampling coding scheme; and determine the quantization parameter predictor according to the second coding schemes and the coding scheme based on the third quantization parameter and the fourth quantization parameter, wherein the current image block is a part of the current image area.

8. The image processing device of claim 7, wherein the computer-executable instructions further cause the processor to be configured to:

when the M reconstructed image blocks comprise a second reconstructed image block and the coding scheme is the original resolution coding scheme:

calculate, based on the third quantization parameter, the fourth quantization parameter, and a fifth quantization parameter of the second reconstructed image block, a corrected quantization parameter of the second reconstructed image block; and determine the average of the second quantization parameters based on the corrected quantization parameter, wherein the second reconstructed image block is coded using the downsampling coding scheme;

when the M reconstructed image blocks comprise a third reconstructed image block and the coding scheme is the downsampling coding scheme:

calculate, based on the third quantization parameter, the fourth quantization parameter, and a sixth quantization parameter of the third reconstructed image block, a second corrected quantization parameter of the third reconstructed image block;

determine the average of the second quantization parameters based on the second corrected quantization parameter, wherein the third reconstructed image block is coded using the original resolution coding scheme; and set the average of the second quantization parameters as the quantization parameter predictor.

9. The image processing device of claim 6, wherein the M reconstructed image blocks comprise a reconstructed image block, and wherein the computer-executable instructions further cause the processor to be configured to:

search reconstructed image blocks falling within a preset range for the reconstructed image block, wherein the reconstructed image block comprises a same coding scheme as the current image block;

obtain a third quantization parameter of the reconstructed image block; and set the third quantization parameter as the quantization parameter predictor.

10. The image processing device of claim 6, wherein the computer-executable instructions further cause the processor to be configured to:

parse the code stream to obtain a second quantization parameter of the current image area in the original resolution coding scheme;

either set the second quantization parameter as the quantization parameter predictor or correct the second quantization parameter based on the quantization parameter prediction difference to obtain the quantization parameter predictor when the coding scheme is the original resolution coding scheme;

parse the code stream to obtain a third quantization parameter of the current image area in the downsampling coding scheme; and either set the third quantization parameter as the quantization parameter predictor or correct the third quantization parameter based on the quantization parameter prediction difference to obtain the quantization parameter predictor when the coding scheme is the downsampling coding scheme.

11. A non-transitory computer-readable medium comprising computer-executable instructions that, when executed by a processor, cause an image processing device to:

parse a code stream to obtain a quantization parameter prediction difference of a current image block, a quantization coefficient of the current image block, a coding scheme of the current image block, and a prediction signal of the current image block, wherein the coding scheme is an original resolution coding scheme or a downsampling coding scheme, and wherein the current image block belongs to a current image area;

determine a quantization parameter predictor of the current image block according to the coding scheme;

determine a quantization parameter of the current image block based on the quantization parameter predictor and the quantization parameter prediction difference;

reconstruct the current image block based on the quantization parameter, the quantization coefficient, and the prediction signal to obtain a current reconstructed image block;

select M reconstructed image blocks according to a preset rule, wherein the M reconstructed image blocks comprise a reconstructed image block;

obtain second quantization parameters of the M reconstructed image blocks and second coding schemes of the M reconstructed image blocks, wherein the M reconstructed image blocks belong to the current image area, and wherein M is a positive integer;

determine the quantization parameter predictor based on the coding scheme, the second coding schemes, and the second quantization parameters;

set a third quantization parameter of the reconstructed image block as the quantization parameter predictor when a third coding scheme of the reconstructed image block is the same as the coding scheme;

parse the code stream to obtain a fourth quantization parameter of the current image area in the original resolution coding scheme;

parse the code stream to obtain a fifth quantization parameter of the current image area in the downsampling coding scheme; and determine the quantization parameter predictor according to the third coding scheme and the coding scheme based on the fourth quantization parameter and the fifth quantization parameter when the third coding scheme is different from the coding scheme, wherein the current image block is a part of the current image area.

12. The non-transitory computer-readable medium of claim 11, wherein M is greater than one, and wherein the computer-executable instructions further cause the processor to be configured to:

set an average of the second quantization parameters as the quantization parameter predictor when each of the second coding schemes is the same as the coding scheme;

parse the code stream to obtain a third quantization parameter of the current image area in the original resolution coding scheme;

parse the code stream to obtain a fourth quantization parameter of the current image area in the downsampling coding scheme; and determine the quantization parameter predictor according to the second coding schemes and the coding scheme based on the third quantization parameter and the fourth quantization parameter when a third coding scheme of a reconstructed image block of the M reconstructed image blocks is different from the coding scheme, wherein the current image block is a part of the current image area.

13. The non-transitory computer-readable medium of claim 11, wherein the M reconstructed image blocks comprise a second reconstructed image block and the coding scheme is the original resolution coding scheme, and wherein the computer-executable instructions further cause the processor to be configured to:

calculate, based on the third quantization parameter, the fourth quantization parameter, and a fifth quantization parameter of the second reconstructed image block, a corrected quantization parameter of the second reconstructed image block; and determine the average of the second quantization parameters based on the corrected quantization parameter, wherein the second reconstructed image block is coded using the downsampling coding scheme.

14. The non-transitory computer-readable medium of claim 11, wherein the M reconstructed image blocks comprise a third reconstructed image block and the coding scheme is the downsampling coding scheme, and wherein the computer-executable instructions further cause the processor to be configured to:

calculate, based on the third quantization parameter, the fourth quantization parameter, and a sixth quantization parameter of the third reconstructed image block, a second corrected quantization parameter of the third reconstructed image block; and determine the average of the second quantization parameters based on the second corrected quantization parameter, wherein the third reconstructed image block is coded using the original resolution coding scheme.

15. The image processing method of claim 1, further comprising obtaining second quantization parameters in a downsampling coding scheme.

16. The image processing method of claim 1, further comprising obtaining second quantization parameters based on the quantization parameter of the current image block and the quantization parameter prediction difference.

17. The image processing device of claim 6, wherein the computer-executable instructions further cause the processor to be configured to obtain second quantization parameters in a downsampling coding scheme.

18. The image processing device of claim 6, wherein the computer-executable instructions further cause the processor to be configured to obtain second quantization parameters based on the quantization parameter of the current image block and the quantization parameter prediction difference.

19. The non-transitory computer-readable medium of claim 11, wherein the computer-executable instructions further cause the processor to be configured to obtain second quantization parameters in a downsampling coding scheme.

20. The non-transitory computer-readable medium of claim 11, wherein the computer-executable instructions further cause the processor to be configured to obtain second quantization parameters based on the quantization parameter of the current image block and the quantization parameter prediction difference.

* * * * *